(12) United States Patent
Diosi et al.

(10) Patent No.: US 7,824,302 B2
(45) Date of Patent: Nov. 2, 2010

(54) MULTI-SPEED TRANSMISSION

(75) Inventors: Gabor Diosi, Friedrichshafen (DE);
Josef Haupt, Tettnang (DE); Gerhard Gumpoltsberger, Friedrichshafen (DE); Peter Ziemer, Tettnang (DE); Hagen Döpfert, Lindau (DE); Uwe Firzlaff, Uhidingen-Mühlhofen (DE); Martin Brehmer, Constance (DE); Christoph Hutzel, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 685 days.

(21) Appl. No.: 11/910,052

(22) PCT Filed: Mar. 15, 2006

(86) PCT No.: PCT/EP2006/002379

§ 371 (c)(1),
(2), (4) Date: Sep. 28, 2007

(87) PCT Pub. No.: WO2006/102992

PCT Pub. Date: Oct. 5, 2006

(65) Prior Publication Data

US 2008/0269004 A1   Oct. 30, 2008

(30) Foreign Application Priority Data

Mar. 31, 2005  (DE) .................. 10 2005 014 592

(51) Int. Cl.
*F16H 3/62* (2006.01)
(52) U.S. Cl. .................. 475/277; 475/282; 475/288
(58) Field of Classification Search ................ 475/271, 475/275–292
See application file for complete search history.

(56) References Cited

U.S. PATENT DOCUMENTS

| 4,224,838 | A  | 9/1980  | Roushdy et al.   |
| 5,429,557 | A  | 7/1995  | Beim             |
| 6,176,803 | B1 | 1/2001  | Meyer et al.     |
| 6,558,287 | B2 | 5/2003  | Hayabuchi et al. |
| 6,634,980 | B1 | 10/2003 | Ziemer           |
| 6,960,149 | B2 | 11/2005 | Ziemer           |
| 7,014,589 | B2 | 3/2006  | Stevenson        |
| 7,018,319 | B2 | 3/2006  | Ziemer           |

(Continued)

FOREIGN PATENT DOCUMENTS

DE      42 34 572 A1    4/1994

(Continued)

*Primary Examiner*—David D Le
*Assistant Examiner*—Derek D Knight
(74) *Attorney, Agent, or Firm*—Davis & Bujold, P.L.L.C.

(57) ABSTRACT

A transmission having gearsets (RS1-RS4), shafts (1-8) and shifting elements (A-E). A carrier of gearset (RS4) and an input shaft forming shaft (1), a carrier of gearset (RS3) and an output shaft form shaft (2), sun gears of gearsets (RS3, RS4) form shaft (3). A ring gear of gearset (RS1) forms shaft (4). Ring and sun gears respectively of gearsets (RS2, RS1) couple as shaft (5), a carrier of gearset (RS1) and a ring gear of gearset (RS3) form shaft (6), sun and ring gears respectively of gearsets (RS2, RS4) couple as shaft (7). A carrier of gearset (RS2) forms shaft (8). Located in the flow of power: elements (A, B) are respectively between shafts (3, 4) and a housing, element (C) between shafts (5, 1), element (D) between shafts (8, 2) or (8, 6) and element (E) between two of shafts (5, 7, 8).

67 Claims, 28 Drawing Sheets

U.S. PATENT DOCUMENTS

| | | | |
|---|---|---|---|
| 7,651,429 B2 * | 1/2010 | Kamm et al. | 475/277 |
| 7,670,246 B2 * | 3/2010 | Kamm et al. | 475/275 |
| 7,682,282 B2 * | 3/2010 | Kamm et al. | 475/277 |
| 7,691,024 B2 * | 4/2010 | Phillips et al. | 475/276 |
| 7,699,736 B2 * | 4/2010 | Diosi et al. | 475/5 |
| 7,699,741 B2 * | 4/2010 | Hart et al. | 475/271 |
| 7,699,743 B2 * | 4/2010 | Diosi et al. | 475/277 |
| 7,704,180 B2 * | 4/2010 | Wittkopp et al. | 475/275 |
| 7,713,161 B2 * | 5/2010 | Kamm et al. | 475/282 |
| 7,736,263 B2 * | 6/2010 | Phillips et al. | 475/277 |
| 7,736,264 B2 * | 6/2010 | Moorman et al. | 475/277 |
| 7,785,226 B2 * | 8/2010 | Phillips et al. | 475/279 |
| 7,789,791 B2 * | 9/2010 | Phillips et al. | 475/275 |
| 7,789,792 B2 * | 9/2010 | Kamm et al. | 475/330 |
| 2004/0242368 A1 | 12/2004 | Tabata et al. | |
| 2008/0242492 A1 * | 10/2008 | Phillips et al. | 475/276 |
| 2009/0054196 A1 * | 2/2009 | Phillips et al. | 475/276 |
| 2009/0215580 A1 * | 8/2009 | Hart et al. | 475/276 |
| 2010/0210399 A1 * | 8/2010 | Wittkopp et al. | 475/275 |

FOREIGN PATENT DOCUMENTS

| | | |
|---|---|---|
| DE | 199 49 507 A1 | 4/2001 |
| DE | 100 83 202 TI | 1/2002 |
| DE | 101 15 983 A1 | 10/2002 |
| DE | 101 15 995 A1 | 10/2002 |
| DE | 102 13 820 A1 | 10/2002 |
| DE | 10 2004 029 952 A1 | 1/2005 |
| EP | 1 398 537 A1 | 3/2004 |

* cited by examiner

| Gear | Engaged Shifting Elements | | | | | Ratio i | Step φ |
|---|---|---|---|---|---|---|---|
| | Brake | | Clutch | | | | |
| | A | B | C | D | E | | |
| 1 | ● | ● | ● | | | 4.805 | 1.455 |
| 2 | ● | ● | | | ● | 3.304 | 1.447 |
| 3 | | ● | ● | | ● | 2.283 | 1.294 |
| 4 | | ● | | ● | ● | 1.764 | 1.331 |
| 5 | | ● | ● | ● | | 1.325 | 1.325 |
| 6 | | | ● | ● | ● | 1.000 | 1.178 |
| 7 | ● | | ● | ● | | 0.849 | 1.234 |
| 8 | ● | | | ● | ● | 0.688 | TOTAL 7.0 |
| R | ● | ● | | ● | | -3.367 | |

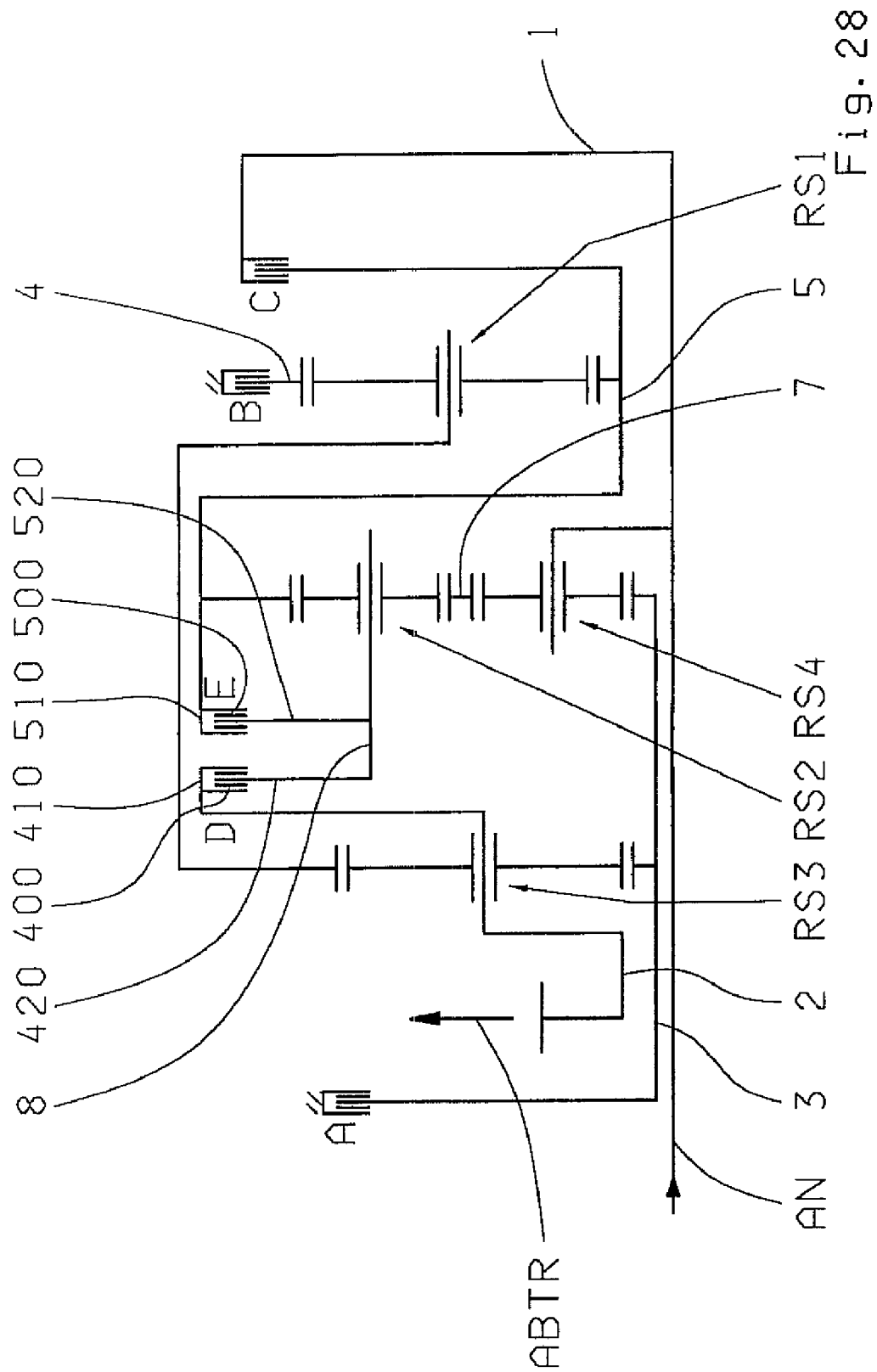

MULTI-SPEED TRANSMISSION

This application is a national stage completion of PCT/EP2006/002379 filed Mar. 15, 2006, which claims priority from German Application Serial No. 10 2005 014 592.2 filed Mar. 31, 2005.

FIELD OF THE INVENTION

The present invention concerns a multi-stage transmission designed in accordance with planetary gearset construction, the transmission being especially an automatic transmission for motor vehicles encompassing one input shaft, one output shaft, four planetary gearsets, at least eight, rotatable shafts and at least five shifting elements. The selective shifting of which enables differing speeds of rotation between the input shaft and the output shaft such that at least eight forward gears and at least one reverse gear can be implemented.

BACKGROUND OF THE INVENTION

Automatic transmissions, especially for motor vehicles encompassing planetary gearsets with the aid of frictionally based shifting elements, such as clutches and brakes, can be engaged and the transmission normally possesses a slip-action startup element and is optionally furnished with a bypass clutch. The bypass clutch would be supplied in the form of a hydrodynamic torque converter or a hydrodynamic clutch.

A multi-speed transmission is disclosed by DE 102 13 820 A1. This cited transmission includes one input shaft and one output shaft, which are mutually co-axially aligned. Further total of three planetary gearsets and six frictional-based shifting elements are included. For the transfer of the speed of rotation of the input shaft to the output shaft, the cited transmission provides two drive paths. Two of the planetary gearsets form a shiftable main gearset, which is designed as a two-carrier, four shaft transmission and is further known as a Ravigneaux planetary gearset or, alternately as a so-called Simpson planetary gearset. The output element of the main gearset is bound with the output shaft of the transmission. The remaining one of the three planetary gearsets serves as a simple planetary gearset and forms a non-shiftable, transfer gearset, which is rigidly bound to the input shaft and generates a speed of rotation on its output side which, besides the speed of rotation of the input shaft, can be transmitted to various input elements of the main gearset. By selective engagement of two respective six frictional shifting elements, which are namely clutches and brakes, a total of eight forward gear ratios can be engaged in a manner free of range shifting. In this way, the shifting action is such that in the case of a change from one gear ratio into the next respective successive gear ratio, whether higher or lower, then only one of the previously engaged shifting elements need be disengaged and a previously disengaged shifting element is engaged.

In U.S. Pat. No. 5,429,557, an axially aligned, comparatively compactly assembled, multi-speed automatic transmission of planetary gearset design, which has a transfer gearset and a principal double planetary gearset constructed of two planetary gearsets, which are coupled together as is done in a two-carrier, four shaft planetary transmission. In an embodiment of this transmission, which serves well for installation in a vehicle having a front-end, transversely directed drive, the input shaft and the output shaft are arranged to be axis-parallel to one another. Starting with this arrangement, the transfer gearset is constructed in the transfer method, with two spur gear ratios of a constant ratio having overdrive characteristics and the two planetary gearsets of the main gearset are radially nested, one within the other, wherein the axes thereof run parallel to the axis of the input shaft of the likewise transverse transmission. In the use of a total of five frictionally based shifting elements in this way, only six forward, group shift-free stages are operationally available for the patent.

Furthermore, DE 199 49 507 A1 of the Applicant discloses a multi-speed transmission, wherein two non-shiftable, transfer planetary gearsets are placed on the input shaft, which generate two speeds of rotation which, besides the speed of rotation of the input shaft, in addition, can also be transmitted to various input elements of a multi-speed main planetary gearset by way of selective engagement of shifting elements, acting upon the output shaft AB with the result that, for selective changing from one gear ratio to another, be that a higher or lower gear ratio, then of the two immediately engaged shifting elements, respectively, only one need be engaged or disengaged. The principal planetary gearset as before, is once again constructed in the manner of a double planetary gearset this being a two-carrier, four shaft planetary gearset, wherein two double planetary gearsets, by way of two elements, are rigidly coupled to one another. When five shifting elements are put into use, then seven forward gear ratios become range-free shiftable. In the case of using six shifting elements, even nine or ten forward gear ratios become available. All four planetary gearsets are, in this embodiment, co-axially aligned to each other and to the axially disposed input shaft.

Within the framework of DE 101 15 983 A1 of the Applicant, a multi-speed transmission is described, which possesses one drive shaft which is connected with a transfer gearset, and has one output shaft which, in turn, is bound to an output-sided gearset assembly. A maximum of seven shifting elements are further supplied, the selective shifting of which, enables shifting into at least eight forward gear ratios (without range shifting). The transfer gearset assembly consists of a shiftable, or a non-shiftable planetary gearset, or, alternately, of a pair of non shiftable, mutually coupled planetary gearsets. The output-sided planetary gear assembly is assembled, as in the case, of a two-carrier, four shaft transmission with two shiftable output-sided planetary gearsets and possesses four free shafts. The first free shaft of this two-carrier, four shaft transmission is connected with the first shifting element, the second free shaft is bound to the second and third shifting element, the third free shaft is attached to the fourth and fifth shifting element and the fourth free shaft is connected to the output shaft. In the case of a multi-speed transmission with a total of six shifting elements, the proposal is to additionally connect the third free shaft or the first free shaft of the output-sided gear group additionally to the sixth shifting element. For a multi-speed transmission having a total of seven shifting elements, it is proposed to connect the third free shaft additionally with the sixth shifting element and the first free shaft additionally to a seventh shifting element. In these cases, all planetary gearsets of the transmission are arranged to be mutually co-axial.

In the Applicant's DE 101 15 995 A1, a plurality of other multi-speed transmission are disclosed, wherein four shiftable mutually coupled and co-axially arranged planetary gearsets and six or seven frictionally-based shifting elements are provided, the selective shifting of which transfer a speed of rotation of an input shaft of the transmission in such a manner to an output shaft of the transmission that nine or eleven forward gear ratios and at least one reverse gear ratio become available as shifting positions. In accord with a shift-logic diagram of the transmission, it may be seen that in each gear ratio two or three shifting elements are engaged while, upon a change from one established gear ratio position to the next successive higher or lower gear ratio, for the avoidance of range shifting, respectively only one engaged shifting element need be disengaged and one previously disengaged element need be engaged.

The present invention has the purpose of proposing a multi-speed transmission, which possesses at least eight forward gear ratios and at least one reverse gear ratio wherein, under the usage of a total of four planetary gearsets, the least possible number of shifting elements need be included. In this arrangement, all forward gear ratios, when in a sequential gear change, can be so shifted without range shifting, in other words, in a case of change from one forward gear ratio to the successively next higher or lower forward gear ratio, respectively, only one previously engaged shifting element need be disengaged and a previously disengaged shifting element need be engaged. In addition, the transmission is expected to exhibit a large ratio spread, where comparative harmonic gear separations are concerned and have a favorable degree of efficiency in the main gear ratios used mostly in driving. Accordingly, a comparatively small amount of slippage and tooth wear is incurred. The transmission should be adaptable, in particular, for usage with non co-axial input and output shafts and correspondingly, the axial length of the transmission should be held to the shortest possible dimensioning.

SUMMARY OF THE INVENTION

According to the above, a multi-speed transmission of the planetary gear design is proposed, which possesses one input shaft, one output shaft, four planetary gearsets, at least eight rotatable shafts as well as five shifting elements; the latter comprising two brakes and three clutches. As to the shifting elements, these are to be so designed that the selective engagement of the same brings about predetermined, different rotational speed ratios between the input shaft and the output shaft, such that eight forward gear ratios and one reverse gear ratio can be implemented.

In regard to the kinematic coupling of the of the planetary gearset elements, among one another, as well as to the shafts of the transmission, according to the invention, the following connections have been made: a carrier of the fourth planetary gearset and the input shaft are connected in a rotationally fixed manner, one to the other, and form the first rotatable shaft of the transmission. A carrier of the third planetary gearset and the output shaft are bound together and form the second rotatable shaft of the transmission, between this carrier of the third planetary gearset and the output shaft, an output gear with a differential can be kinematically inserted. A sun gear of the third planetary gearset and a sun gear of the fourth planetary gearset are connected in a rotationally fixed manner to one another and form the third rotational shaft of the transmission. A ring gear of the first planetary gearset forms the fourth rotational shaft of the transmission. A ring gear of the second planetary gearset and a sun gear of the first planetary gearset are connected in a rotationally fixed manner and form the fifth rotational shaft of the transmission. A carrier of the first planetary gearset and a ring gear of the third planetary gearset are connected in a rotationally fixed manner and form the sixth rotational shaft of the transmission. A sun gear of the second planetary gearset and a ring gear of the fourth planetary gearset are connected in a rotationally fixed manner and form the seventh rotational shaft of the transmission. A carrier of the second planetary gearset forms the eighth rotational shaft of the transmission.

All four planetary gearsets are designed as negative planetary gearsets, wherein the respective planet gears mesh with the sun gear and the ring gear of their assigned planetary gearset.

In an advantageous embodiment of the invention, giving attention to the required spatial limitations of the four planetary gearsets within the housing of the transmission, provision has been made that the second and the fourth planetary gearsets, seen in an axial direction, are found in a plane, one above the other. In other words, these planetary gearsets are radially nested one inside the other. In this way, the fourth planetary gearset is to be found centrally located within the second planetary gearset, and the ring gear (radially inner) of the fourth planetary gearset and the sun gear of the (radially outer) second planetary gearset are combined to form a one-piece component. Further provision has been made that these two radially nested planetary gearsets, when viewed spatially, are located axially between the two other planetary gearsets.

Corresponding to the inventive, kinematic coupling of the planetary gearsets, shifting elements, input and output shafts, favorable gearing ratios are created, allowed by a special combination of the stationary transmission ratios of the individual planetary gearsets. Due to the fact that in the present case, the stationary ratio of the second planetary gearset, as a stated value, is comparatively small while simultaneously, the stationary ratio of the fourth planetary gearset is comparatively large, a predetermination of operating conditions for the inventive radial arrangement of the second and the fourth planetary gearsets can be made. This will show that, if the stationary ratio of the second planetary gearset is approximately 1.55, using a sun gear with a comparatively large diameter is permissible to prevent a situation, where the planet gears of the (radially outer) second planetary gearset rotate at too high a speed. Conversely, if the stationary ratio of the fourth planetary gearset is found to be −2.20, then a ring gear with a comparatively small diameter can be used, to prevent a situation where the planet gears of the (radially inner) fourth planetary gearset would be too small in order to manage the required torque. Because the ring gear of the (radially inner) fourth planetary gearset is directly bound to the sun gear of the (radially outer) second planetary gearset, it becomes possible that this ring gear and this sun gear can be combined into a one-piece component, such that the radially occupied space of the planetary group containing the second and the fourth planetary gearsets is advantageously additionally reduced.

Corresponding to the kinematic coupling of the five shifting elements to the various gearset components and to the input shaft of the transmission, provision has been made that the first shifting element is placed in the power flow, between the third shaft and the housing of the transmission; the second shifting element is placed in the power flow, between the fourth shaft and the housing of the transmission, and the third shifting element is placed in the power flow, between the fifth and first shafts. Further, the fourth shifting element is placed in the power flow either between the eighth and second shafts or between the eighth and sixth shafts. The fifth shifting element is provided to interlock with the second planetary gearset and, for this purpose, is placed either between the seventh and fifth shafts, the seventh and eighth shafts or yet between the fifth and eighth shafts. By way of these inventive, kinematic couplings of the shifting elements to the various shafts of the transmission, an entire family of gear ratios is created.

The first forward gear ratio is brought about by engaging the first, second and third shifting elements; the second forward gear ratio is made by the engaging of the first, second and fifth shifting elements; the third forward gear ratio is achieved by the engaging the second, third and fifth shifting elements; the fourth forward gear ratio is achieved by the engaging the second, fourth and fifth shifting elements; the fifth forward gear ratio is achieved by the engaging the second, third and fourth shifting elements; the sixth forward gear ratio is achieved by the engaging of the third, fourth and fifth shifting elements; the seventh forward gear ratio is achieved by engaging the first, third and fourth shifting elements, and the eighth forward gear ratio is achieved by the engaging of the first, fourth and fifth shifting elements. The single reverse gear ratio is obtained by engaging the first, second and fourth shifting elements.

Thus, with the use of only five shifting elements together with the inventive arrangement and the layout of the four planetary gearsets, an extraordinarily short axial longitudinal dimensioning is achieved for an 8-gear ratio automatic transmission with four individual planetary gearsets, which can form gear ratios therein. The requirement, as to length for the four planetary gearsets in this arrangement, is not greater than the installation length for three axial, successively located, individual planetary gearsets. To this extent, the inventive automatic transmission is especially well suited for installation in a vehicle having a drive motor installed transversely to the direction of travel and input/output drive shafts that are aligned to be axially-parallel.

In a particular advantage for passenger automobiles, the inventive formation of the transmission makes applicable gear ratios available accompanied by a large ratio spread acting through a harmonic gear ratio succession, with the favorable result of increased driving comfort and a significant reduction of wear is achieved.

Further, with the inventive transmission, the construction and assembly is comparatively easily carried out, due to the small number of involved components, namely two brakes and three clutches. In an advantageous manner, it becomes possible, with the inventive multi-speed transmission, to initiate drive with a hydrodynamic converter, an external clutch or even with other applicable, external startup elements. Consideration can also be given to initiate drive with a startup element integrated within the transmission. Advantageously, one of the two brakes would be excellently adapted for this service, wherein the employed brake would be activated in the first and second forward gear ratios and in the reverse gear ratio.

Moreover, a high degree of efficiency in all gear ratios is present in the case of the inventive multi-speed transmission, because of reduced slip losses since only two shifting elements in each gear stage are not unengaged and because of low tooth wear in the simply built individual planetary gearsets.

In addition to this, the inventive multi-speed transmission is so conceived that compatibility with various gear train arrangements is possible. The subject gear train arrangements would be adaptable both in the power flow direction as well as in the saving of construction space. The transmission adapts itself particularly well for installation in a motor vehicle with a drive motor placed transversely to the direction of travel or equally well for a motor vehicle with input and output shaft that are arranged to be axis parallel.

In connection with the inventive spatial arrangement of the four planetary gearsets as to their relative positions and with a non co-axial alignment of the input and output shafts of the transmission, it proves to be advantageous to place a provided output stage in the power flow, between the carrier of the third planetary gearset and the output shaft, with consideration given to the spatial limitations, where the output stage will be located partially on that side of the third planetary gearset, opposite from the planetary gear group, which is formed by the arrangement of the second and fourth planetary gearsets. This established location is to be advantageously found in the axial direction, immediately bordering on the third planetary gearset. In spatial considerations, this positioning is either axially, between the third and the second planetary gearsets or radially arranged above the second planetary gearset. Furthermore in this arrangement, it is advantageous to place the second shifting element, with consideration to the spatial arrangement, in an area proximal to the first planetary gearset; preferably in an area radially located above the first planetary gearset. Additionally in this arrangement, advantage can be found in placing the third shifting element, when viewed spatially, likewise in an area near the first planetary gearset. The fifth shifting element, when viewed spatially, can be optionally placed in an area axially located between the first and second planetary gearsets or on that side of the first planetary gearset, which lies opposite from the second planetary gearset.

In order to simplify the assembly of the inventive transmission, the combination of two of the three clutches into one, factory-mounted component is seen as an advantageous step. In this arrangement, the following combination, embodiment variations are particularly of value. The combination of the fifth and third shifting elements into one pre-mounted component group which, advantageously would include their servo apparatuses for the activation of the respective disk sets, where both servo apparatuses would be axially and slidably fixed to the fifth shaft of the transmission, which shaft is bound with these two clutches and both servo apparatuses, advantageously possess respective, dynamic pressure compensation or the combination of the fifth and fourth shifting elements into one pre-mounted component group, which advantageously would include their servo apparatuses for the activation of the respective disk sets. Then, both servo apparatuses are axially and slidably fixed to the eighth shaft of the transmission and both servo apparatuses advantageously possess respective, dynamic pressure compensation and the fifth shifting element forms either a shiftable connection between the eighth and fifth shaft or, otherwise, a shiftable connection between the eighth and the seventh shaft of the transmission.

Principally, the following advantageous, spatial arrangements of the three clutches (i.e., the third, fourth and fifth shifting elements) in relation to the planetary gearsets become possible. These arrangements being comprised of a clutch assembly formed from the third and fifth shifting elements being located axially between the planetary gearset assembly formed by the second and fourth planetary gearsets and the first planetary gearset; the fourth shifting element is to be found axially located between the third planetary gearset and the planetary gearset assembly formed by the second and fourth planetary gearsets; a clutch assembly formed from the third and fifth shifting elements and the fourth shifting element, being located axially between the planetary gearset assembly formed by the second and fourth planetary gearsets and the first planetary gearset; a clutch assembly formed from the third and fifth shifting elements located on that side of the first planetary gearset, which is remote from the gearset assembly formed by the second and the fourth planetary gearsets; the fourth shifting element is found axially located between the third planetary gearset and the planetary gearset assembly formed by the second and fourth planetary gearsets; a clutch assembly formed from the third and fifth shifting elements located on that side of the first planetary gearset, which is remote from the gearset assembly formed by the second and fourth planetary gearsets; the fourth shifting element is found axially located between that planetary gearset assembly formed by the second and fourth planetary gear groups and the first planetary gearset; a clutch group formed from the third and fifth shifting elements, located axially on that side of the planetary gearset group which is formed by the second and the fourth planetary gearsets, which side is remote from the third, or the first planetary gearset, while the fourth shifting element lies on that side of the planetary gearset group which is formed by the second and the fourth planetary gearsets, which side is located opposite the clutch group of the third and fifth shifting elements whereby the clutch group and the fourth shifting element advantageously border directly on the planetary gearset group; a clutch assembly formed from the fourth and fifth shifting elements located axially between the third planetary gearset and the planetary gearset assembly formed by the second and fourth planetary gearsets; the third shifting element is found axially located between the planetary gearset assembly formed by the second and fourth planetary gearsets and the first planetary gearset; a clutch assembly formed from fourth and fifth shifting elements located axially between the third planetary gearset and the planetary gearset assembly formed from the second and fourth planetary gearsets; the third shifting element is located on that side of the first planetary gearset, which is remote from that gear group formed by the second and fourth planetary gearsets; a clutch assembly formed from the fourth and fifth shifting elements and the third shifting element located axially between the planetary gearset assembly formed by the second and fourth planetary gearsets and the first planetary gearset or a clutch assembly formed from the fourth and fifth shifting elements located axially between the planetary gearset assembly formed by the second and fourth planetary gearsets and the first planetary gearset; the third shifting element is located on that side of the first planetary gearset, which is remote from the planetary gearset formed by the second and fourth planetary gearsets.

In this way, it becomes possible for the disk sets of the clutch assembly, which is composed of the third and fifth, i.e., the fourth and fifth shifting elements, in accord with the available installation space, to be placed next to one another or above one another or, optionally, radially above or axially beside the planetary gearsets. The direction of activation of the servo apparatuses of the third and fifth, i.e., the fourth and fifth shifting elements of the clutch assemblies, upon the engaging of the respective clutch, optionally, can be axially toward the output stage or, conversely, axially away from the same. For the third and fifth, i.e., the fourth and fifth shifting element of the clutch assembly, a common disk carrier is advantageously provided, which could be a common outer disk carrier for both clutches of the clutch assembly or could also be a combination of inner and outer disk carriers for the two clutches of the clutch assembly group acting as a component of the fifth, i.e., eighth shaft of the transmission.

BRIEF DESCRIPTION OF THE DRAWINGS

The invention will now be described, by way of example, with reference to the accompanying drawings. The same or equivalent components are described in the drawings and text with the same reference numerals in which

FIG. 2 is an exemplary shift-logic diagram for the multi-speed transmission of FIG. 1;

Figure 16:
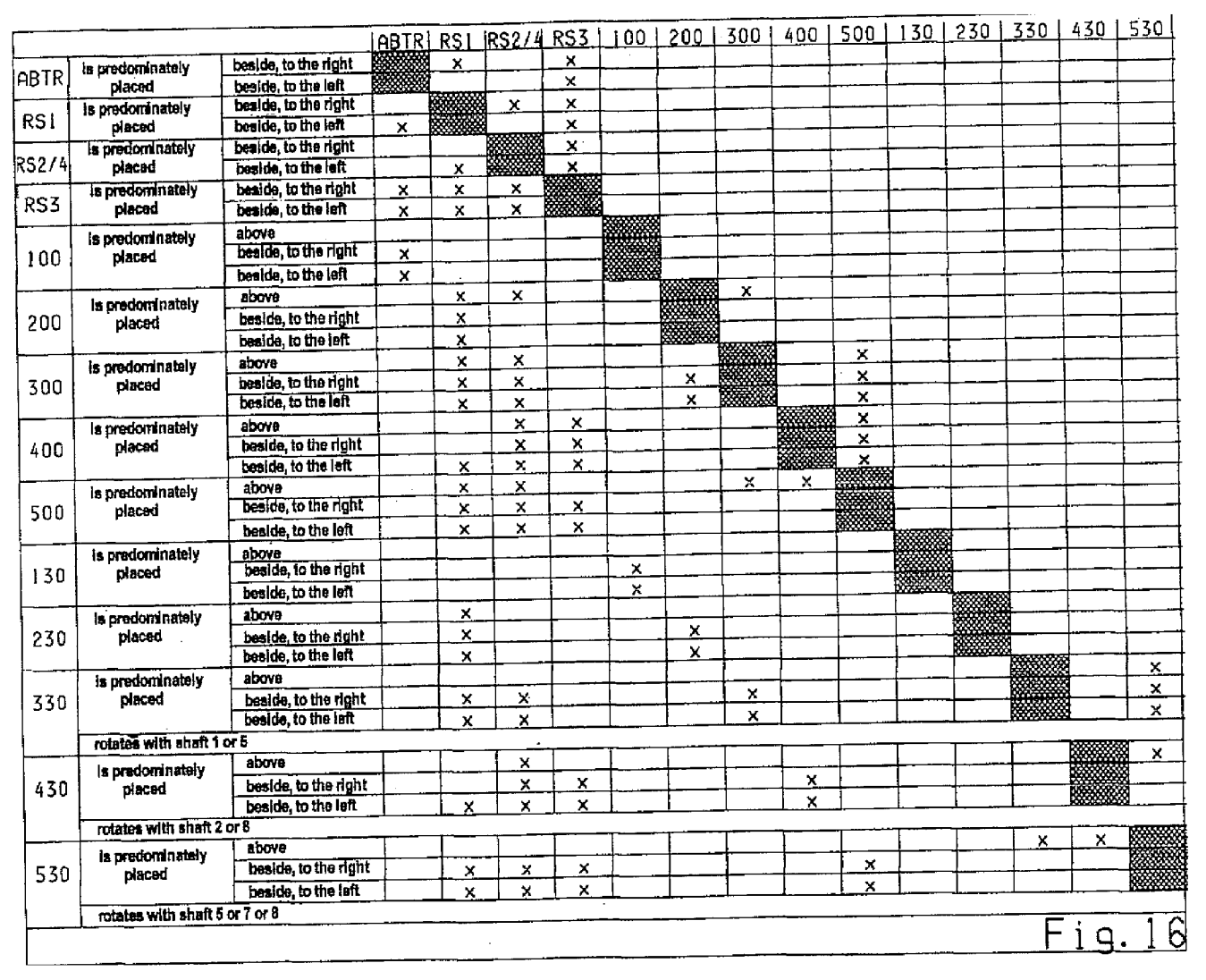

FIG. 16 is a table of an overview of advantageous spatial arrangements of transmission elements in relation to one another;

FIG. 28 is an exemplary fourth component variation for the multi-speed transmission in accord with FIG. 12, i.e., FIG. 13.

DETAILED DESCRIPTION OF THE INVENTION

Figure 1:
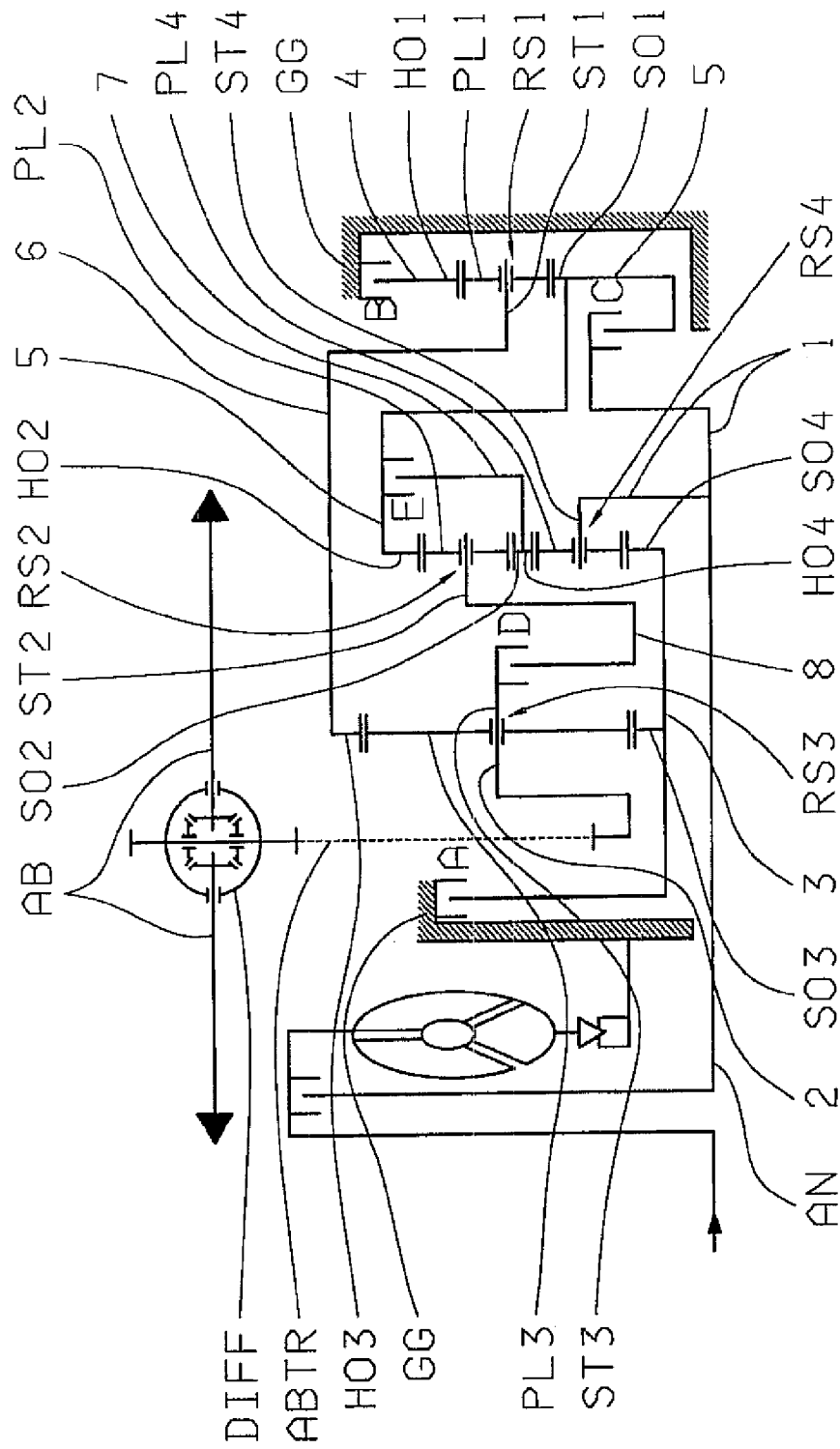
FIG. 1 is a schematic presentation of a first embodiment example of an inventive multi-speed transmission.

FIG. 1 presents a first embodiment of an inventive multi-speed transmission. The transmission comprises one input shaft AN and one output shaft AB, as well as four planetary gearsets RS1, RS2, RS3, RS4 and five shifting elements A, B, C, D, E, all of which are enclosed in a housing GG of the transmission. All four planetary gearsets RS1, RS2, RS3, RS4 are designed as minus-planetary gearsets. A negative-planetary gearset, as is known, possesses planet gears, which mesh with sun and ring gears of the corresponding planetary gearset. The ring gears of the four planetary gearsets RS1, RS2, RS3, RS4 are designated as HO1, HO2, HO3 and HO4, the sun gears are referred to as SO1, SO2, SO3 and SO4 and the planet gears have the reference numbers PL1, PL2, PL3 and PL4. The carriers on which the above planet gears rotate are designated ST1, ST2, ST3 and ST4. The shifting elements A and B are designed as brakes which, in this embodiment, are both built as frictionally shiftable disk brakes in a case designed otherwise, these could also be frictionally shiftable band brakes, even shape-fit grab or conical brakes. Shifting elements C, D and E are constructed as clutches which, in this embodiment, are all frictionally shiftable disk operated clutches. Obviously, in a case of a different design, these could appear as shape-fit grab or conically designed clutches.

With these five shifting elements A to E, selective shifting makes eight forward gear ratios and at least one reverse gear ratio possible. The inventive multi-speed transmission possesses a total of eight rotatable shafts, namely 1 to 8.

With regard to the kinematic coupling of the individual elements of the four planetary gearsets RS1, RS2, RS3, RS4 among each other and with the input/output shafts AN, AB, in the case of the multi-speed transmission according to FIG. 1, the following evolves. The carrier ST4 of the fourth planetary gearset RS4 and the input shaft AN are connected in a rotationally fixed manner to one another and form the first shaft 1 of the transmission. The carrier ST3 of the third planetary gearset RS3 and the output shaft AB are bound together and form the second shaft 2 of the transmission, between the carrier ST3 and the output shaft AB, an output stage ABTR (hereinafter an output stage), designed with a differential DIFF are kinematically interposed. The sun gear SO3 of the third planetary gearset RS3 and the sun gear SO4 of the fourth planetary gearset RS4 are rotationally fixed to one another and form the third shaft 3 of the transmission. The ring gear HO1 of the first planetary gearset RS1 forms the fourth shaft 4 of the transmission. The ring gear HO2 of the second planetary gearset RS2 and the sun gear SO1 of the first planetary gearset RS1 are connected in a rotationally fixed manner to one another and form the fifth shaft 5 of the transmission. The carrier ST1 of the first planetary gearset RS1 and the ring gear HO3 of the third planetary gearset RS3 are connected in a rotationally fixed manner and form the sixth shaft 6 of the transmission. The sun gear SO2 of the second planetary gearset RS2 and the ring gear HO4 of the fourth planetary gearset are connected in a rotationally fixed manner and form the seventh shaft 7 of the transmission. The carrier ST2 of the second planetary gearset forms the eighth shaft 8 of the transmission.

With regard to the coupling of the five shifting elements A to E with the above described shafts 1 to 8 of the transmission, in the case of a multi-speed transmission according to FIG. 1, the following is provided. The first shifting element A is placed in the power flow, between third shaft 3 and the transmission housing GG. The second shifting element B is placed in the power flow, between the fourth shaft 4 and the transmission housing GG. The third shifting element C is placed in the power flow, between the fifth shaft 5 and the first shaft 1. The fourth shifting element D is placed in the power flow, between the eighth shaft and the second shaft 2. The fifth shifting element E, finally, is placed in the power flow, between the seventh shaft 7 and the fifth shaft 5.

If the fifth shifting element E is engaged, then the second planet gearset RS2 is internally interlocked, i.e., the sun gear SO2 and the ring gear HO2 of the second planetary gearset RS2 rotate at identical speeds of rotation. It will be immediately evident to the expert that this described condition can also be achieved by way of a kinematic connection of the clutch E and the second planetary gearset RS2 rather than that shown in FIG. 1. Corresponding thereto, in another arrangement of the transmission, provision can be made such that the clutch E, contrary to the position shown in FIG. 1, can be placed in the power flow, between the carrier ST2 and the ring gear HO2 of the second planetary gearset RS2 thus in the power flow, between the shaft 8 and the shaft 5 of the transmission, between the carrier ST2 and the sun gear SO2 of the second planetary gearset RS2 or between the shaft 8 and the shaft 7 of the transmission.

In the embodiment set forth in FIG. 1, the third planetary gearset RS3 is located on that side of the transmission proximal to the input of the transmission and the first planetary gearset RS1 is found on that side of the transmission opposite the input of the transmission. In this arrangement, the input shaft AN and the output shaft AB of the transmission are axis parallel to one another. The second and the fourth planetary gearsets RS2, RS4, as seen in the axial direction, are in plane and located, one above the other. That is to say, are nested radially within each other in such a manner that the fourth planetary gearset RS4 is located centrally within the second planetary gearset RS2. Accordingly, the ring gear HO4 of the radially inner planetary gearset RS4 and the sun gear SO2 of the radially outer planetary gearset RS2 are combined in a common one-piece component. The planetary gear group RS2, RS4 is, when view spatially, located in an area axially aligned between the other two planetary gearsets RS3, RS1.

The output stage ABTR, required in the connection of the axis-parallel arrangement of the input shaft and the output shaft AN, AB, in the presented embodiment, is placed proximally to the input side. This is seen here, in a spatial conception, as axially bordering directly on the third planetary gearset RS3, on that side thereof which is remote from the two radially, nested planetary gearsets RS2, RS4. In the illustrated embodiment, this output stage ABTR, with spatial considerations, is seen to be at least partially set axially between the planetary gearset RS3 and brake A. Brake A is located in the area of the transfer outer wall of the transmission housing GG. Again, in the depicted transmission arrangement, a torque converter is shown as a startup element, which lies in the power flow, between the input shaft AN in FIG. 1 and the drive motor (which drive motor, for the sake of simplicity is not shown) and is spatially located in axial alignment between the housing wall and the drive motor. Correspondingly, the transfer, third planetary gearset RS3 is centrally and axially penetrated only by the input shaft AN, i.e., shaft 1, of the transmission. Since the shaft 3 binds together the sun gears SO3, SO4 of the third and the fourth planetary gearsets RS3, RS4, and further, the input shaft AN, i.e., shaft 1, to which the side of the fourth planetary gearset RS4, remote from the third planetary gearset RS3, is bound by way of the carrier ST4 of the fourth planetary gearset RS4. Also the fourth planetary gearset RS4 is fully and completely passed through by the input shaft AN, i.e., shaft 1 of the transmission, in a central and axial direction. On the other hand, the first planetary gearset RS1 is centrally and axially penetrated by no shaft of the transmission. Obviously, it is possible, that in another embodiment of the transmission, provision can be made, that the drive motor of the transmission be placed on that side of the transmission, upon which the first planetary gearset RS1 is located where, in this case, the output stage ABTR would be placed on that side of the transmission, opposite from the input thereof, and consequently, only the first planetary gearset RS1 would be centrally and axially passed through by the input shaft AN, i.e., shaft 1 in the axial and central direction and the third and fourth planetary gearsets RS3, RS4 would be passed through by no shaft of the transmission.

As may be seen in FIG. 1, with respect to spatial consideration, brake A is placed in an area proximal to the third planetary gearset RS3. However, spatially considered, brake A is separated from the planetary gearset RS3 by an output stage ABTR which is bound to the carrier ST3 of the third planetary gearset RS3. Correspondingly, the shaft 3, which, sectionally serves as an inner disk carrier for retention of the inward toothed, steel disks of the disk set of brake A, is connect in a rotationally fixed manner to the input shaft AN, i.e., shaft 1. Obviously, it is possible that the output stage ABTR, shown in FIG. 1, is connected in a rotationally fixed manner directly to a transmission housing seated hub. The outer disk carrier of the brake A, which retains the outward toothed coated disks of the disk set of brake A, in a very simple manner, could be integrated into the transmission housing GG, i.e., integrated into the wall thereof. Obviously, this could also be rendered as a separate component which, under these circumstances, would be connected in a rotationally fixed manner with the transmission housing GG, i.e., with the wall thereof. A servo apparatus (not shown in greater detail in FIG. 1) intended for the activation of the disk set of brake A in a well designed manner, can be integrated into the outer disk carrier of brake A in an axially slidable manner.

In the embodiment depicted in FIG. 1, seen in consideration of spatial demands, brake B is placed to be proximal to the first planetary gearset RS1. In this arrangement, a disk set of brake B, considered with attention to its spatial layout, is at least placed partially radially above the first planetary gearset RS1. A section of the shaft 4 is designed to serve as an inner disk carrier for the retention of the disks of the disk set of the brake B, which have been constructed of steel and possess inwardly extending teeth. It is possible that the inner disk carriers of brake B and the ring gear HO1 of the first planetary gearset RS1 can be constructed as common, one-piece components. The outer disk carrier of brake B, serving for the retention of the outwardly extending toothed disks of the disk set of brake B, in a simple manner, can be integrated into the transmission housing GG. Obviously, however, these can be made as separate entities, which then can be connected in a rotationally fixed manner to the transmission housing GG. A servo apparatus (not described in FIG. 1 in more detail) for the actuation of the disk set of brake B, in a well designed manner, can be integrated into the outer disk carrier of brake B, i.e., be axially and slidably fixed onto the outer disk carrier of brake B.

As may be further seen in FIG. 1, the clutches C and E, with respect to the spatial conditions, are placed in an area located axially, between the first planetary gearset RS1 and the two nested planetary gears RS2, RS4. In the illustrated embodiment, the clutch C directly and axially neighbors the first planetary gearset RS1, while the clutch E directly and axially neighbors the second planetary gearset RS2. In this case, the disk sets of these two clutches C, E, at least essentially, are located axially next to one another, except placed at different diameters. In this arrangement, the disk set of the clutch E is placed on a comparatively greater diameter, somewhat in the area of the ring gear HO2 of the (radial outer) second planetary gearset RS2. The disk set of the clutch C is located at a comparatively smaller diameter, approximately in the area of the sun gear SO1 of the first planetary gearset RS1.

In the present embodiment, a section of the shaft 5 is shown as an outer disk carrier for retaining disks of the disk set of the clutch E; the disks of which are coated and possess outward extending teeth. Correspondingly, a section of the shaft 7 serves as an inner disk carrier for retaining the steel, inward toothed disks of the disk set of the clutch E. The inner disk carrier of the clutch E and the sun gear SO2 of the second planetary gearset RS2 can be made as a one-piece, common component. A section of the shaft 5 in the area of the sun gear SO1 of the first planetary gearset is rotationally connected to a transmission housing fixed hub. A servo apparatus (for the sake of clarity, is not shown in further detail in FIG. 1) serves for the activation of the disk set of the clutch E, in an advantageous manner, can be axially mounted in a sliding way on the outer disk carrier of the clutch E. Further, the disk set assigned thereto, upon the closure of the clutch E, is activated axially in the direction of the second planetary gearset RS2. When this occurs, then the servo apparatus rotates at the same speed as the shaft 5. Advantageously, the servo apparatus of the clutch E also possesses a way for a dynamic pressure compensation. Feeds for pressure and lubrication media to the clutch E, in a well designed, relatively simple manner, can be carried out by appropriate borings, i.e., transport conduits from the input shaft AN.

Further, in the presented embodiment, a section of the shaft 1 is designed to serve as an outer disk carrier to retain the coated, outward toothed disks of the disk carrier set of the clutch C. Correspondingly, a section of the shaft 5 is designed to serve as an inner disk carrier to retain the steel, inward toothed disks of the disk set of the clutch C. A servo apparatus (for the sake of clarity is not shown in detail in FIG. 1) operates to actuate the disk set of the clutch C and it is possible, in a well designed manner, this can be mounted slidably and axially on the outer disk carrier of the clutch C. The disk set, assigned thereto, upon the engagement of the clutch C, is actuated axially in the direction of the first planetary gearset RS1. In this case, then the servo apparatus will rotate continually at the same speed of rotation as the input shaft AN. As a result of this design, the servo apparatus of the clutch C possesses dynamic pressure compensation. Feeds for the pressure and lubrication media to the clutch C, in a well designed, relatively simple manner, can be carried out simply by the transmission housing fixed hub, onto which the sun gear SO1 of the first planetary gearset RS1, i.e., shaft 5, is also connected in a rotationally fixed manner.

Additionally, as seen in FIG. 1, the clutch D, when spatially considered, is placed axially, between the third planetary gearset RS3 and the two radially, mutually nested planetary gearsets RS2, RS4, thus directly neighboring the third planetary gearset RS3. In the present version of the embodiment of the present invention, a section of the shaft 2 is shown to be designed as an outer disk carrier for retaining the coated, outward toothed disks of the disk set of the clutch D. Correspondingly, a section of the shaft 8 serves as an inner disk carrier for retaining the steel, inward toothed disks of the disk set of the clutch D. Carrier ST3 of the third planetary gearset RS3 and the outer disk carrier of the clutch D can be constructed as a single, common component. The inner disk carrier of the clutch D, i.e., the shaft 8, in a well designed manner, can be rotationally mounted on the shaft 3. A servo apparatus (not shown in greater detail in FIG. 1 for the sake of simplicity) intended for actuating the disk set of the clutch D, in an appropriate simple manner, can be mounted to be axially slidable on the outer disk carrier of the clutch D. The disk set, which is assigned thereto, upon the engagement of the clutch D, is biased axially in the direction of the second planetary gearset RS2. In this case, the servo apparatus then continually rotates at the same rotational speed as the output shaft AB, i.e., shaft 2. Obviously, the servo apparatus of the clutch D also possesses dynamic pressure compensation. Feeds for the pressure and lubrication media to the clutch D, in a well designed, relatively simple manner, can be effected simply by the shaft 3 and the transmission housing bound hub onto which hub the shaft 3 is also rotationally attached.

Considering now the spatial arrangement, presented in FIG. 1, particularly of the three clutches C, D, E, the results which arise are that the first shaft 1 runs sectionally and centrally within the third shaft 3 and further the first shaft 1 runs sectionally and centrally within the fifth shaft 5; the third shaft 3 runs sectionally and centrally within the eighth shaft 8 and also runs sectionally and centrally within the second shaft 2; the fifth shaft 5 overlaps the clutch C in an axial and radial direction; the sixth shaft 6 overlaps the clutches C, E and D, as well as the second planetary gearset RS2, all in an axial and radial direction.

FIG. 2 depicts an exemplary diagram of shift-logic for the inventive multi-speed transmission of FIG. 1. In each gear ratio, three shifting elements are shown as engaged and two shifting elements are shown as disengaged. Besides the shifting logic, it is also possible that further information for the values of the respective ratios i of the individual gear ratio steps and the step-spring φ can be inferred therefrom. The given ratios i are derived from the typical stationary ratios of the four planetary gearsets RS1, RS2, R3, RS4. Their values are, respectively, negative 2.70, negative 1.55, negative 3.35, negative 2.20. Because of the fact, that in the present case, the stationary ratio of the second planetary gearset RS2, so far as value goes, is comparatively small and, simultaneously, the stationary ratio of the fourth planetary gearset RS4, on the same basis, is comparatively large, then a predictable basis for the inventive radial arrangement of the second and the fourth planetary gearsets establishes that since the stationary ratio of the second planetary gearset RS2 is approximately negative 1.55, this makes possible the use of a sun gear SO2 of a comparatively large diameter possible without the disadvantage that the planet gears PL2 of the second planetary gearset RS2 rotate at too high a speed of rotation; the stationary ratio of the planetary gearset RS4, being about negative 2.2 enables the use of a ring gear HO4 with a comparatively small diameter and avoids a disadvantage that the sun gear SO4, and the planet gears PL4 of the fourth planetary gearset RS4, on the basis of a too-small diameter, are unable to transmit the required torques.

Further, the shift-logic diagram provides the information that shows when sequential shifting takes place the operation of range shifting is avoided since two neighboring gear ratios in the shifting logic are commonly used. The sixth gear ratio is advantageously designed as a direct gear ratio.

The first forward gear ratio occurs, upon engaging of brakes A and B and the clutch C; the second forward gear ratio takes place upon the engagement of brakes A and B and the clutch E; the third forward gear ratio results with engagement of brake B and the clutches C and E, the fourth forward gear ratio is attained by engagement of brake B and the clutches D and E; the fifth forward gear ratio is reached by engagement of brake B and the clutches C and D; the sixth forward gear ratio occurs upon engagement of the clutches C, D and E; the seventh forward gear ratio is acquired by engagement of the brake A and the clutches C and D and, finally, the eighth forward gear ratio results with engagement of brake A and the clutches D and E. As the shift-logic diagram further shows, the reverse gear ratio occurs with engagement of brakes A and B and the clutch D.

Initiating drive of the motor vehicle is possible with the use of a shifting element integrated in the transmission. In this case, a shifting element is especially well suited for this purpose, when it is required in both the first forward gear ratio as well as in the reverse gear ratio. To fulfill this requirement, advantageously brake A or brake B could be utilized. In an advantageous manner, these two brakes A, B are necessary even in the second forward ger stage. If brake B is employed as a transmission-integrated startup element, then drive initiation in the first five forward gear ratios is possible as well as in the reverse gear. As may be seen in the shift-logic diagram for starting forward travel, the clutch C can be used. For starting in the reverse direction, the clutch D can be used as a transmission integrated startup element.

Figure 3:
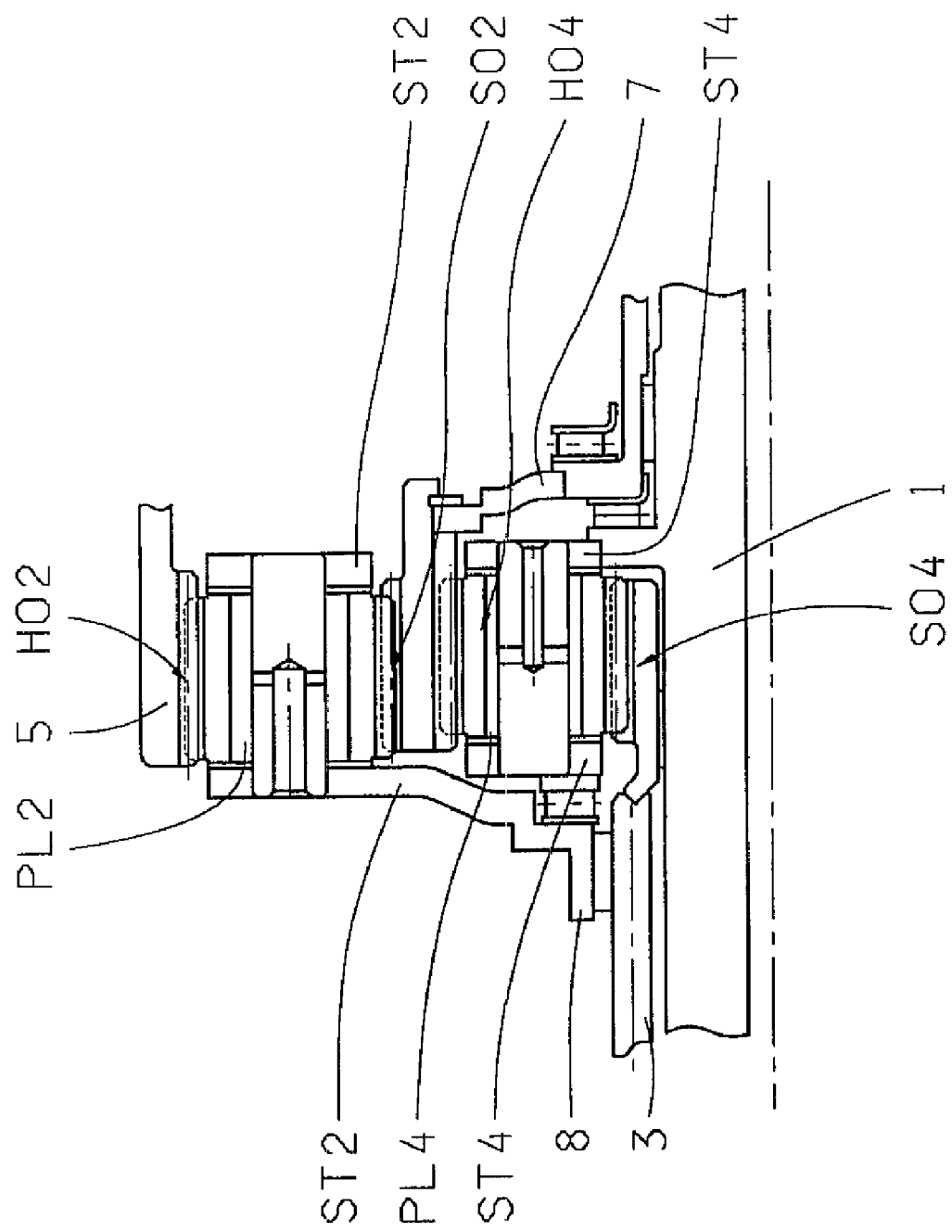
FIG. 3 is an exemplary detailed design for the multi-speed transmission of FIG. 1.

FIG. 3 shows an exemplary detailed design of the inventive multi-speed transmission as presented in FIG. 1, which emphasizes the planetary gearset assembly formed by the planetary gearsets RS2, RS4. As has already been described, these two planetary gearsets RS2, RS4 are radially nested, one within the other, with the fourth planetary gearset RS4 is at least essentially centrally enclosed within the second planetary gearset R32 and where the sun gear SO2 of the radially outer planetary gearset RS2 is bound to the ring gear HO4 of the radially inner fourth planetary gearset RS4. In FIG. 3, this detailed design for the inventive multi-speed transmission, the sun gear SO2 and the ring gear HO4 are combined into a one-piece component. In this way, it is possible for the planetary gearset to have the advantage of a reduced radial installation space.

In another design embodiment showing the sun gear SO2 and the ring gear HO4, differing from FIG. 3, based on acoustic grounds, it is possible to have the sun gear SO2 and the ring gear HO4 made as separate components and bound to one another, such that they would be connected in a rotationally fixed manner or, alternately, connected in a rotation-elastic manner. In this way, it is possible for acoustic engagement to place elastic-interposed layers in a radial manner between the sun gear SO2 and the ring gear HO4.

The spatial arrangement of the shifting elements within the inventive multi-stage transmission, as presented in FIG. 1, in principal, can be optional and limited only by the overall dimensioning and the outer shaping of the transmission housing GG. Correspondingly, in the following, where FIGS. 4 to 11 are concerned, some examples of possible component arrangements for the multi-stage transmission, according to FIG. 1, are explained. In FIGS. 4 to 11, respectively, all kinematic couplings of the planetary gearsets, shifting elements and shifts are unchanged from those of FIG. 1.

Figure 4:
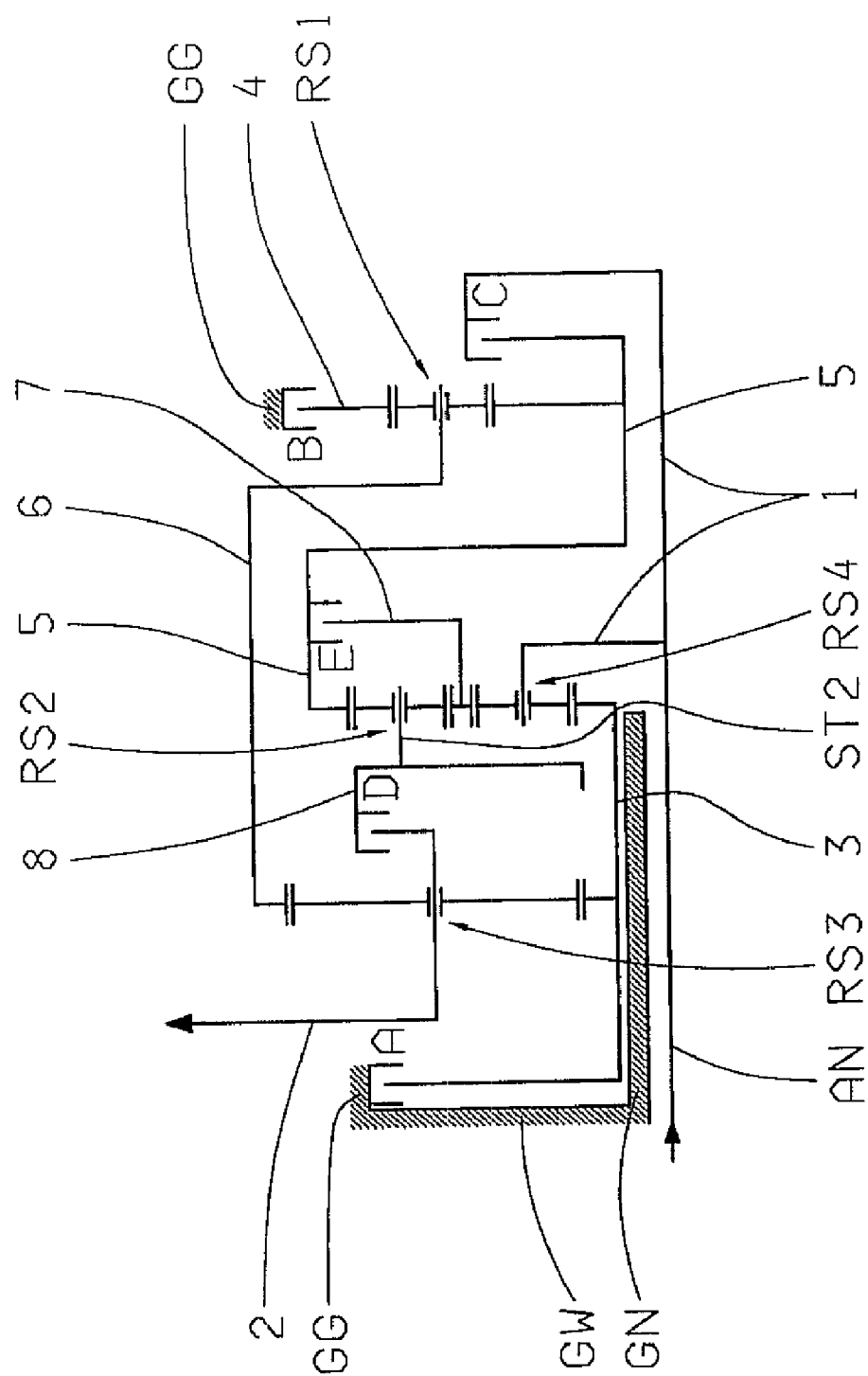
FIG. 4 is an exemplary first arrangement of components for the multi-speed transmission of FIG. 1.

FIG. 4 shows a first component variation, of the multi-stage transmission, according to FIG. 1. The essential changes in relation to FIG. 1 concern the spatial positioning of the clutch C and the location of the clutch D. As may be seen in FIG. 4, the clutch C, when viewed spatially, is now on that side of the first planetary gearset RS1, which lies opposite the planetary gearset assembly comprised of two mutually nested planetary gearsets RS2 and RS4. Accordingly, the clutch C, or more exactly, the disk set of the clutch C, now axially borders the first planetary gearset RS1. In the presented version, the disk set of the clutch C, is placed on a comparatively small diameter. Obviously, it is possible that the clutch C can also be placed on a larger diameter. In the present embodiment, a section of the shaft 1 is designed as an outer disk carrier for the clutch C. Correspondingly, a section of the shaft 5 appears as an inner disk carrier of the clutch C. A servo apparatus (not further described in FIG. 4) for the activation of the disk set of the clutch C, in a simple manner, can be axially and slidably placed on the outer disk carrier of the clutch C. Consequently, this servo apparatus will then continually rotate at the same speed of rotation as the input shaft AN, i.e., shaft 1, and bias this disk set upon engaging the clutch C in the direction of the first planetary gearset RS1. The pressurized fluid supply to a pressure chamber of the servo apparatus of the clutch C and the lubricant feed to a pressure compensation chamber, which compensates for the rotational pressure generated in the rotating pressure chamber of the servo apparatus, can be delivered in a satisfactory manner through appropriate borings, i.e., transport conduits in the input shaft AN from the shaft 1.

As is further evident in FIG. 4, differing from FIG. 1, a section of the shaft 8 serves as an outer disk carrier of the clutch D. This outer disk carrier for the clutch D and the carrier ST2 of the second planetary gearset RS2 can be combined as a one-piece component. Additionally, the outer disk carrier of clutch D, i.e., the carrier ST2, as spatially permitted, is axially aligned and connected in a rotationally fixed manner on the shaft 3, in an area of the transmission between the planetary gearsets RS3 and RS4. A servo apparatus (not further described in FIG. 4) and used to actuate the disk set of the clutch D is advantageously slidably secured on the outer disk carrier of the clutch D, where it must rotate continually at the rotational speed of the shaft 8, i.e., at the rotational speed of the carrier ST2 and bias its assigned disk set upon engagement of the clutch D in the direction of the third planetary gearset RS3. The pressurized fluid supply to a pressure chamber of the servo apparatus of the clutch D and the lubricant feed to a pressure compensation chamber, which compensates for the rational pressure generated in the rotating pressure chamber of the servo apparatus can be delivered in a satisfactory manner through appropriate borings, i.e., transport conduits from a transmission housing attached to the hub and the shaft 3.

In another detailed design, a mounting is indicated in FIG. 4, where the shaft 3 is placed directly on a transmission housing attached hub GN, which extends radially from an outer wall GW of the transmission housing GG then axially toward the third and fourth planetary gearsets RS3, RS4 within the interior of the transmission.

Figure 5:
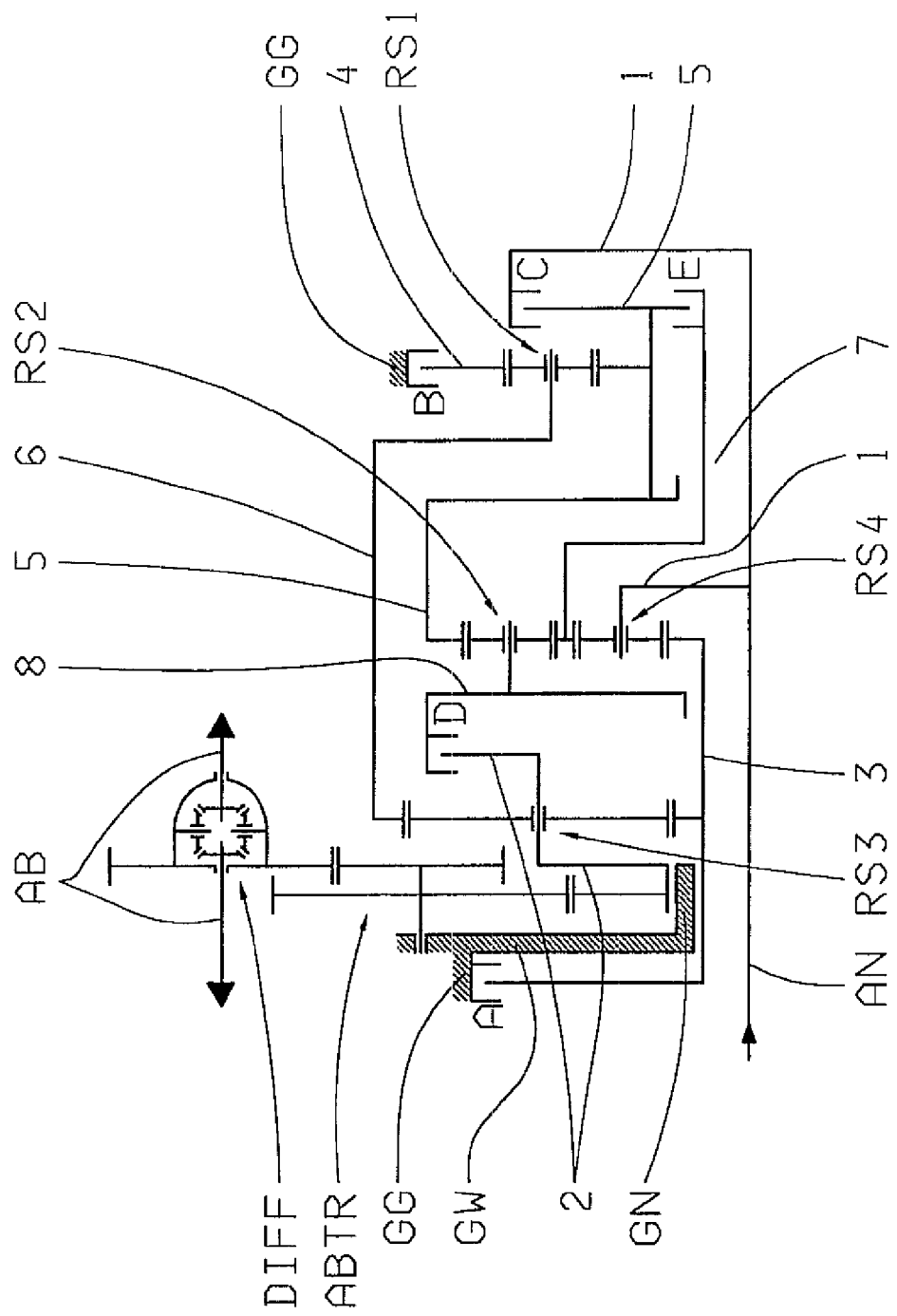
FIG. 5 is an exemplary second arrangement of components for the multi-speed transmission of FIG. 1.

FIG. 5 shows a second component variation of the multi-speed transmission as shown in FIG. 1, wherein this variation is biased to conform with the variation-component orientation according to FIG. 4. Consequently, in FIG. 4, the clutch E, which furnishes the shiftable connection between the shafts 5 and 7 of the transmission, when spatially considered, is now at least partially on the side of the first planetary gearset RS1 remote from the planetary gearset assembly formed by the planetary gearsets RS2 and RS4. In this case, the disk set of the clutch E, when spatially viewed, is placed at least somewhat radially beneath the disk set of the clutch C so that, to simplify the mounting, a common disk carrier can be provided for the clutches E and C. In the embodiment shown in FIG. 5, a section of the shaft 7 serves as an inner disk carrier for the clutch E; advantageously for the retention of inward toothed steel disks of the disk set of the clutch E, and is connected in a rotationally fixed manner to the shaft 1. Correspondingly, a section of the shaft 5 is designed to serve as an outer disk carrier of the clutch E; advantageously for the retention of outward toothed coated disks of the disk set of the clutch E, and connected in a rotationally fixed manner to the shaft 7. A servo apparatus (not further described in FIG. 5 for the sake of simplicity) for actuating the disk set of the clutch E is connected in a rotationally fixed manner onto the inner disk carrier of the clutch E, such that it always rotates with the same speed of rotary motion as the shaft 7. The actuation movement of this servo apparatus upon the engagement of the clutch E, respectively, and according to the spatial positioning of itself, can be axially directed toward the fourth planetary gearset RS4, i.e., away from the output stage ABTR.

In another embodiment of the component grouping of the two clutches C and E, provision can also be made, to the effect that for these two clutches C, E, a common disk carrier is axially and slidably served by the servo apparatus of the two clutches C, E, where this common disk carrier, in a deviation from FIG. 5, then functions as an inner and an outer disk carrier advantageously for the retention of steel disks of the disk set of the clutch C and as an outer or an inner disk carrier advantageously for the retention of steel disks of the disk set of the clutch E. In accord with the spatial limitations and the design of the servo apparatuses as of the clutches C, E, it is possible that their activation direction can be equally set between the two or, contrarily, oppositely set between the two.

Additional design details shown in FIG. 5 are the manner of which the shaft 3 of the transmission in mounted directly onto the input shaft AN and a connection of a driven spur gear, which is rotationally bound to the shaft 2, to a transmission housing secured hub GN of the output stage ABTR. The transmission housing secured hub GN extends axially away from a radially outer wall GW of the transmission housing GG in the direction of the third and fourth planetary gearsets RS3, RS4 within the transmission interior.

Figure 6:
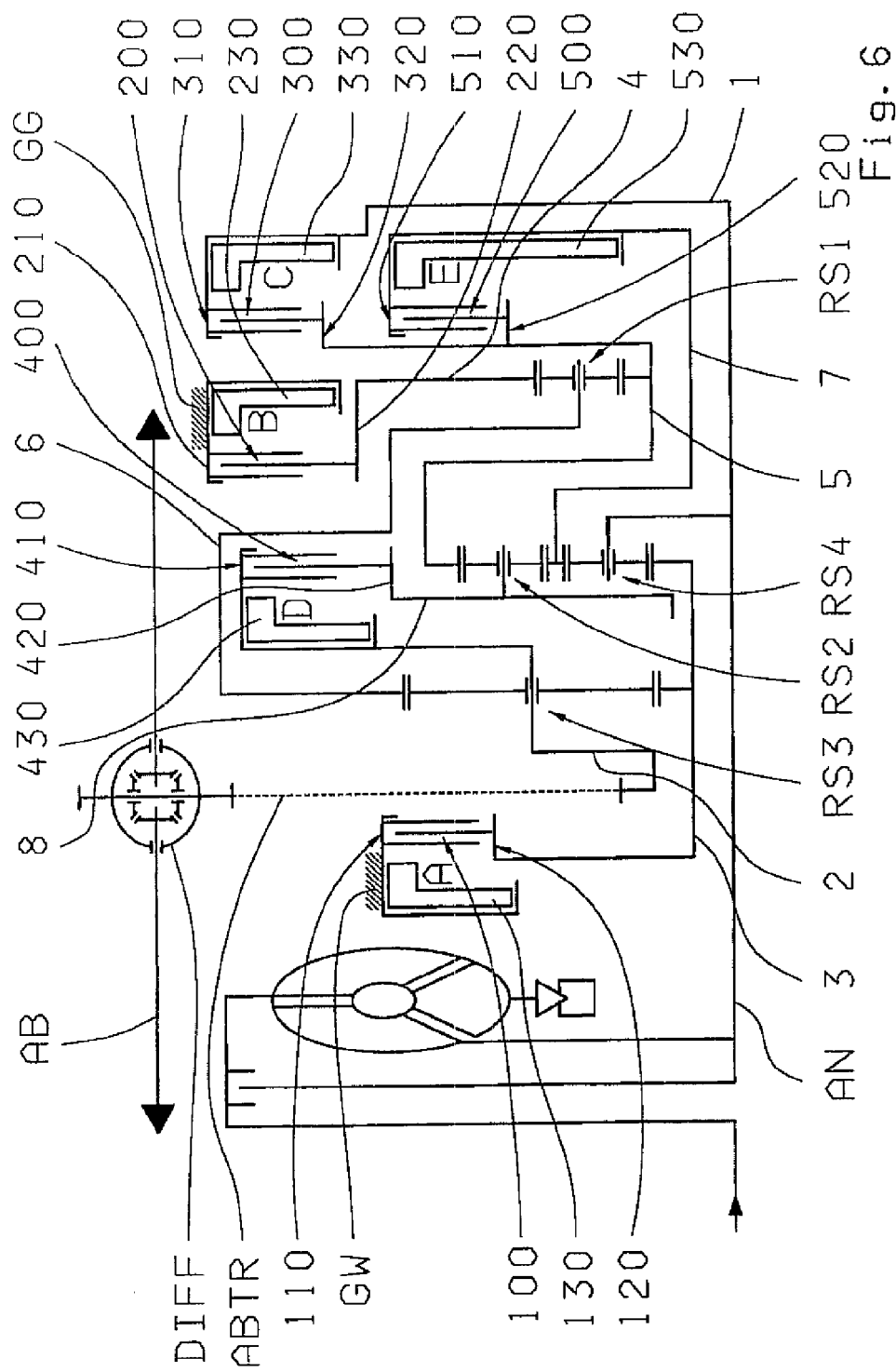
FIG. 6 is an exemplary third arrangement of components for the multi-speed transmission of FIG. 1.

FIG. 6 shows a third component variation, based on the multi-speed transmission as depicted in FIG. 1, and revised in accord with the presentation thereof shown in the variation of FIG. 5. The essential difference from the arrangement of FIG. 5 is found in the spatial positioning of the disk set of brake B, the designed assembly of the clutch D, the spatial placement of the disk set of the clutch D, and finally, the design location of the clutch E. Beyond the above items, additionally, servo apparatuses of all five shifting elements, namely A to E, are schematically included in the drawing.

In FIG. 6, a disk set of brake A is designated with the reference number 100 and comprises, advantageously, outer disks prepared as steel disks, and also inner disks prepared as coated disks. When viewed spatially, the disk set 100 borders in an axial manner the output stage ABTR, which forms a portion of the shaft 2 of the transmission. An outer disk carrier of brake A, designated as 110 and is integrated in a transmission housing fixed wall GW but however, can be designed as a separate component, which is connected in a rotationally fixed manner to the housing wall GW or, more exactly, to the transmission housing wall GG. An inner disk carrier of brake A is designed as 120 and forms a section of the shaft 3 of the transmission. The servo apparatus, designated as 130, for actuating the disk set 100 of brake A is placed on that side of the disk set 100, remote from the third planetary gearset RS3, i.e., is axially and slidably secured on the housing wall GW, which here forms the outer disk carrier 110 of brake A, and bias its assigned disk set 100, upon engagement, in the direction of the output stage ABTR, i.e., axially in the direction of the planetary gearset RS2.

Further, a disk set of brake B, designated in FIG. 6 as 200, advantageously, comprises outer steel disks and also inner coated disks. Spatially positioned, the disk set 200 of brake B is now in an area axially situated, between the first and the second planetary gearsets RS1, RS2 and, on a diameter which is greater than the outside diameter of the second planetary gearset RS2. An outer disk carrier of brake B, designated as 210, is integrated within the transmission housing GG, however, this obviously can also be rotationally bound with the transmission housing GG to make an integral component of the transmission. An inner disk carrier of brake B, designated with 220, forms a section of the shaft 4 of the transmission. The servo apparatus for the actuation of the disk set 200 of brake B is shown as 230. When spatially viewed, the servo apparatus 230 is placed on that side of the disk set 200, remote from the second planetary gearset RS2 and partially in an area radially located above the first planetary gearset. In this arrangement, the servo apparatus 230 is axially slidably mounted on the transmission housing GG which, in this case, forms the outer disk carrier 210 of brake B, and bias its assigned disk set 200, upon engagement, in the direction of the output stage ABTR, i.e., in the direction of the planetary gearset RS2.

A disk set of the clutch C, designated in FIG. 6 as 300 comprises outer disks which are of steel and inner disks which are coated. When spatially considered, the disk set 300 of the clutch C—similar to the situation of FIG. 5—is placed on that side of the first planetary gearset RS1 remote from the combined planetary gearsets RS2 and RS4. However, differing from FIG. 5, the disk set 300 is located upon a greater diameter than the outer diameter of the first planetary gearset RS1. An outer disk carrier of the clutch C is referred to as 310, forms a section of the shaft 1 of the transmission. The servo apparatus for the actuation of the disk set 300 of the clutch C is designated as 330. Within a cylindrical space created by the outer disk carrier 310, this inner disk carrier 320 is placed on the side of the disk set 300 remote from the first planetary gearset RS1 and is axially and slidably mounted on the outer disk carrier 310 and further biases its assigned disk set 300, upon engagement, in the direction of the output stage ABTR, i.e., axially in the direction of the planetary gearset RS1.

A disk set of the clutch D, designated in FIG. 6 as 400 comprises steel outer disks as well as coated inner disks. When spatially considered, the disk set 400 of the clutch D (here in a design differing from that of FIG. 5) is located at least predominately in an area radially placed above the second planetary gearset RS2. An outer disk carrier of the clutch D, designated as 410, forms a section of the shaft 2 of the transmission. An inner disk carrier of the clutch D, designated as 420, forms a section of the shaft 8 of the transmission. The servo apparatus for actuating the disk set 400 of the clutch D is designated as 430. When spatially considered, this servo apparatus 430 is axially located between the planetary gearsets RS3 and RS2, within a cylindrical space of the outer disk carrier 410, on that side of the disk set 400 proximal to the third planetary gearset RS3. In this arrangement, the servo apparatus 430 is placed on the outer disk carrier 410 in an axial and slidable manner an actuates the disk set 400 which is thereto assigned. The actuation is initiated by engagement and is moved in an axial direction opposite from the output stage ABTR and the third planetary gearset RS3.

A disk set of the clutch E, designated in FIG. 6 as 500, possesses outer disks of steel construction and, likewise, inner disks having coatings. When spatially considered, the disk set 500 of the clutch E—similar to that of FIG. 5—is placed at least predominately radially under the disk set 300 of the clutch C. Differing in this respect from FIG. 5, the placement is upon a diameter somewhat greater than that of the first planetary gearset RS1. Again, in differentiation to FIG. 5, in this case, an outer disk set 510 of the clutch E forms a section of the shaft 7 of the transmission. Correspondingly, an inner disk set 520 of the clutch E forms a section of the shaft 5 of the transmission. The servo apparatus for the actuation of the disk set 500 of the clutch E is designated as 530. Observed with consideration for its spatial positioning, this servo apparatus 530 is placed within a cylindrical space devoted to the outer disk carrier 510 and is on that side of the disk set 500 remote from the first planetary gearset RS1. In this arrangement, the servo apparatus 530 is slidably and axially mounted on the outer disk carrier 510 and biases the disk set 500, which is assigned to it, by sliding in the axial direction of the outer stage ABTR, i.e., in the direction of the planetary gearset RS1.

Figure 7:
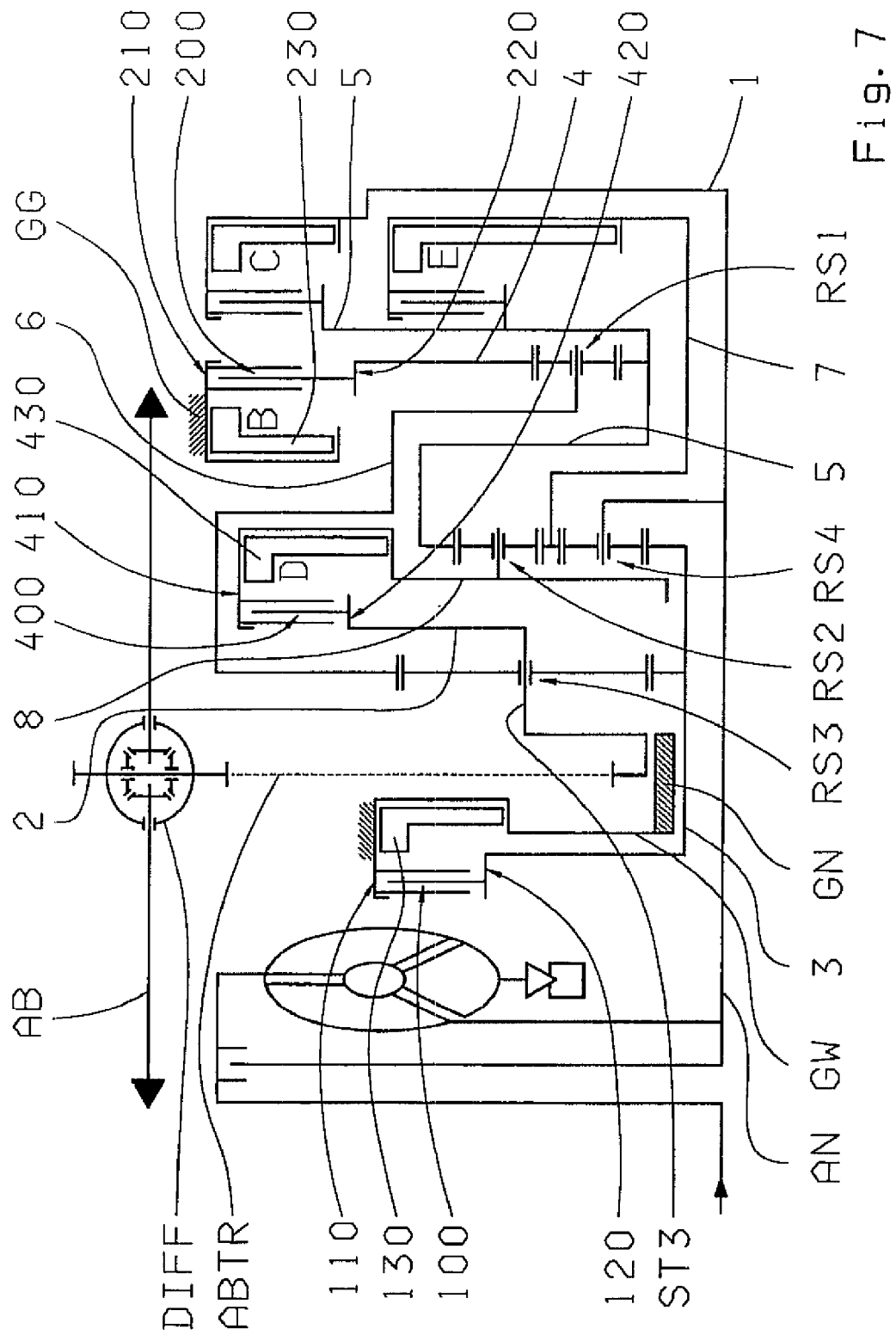
FIG. 7 is an exemplary fourth arrangement of components for the multi-speed transmission of FIG. 1.

FIG. 7 demonstrates a fourth component variation of the inventive multi-speed, automatic transmission according to the principles of FIG. 1, however, incorporating some of the variations shown for FIG. 6. The essential difference from FIG. 6 exists in the positional arrangement of the servo apparatus 130, 230, 430 related to the shifting elements A, B, C and the activation apparatus for the servo apparatuses 130, 230, 430 upon the engaging of the respective disk sets 100, 200, 400.

As may be seen in FIG. 7, the servo apparatus 130 of brake A is now located on that side of its assigned disk set 100 of brake A, proximal to the output stage ABTR; this being also proximal to the third planetary gearset RS3. Correspondingly, the transmission housing fixed housing wall GW, which simultaneously forms the outer disk carrier 110 of brake A and is axially and slidably fixed to the servo apparatus 130, an arrangement somewhat modified with respect to FIG. 6. Upon the engagement of brake A, the servo apparatus 130 biases the disk set 100 axially, in the presently discussed arrangement, in a direction contrary to that of the output stage ABTR, i.e., contrary to that of the third planetary gearset RS3. Presently, as an additional advantageous detail, the output stage ABTR, which is driven by the output element (carrier ST3) of the third planetary gearset RS3, is not rotationally mounted on the shaft 3 of the transmission as in FIG. 6, but rather is directly mounted on the hub GN of the housing wall GW.

The disk set 200 of brake B is, in accord with FIG. 7, and seen in respect to its spatial requirements, now located in an area somewhat radially placed above the first planetary gearset RS1, this being similar to the arrangement in FIGS. 1, 4 and FIG. 5. Differing from FIG. 6, the servo apparatus 230 of brake B is now located on that side of its assigned disk set 200 of brake B proximal to the output stage ABTR, i.e., proximal to the second planetary gearset RS2. Correspondingly, the servo apparatus 230 axially biases the disk set 200 upon engagement in the direction away from the output stage ABTR, i.e., a direction away from the third planetary gearset RS3.

The design of the clutch D, shown in FIG. 7, is based on the embodiment in accord with FIG. 5. The disk set 400 of the clutch D, in accord with FIG. 7 and when spatially considered, is placed in a manner neighboring the third planetary gearset RS3. The outer disk carrier 410 of the clutch D forms a section of the shaft 8 of the transmission and is connected in a rotationally fixed manner to the shaft 3. The inner disk carrier 420 of the clutch D forms a section of the shaft 2 of the transmission. The servo apparatus 430 of the clutch D is placed on that side of the disk set 400, remote from the third planetary gearset RS3, and is arranged within a cylindrical space which is formed by the spatial requirements of the outer disk carrier 410. For reduction of the axial length of the transmission, the servo apparatus 430, in this instance, in accord with its spatial requirements, is placed at least partially and radially above the second planetary gearset RS2. Upon the engagement of the clutch D, the servo apparatus biases its assigned disk set 400 axially in the direction of the output stage ABTR, i.e., in the direction of the third planetary gearset RS3.

Further to be inferred from FIG. 7 is that the component group containing the two clutches C and E is the same as that of FIG. 6.

Figure 8:
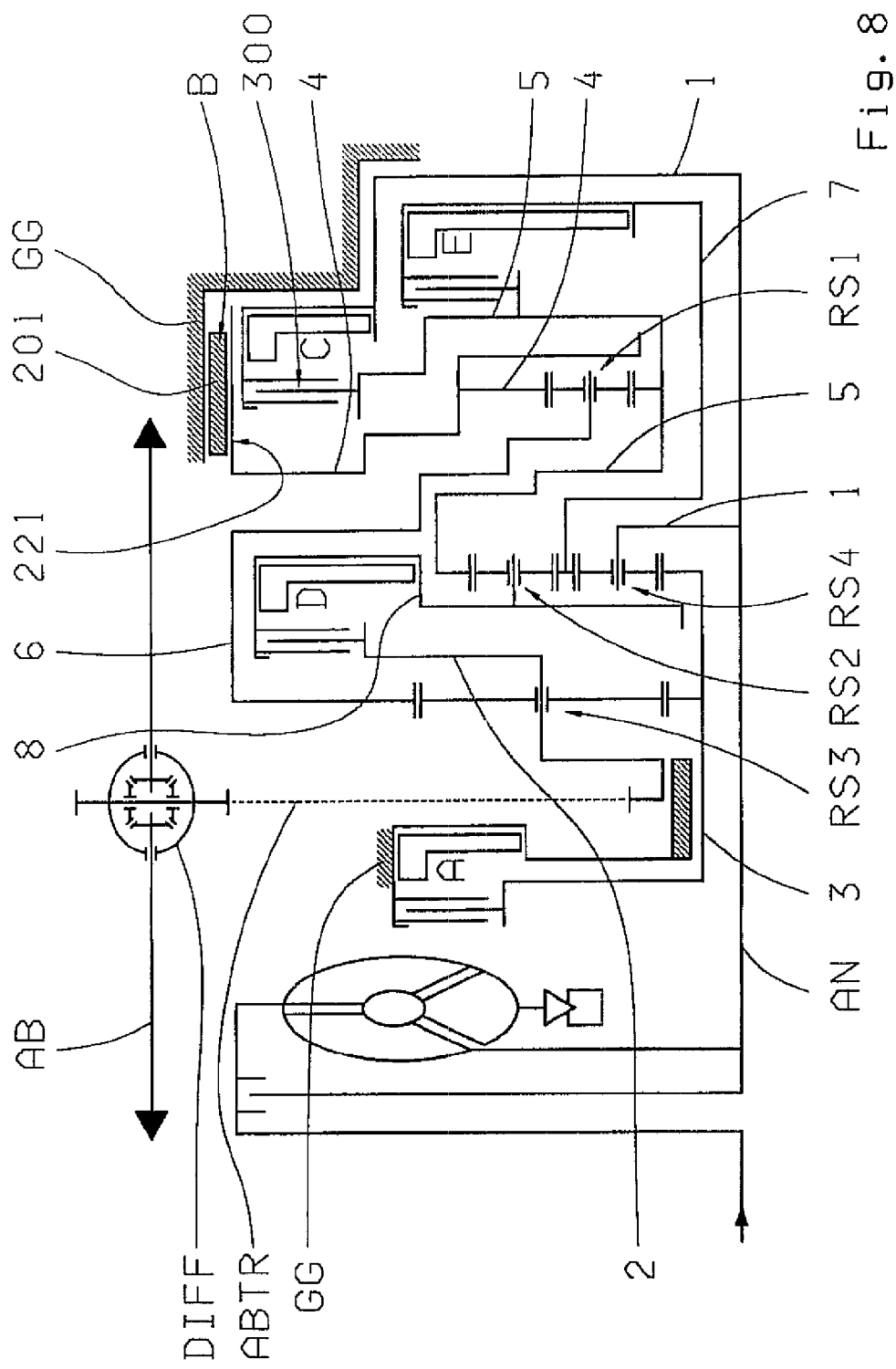
FIG. 8 is an exemplary fifth arrangement of components for the multi-speed transmission of FIG. 1.

FIG. 8 shows a fifth component variation for the multi-speed transmission as shown primarily in FIG. 1, and is based on the fourth variation as depicted in FIG. 7. The essential difference from FIG. 7, is that brake B is no longer designed as a disk brake, but rather as a band brake. The brake band is designated as 201. A brake band cylinder, designated as 221, has a frictional surface which corresponds to that of the brake band 201. The cylinder 221 simultaneously forms a section of the shaft 4 of the transmission. As is known, a brake band requires a clearly smaller amount of installation space, when compared to a conventional, functionally equivalent disk brake. Especially for use in the inventive transmission in a motor vehicle with a front drive and a motor aligned transversely to the direction of travel and thereby the restricted available installation space within a transmission is restricted, that is in the area of the longitudinal beams of the vehicle, is unfavorable, if the transmission in the area of that side of its housing, remote from the input side, possesses a diameter which is not excessively large. In the present case, this is in that area of the transmission housing GG in which the clutches C and E are confined. The use of a brake band for brake B enables the clutch C to be slid axially to an area radially located above the first planetary gearset RS1, a section of the shaft 4 or, in other words, the brake band cylinder 221 encases the disk set 300 of the clutch C from the side that is proximal to the input. Under these circumstances, the brake band 201 of brake B, spatially considered, is located radially above the disk set 300 of the clutch C.

Figure 9:
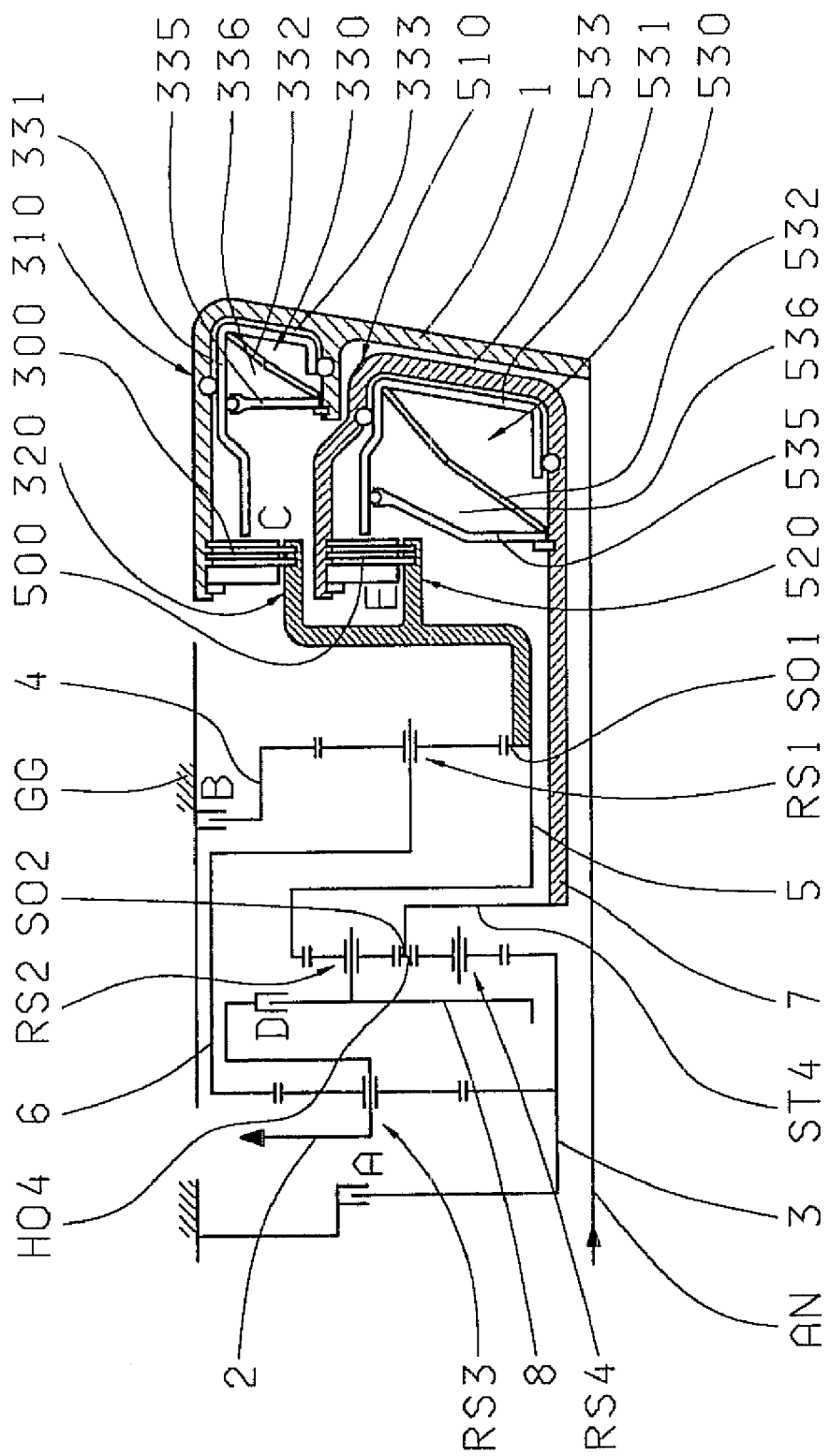
FIG. 9 is an exemplary detail design of the arrangement of components in accord with FIG. 6.
Figure 10:
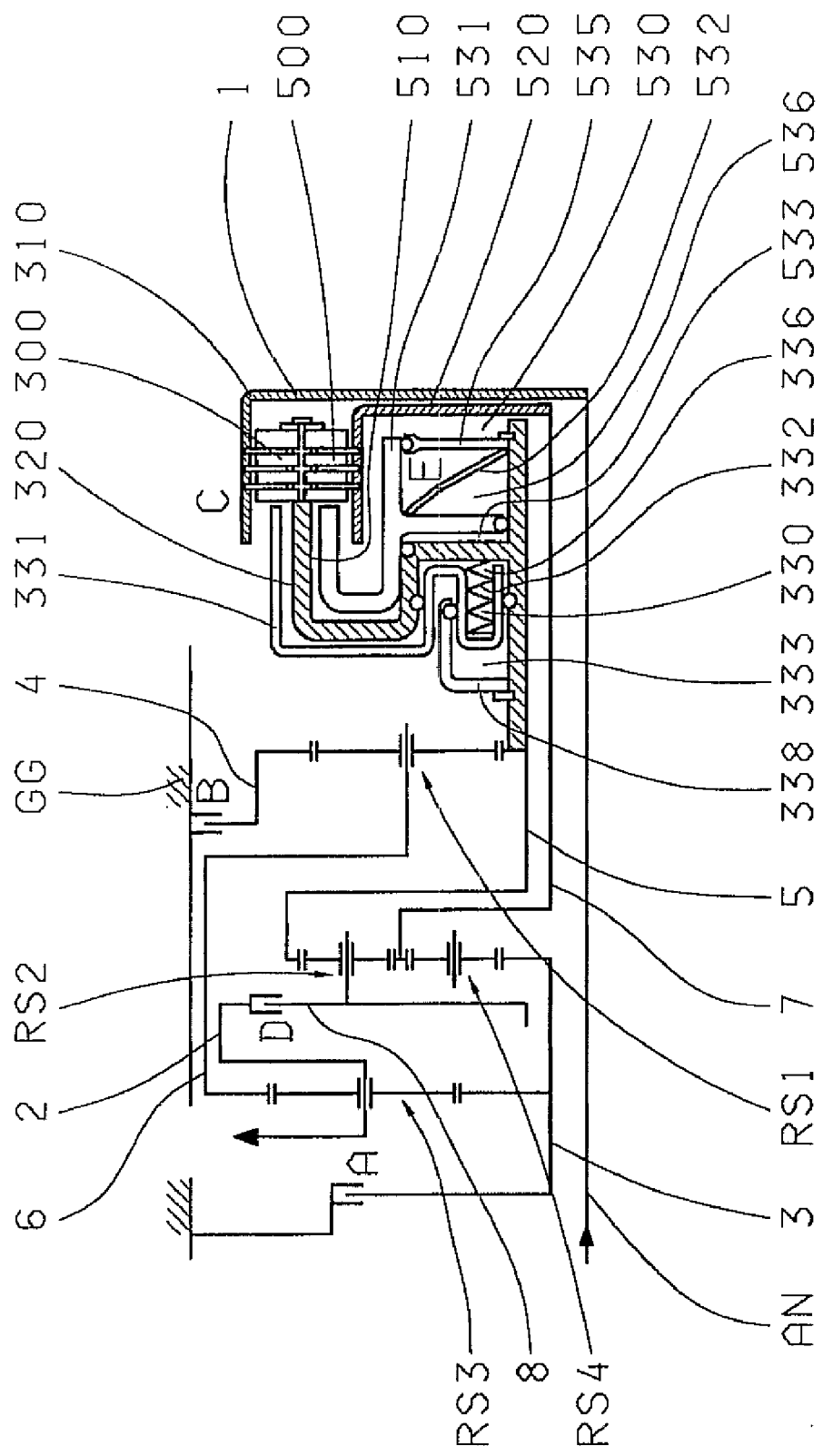
FIG. 10 is an exemplary sixth arrangement of components for the multi-speed transmission in accord with FIG. 1.
Figure 11:
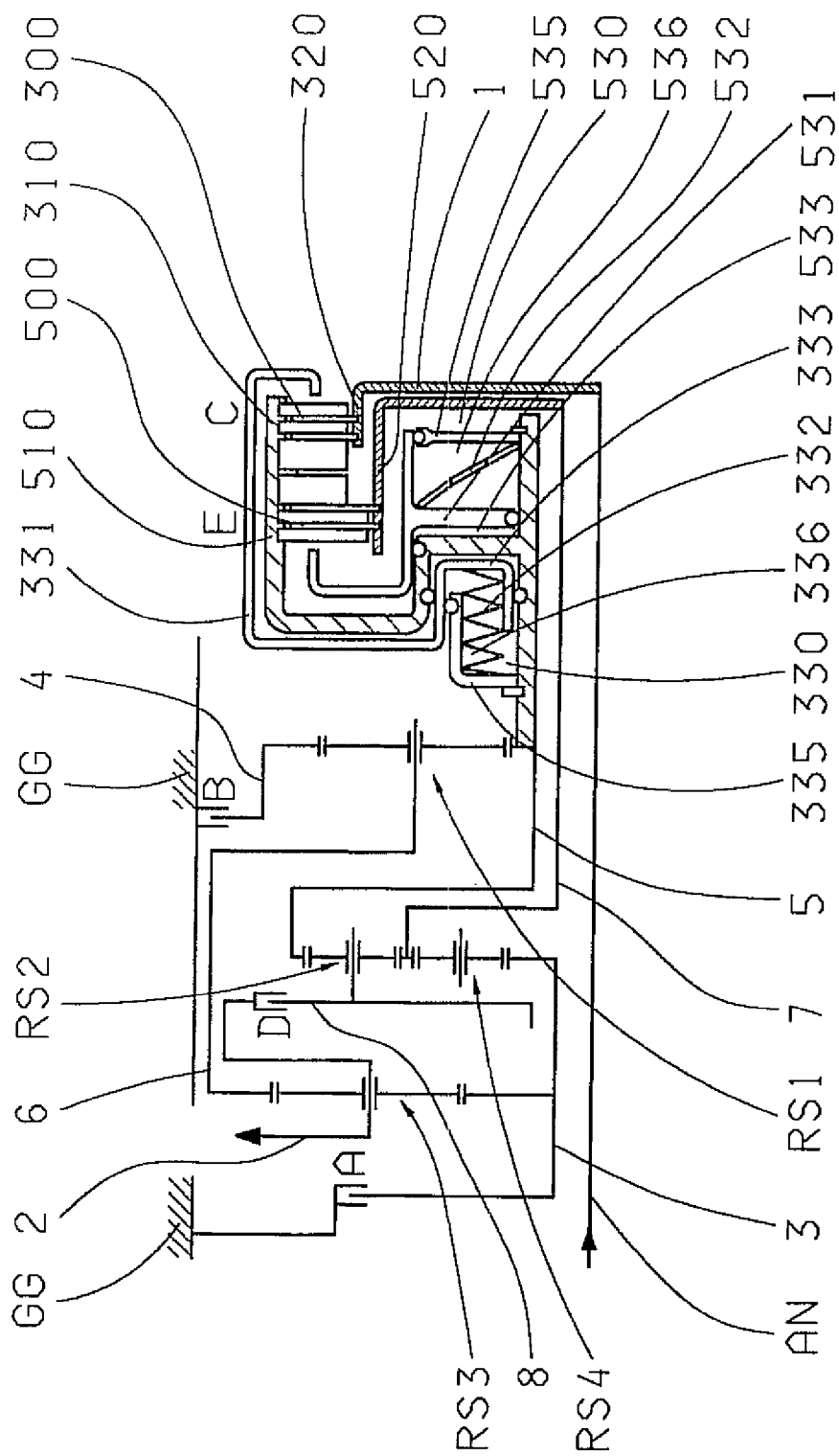
FIG. 11 is an exemplary seventh arrangement of components for the multi-speed transmission in accord with FIG. 1.

In FIGS. 9-11, three examples of designed constructions of pre-assembled clutch assemblies, comprised of the two clutches C and E, are given a more detailed description and explanation, which will illustrate how these are usably integrated into the transmission operating scheme as shown in FIGS. 6 and 7.

FIG. 9 shows an detailed design of the third component variation, presented in FIG. 6, which concerns the clutch assembly formed from the two clutches C and E. From FIG. 9, it is easily seen that, for the two clutches C and E, a common one-piece disk carrier is provided, which serves, first, for the (radially outer) clutch C as an inner disk carrier 320 for retaining the coated disks of the disk set 300 of the clutch C and, second, is designated also for the (radially inner) clutch E as an inner disk carrier 520 for retaining the coated disks of the disk set 500 of the clutch E. These common inner disk carriers, namely 320, 520 border directly and axially on the first planetary gearset RS1 upon that side thereof, remote from the gear group formed by the planetary gears RS2, RS4. In this arrangement, the disk set 300 of the clutch C, when spatially considered, is radially placed at least essentially above the disk set 500 of the clutch E. The outer disk carrier 310 of the (radially outer) clutch C is designated as a cylindrically shaped pot, opening in the direction of the planetary gearset RS1. Further, the outer disk carrier 310 which, on its inner circumference, retains the steel disks of the disk set 300 of the clutch C and the carrier is also connected in a rotationally fixed manner to the input shaft AN as a section thereof. Within the cylindrical space of this outer disk carrier 310 are, first, the servo apparatus 330 and the disk set 300 of the clutch C assigned thereto and, second, essentially the entire clutch E. The outer disk carrier 510 of the (radially inner) clutch E is designed as a cylindrical pot, which opens in the direction of the planetary gearset RS1 and retains steel disks of the disk set 500 of the clutch E on its inner circumference. Further, the outer disk carrier 510 serves as a section of the shaft 7 of the transmission and is connected in a rotationally fixed manner on that side of the first planetary gearset RS1, remote from the clutch E, to the ring gear HO4 of the fourth planetary gearset RS4, as well as to the sun gear SO2 of the second planetary gearset RS2. Within the cylindrical space of the outer disk carrier 510 are located the servo apparatus 530 and its assigned disk set 500 of the clutch E. When spatially considered, the servo apparatus 300 of the clutch C is located radially above the outer disk carrier 510 of the (radial inner) clutch E and, in this arrangement, also radially above the servo apparatus 530 of the clutch E.

As may be further determined from FIG. 9, the servo apparatus 330 of the clutch C comprises a piston 331, a piston reset element 332, a pressure chamber 333, a structural plate 335 and a pressure compensation chamber 336. The piston 331 is axially slidably mounted on the outer disk carrier 310 of the clutch C and forms, in combination with the outer disk carrier 310, the pressure chamber 333 which, in this case, is placed above a pressure supply means (not shown in detail) for the fluid by way of which the pressure chamber 333 can be subjected to pressure. On that side of the piston 331, which is on the opposite side of the piston 333 and thus on that side of the piston 331, proximal to the first planetary gearset RS1, is found the pressure compensation chamber 336, which is formed by piston 331 and the structural plate 335 which is axially placed on the outer disk carrier 310. The pressure compensation chamber 336 serves to offset the rotational pressure generated in the pressure chamber 333, which continually turns at the rotational speed of the input shaft AN and can be filled, under no-pressure conditions, with lubricant. The corresponding lubricant/pressurized fluid feed system (hereinafter "fluid feed system") is not shown in FIG. 9 for the sake of clarity. A reset element 332 is placed axially, between the piston 331 and the structural plate 335, under stress. The reset element 332, in this case, consists of a plate spring. If the pressure chamber 333 of the servo apparatus 330 is filled with pressurized fluid, then the piston 233 biases the disk set 300, which has been assigned to the piston 331, to move axially counter to the force of the reset element 332 and in the direction of the transmission input side, i.e., in the direction of the first planetary gearset RS1.

The servo apparatus 530 of the clutch E consists of a piston 531, a piston reset element 532, a pressure chamber 533, a structural plate 535 and a pressure compensation chamber 536. The piston 531 is axially slidably fixed to the outer disk carrier 510 of the clutch E and, in combination with the outer disk carrier 510 forms the pressure chamber 533. The pressure chamber 533 can be filled by way of a fluid feed system (not shown). On that side of the piston 5311 remote from the pressure chamber 533, thus on that side of the piston 531 which is proximal to the first planetary gearset RS1, is the pressure compensation chamber 536, which is formed by way of the piston 531 and the structural plate 535, which latter is fixed to the outer disk carrier 510 and which chamber can be filled with unpressurized lubricant. Further, this compensation chamber 536 serves to compensate for the pressure generated by the pressure chamber 533, which rotates continually at the rotational speed of the shaft 7. The corresponding lubricating liquid feed is not shown in FIG. 9 for the sake of simplicity the reset element 532 is placed axially disposed between the piston 531 and the structural plate 535, under stress and, in this case, consists of a plate spring. If the pressure chamber 533 of the servo apparatus 530 is filled with a pressurized fluid, then the piston 531 biases the disk set 500, which is assigned thereto, counter to the force of the reset element 532 in an axial direction toward the transmission input-side, i.e., in the direction of the first planetary gearset RS1.

FIG. 10 shows a sixth component variation of the multi-speed transmission according to FIG. 1, in this case, based on the variations set forth in the component variation as shown in FIG. 6. The two clutches C and E, in a manner similar to that of FIG. 6 and FIG. 9, are combined into a pre-assembled clutch assembly which, when seen with consideration of spatial conditions within the transmission housing GG, is located on that side of the first planetary gearset RS1, remote from the nested planetary gearset group, which is composed of the second and fourth planetary gear groups RS2, RS4. Proximal thereto, the disk set 500 of the clutch E is essentially placed radially below the disk set 300 of the clutch C. The essential difference, between FIG. 6 and FIG. 9, is the positioning of the servo apparatuses 330, 530 of the two clutch C, E, which are now essentially placed axially next to one another, whereby the servo apparatus 330 of the clutch C is placed closer to the first planetary gearset RS1 than the servo apparatus of the clutch E.

For the above stated arrangement, a common, one-piece disk carrier has been provided for the two clutches C and E. This one-piece disk carrier, first, is designed for the (radial outer) clutch C as an inner disk carrier 320 for the retention of steel disks of the disk set 300 of the clutch C and is designed, second, for the (radial inner) clutch E as an outer disk carrier 510 for the retention of steel disks of the disk set 500 of the clutch E. In this assembly, the section of the common disk carrier, namely 320, 520, onto which the two disk sets 300 and 400 are fixed, is constructed as a cylindrical pot, which opens in the direction opposite the first planetary gearset RS1. The outer disk carrier 310 of the (radially outer) clutch C is designed as a cylindrical pot opening in the direction of the first planetary gearset RS1 and requires on its inner circumference the coated disks of the disk set 300 of the clutch C, and which is connected in a rotationally fixed manner to the input shaft AN as a section thereof. The inner disk carrier 520 of the (radially inner) clutch E is designed as a cylindrical pot, which opens in the direction of the first planetary gearset RS1 and which retains on its outer circumference coated disks of the disk set 500 of the clutch E and which, serving as a section of the shaft 7 of the transmission, is connected in a rotationally fixed manner to the ring gear of the fourth planetary gearset RS4 and to the sun gear of the second planetary gearset RS2, with this connection occurring on that side of the planetary gearset RS1, which is remote from the clutch E.

The servo apparatus 530 and its assigned disk set 500 of the clutch E are placed inside a cylindrical space, which has been formed by outer disk carrier 510, i.e., the common disk carrier 320, 510. This servo apparatus 530, when viewed spatially, is placed essentially radially above a hub section of the common disk carrier 320, 510, which extends axially from the base of the pot formation in a direction away from the first planetary gearset RS1. The servo apparatus 530 comprises a piston 531, the piston reset element 532, the pressure chamber 533, the structural plate 535 and the pressure compensation chamber 536. The piston 531 is fixed in a pressurized fluid tight manner to the common disk carrier 320, 510 and is axially slidable thereon. The piston 531, together with the common disk carrier 320, 510 forms the pressure chamber 533 which, by way of a fluid feed system (not shown, for reasons of clarity) is subjected to pressure by being filled with the pressurized fluid. A pressure compensation chamber 536 is placed on the side of the piston 531, opposite to the pressure chamber 533, i.e., on that side of the piston 531, remote from the first planetary gearset RS1, and is formed by the piston 531 and the structural plate 535, which is rigidly fixed to the hub of the common disk carrier 320, 510. This pressure compensation chamber 535 has the property of being filled with an unpressurized lubricating fluid to offset the pressure generated by the rotation of the pressure chamber 533, which continually rotates at the rotational speed of the shaft 5. The corresponding lubrication fluid fee system is not shown in FIG. 10 to enhance the clarity. The reset element 532 is located axially, between the piston 531 and the structural plate 535 and, in this case, has been made as a plate spring. If the pressure chamber 533 of the servo apparatus 530 is filled with pressurized fluid, the piston 531 will bias the disk set 500 of the clutch E, which has been assigned to the piston, in a direction counter to the force of the reset element 532, which is also axially directed away from the first planetary gearset RS1.

The servo apparatus 330 of the clutch C is, when spatially viewed, placed in an area essentially radially above a hub section of the common disk carrier 320, 510, which extends away from the pot base thereof and axially in the direction of the first planetary gearset RS1. In this arrangement, the servo apparatus 330 comprises a piston 331, the piston reset element 332, the structural plate 338, the pressure chamber 333 and the pressure compensation chamber 336. The structural plate 338 is made as a cylindrical pot, which opens away from the first planetary gearset RS1 and is mounted at that side of the pot base belonging to the common disk carrier 320, 510, which side is proximal to the first planetary gearset RS1. In this arrangement, the structural plate 338, on its inner circumference, is fixed in a pressurized fluid tight manner to the hub of the common disk carrier 320, 510, which is proximal to the first planetary gearset RS1. The piston 331 is axially, slidably fixed on both the common disk carrier 320, 510 as well as on the structural plate 338 and thereby forms, in combination with the structural plate 338, the pressure chamber 333. The pressure chamber 333 is subjected to pressure by way of a fluid feed system (not shown). Seen in a geometric manner, the piston 331 has an irregular contour, which is made to conform to the hub of the common disk carrier 320, 510, the hub being proximal to the first planetary gearset RS1; the structural plate 338; the pot base of the common disk carrier 320, 510 and, finally, the cylindrical outer circumference of the common disk carrier 320, 510. With this arrangement, parts of the outer contour of the common disk carrier 320, 510 are thereby radially and axially overlapped. On that side of the piston 331, opposite to pressure chamber 333, thus on that side of the piston 331 which is remote from the first planetary gearset RS1 is located the pressure compensation chamber 336, which is formed by way of the piston 331 and the common disk carrier 320, 510. The pressure compensation chamber 336 serves to offset the rotational pressure generated by pressure chamber 333, which continually rotates at the same speed of rotation as shaft 5. This is possible since the pressure compensation chamber 336 can be filled with unpressurized lubricating fluid. The corresponding fluid feed system is not shown in FIG. 10 for reasons of clarity. The pressure compensation chamber 332 of the clutch C is separated from the pressure chamber 533 of the clutch E only by a shell-like casing of the common disk carrier 320, 510 for the clutches C, E. Axially located between the piston 331 of the clutch C and the common disk carrier 320, 510 for the clutches C, E is the reset element 332 which is under stress. In this case, the reset element is a helical spring set, which includes a plurality of helical springs that are circumferentially distributed, in a parallel directed way, about an abutting base of the spring set. If the pressure chamber 333 of the servo apparatus 330 is filled with pressurized fluid, then the piston 331 biases its assigned disk set 300 of the clutch C in a direction counter to the force of the reset element 332, this being away from the first planetary gearset RS1.

FIG. 11 shows a final seventh component variation, based on the multi-speed transmission presented in FIG. 1 and including the altered sixth component variation as expressed in FIG. 10. The paired clutches C and E form, as they did in FIGS. 6, 9 and 10, a pre-assembled clutch assembly, ready for mounting. These paired clutches C and E, in their spatial arrangement within the transmission housing GG, are located on that side of the first planetary gearset RS1, which is remote from the planetary group comprised of planetary gearsets RS2, RS4. The essential difference from FIG. 6 and FIG. 9 lies in the fact that the servo apparatuses 330, 530 of the two clutches C, E are now essentially axially bordering one another, whereby the servo apparatus 30 of the clutch C is essentially closer to the first planetary gearset RS1 than the servo apparatus 530 of the clutch E. The essential difference from FIG. 10 can be found therein in that the disk sets 300, 500 of the two clutches C, E are now placed axially next to one another, with the disk set 500 of the clutch E being nearer to the first planetary gearset RS1 than the disk set 300 of the clutch C.

In this arrangement a common one-piece outer disk carrier has been provided for the paired clutches C and E which, on the inner circumference of the section 510, retains the steel disks of the disk set 500 of the clutch E. Further on the inner circumference of the section 310, the steel disks of the disk set 300 of the clutch C are stored. Advantageously, both disk sets 300, 500 are at the same diameter, such that both disk sets 300, 500 can use the same component parts. In this way, the common outer disk carrier 310, 510 is constructed essentially as a cylindrical pot, which opens in a direction to that of the first planetary gearset RS1. Further, with this arrangement, in the transmission, a hub of the common, outer disk carrier 310, 510, the hub being radially mounted on the shaft 7, extends away from the pot base in both directions. The inner disk carrier 320 of the clutch C is designed as a cylindrical pot, opening in the direction of the first planetary gearset RS1, and has on its outer circumference the coated disks of the disk set 300 of the clutch C and further, as a section of the shaft 1 of the transmission, is accordingly connected in a rotationally fixed manner with the input shaft AN. The inner disk carrier 520 of the clutch E is designed as a pot, opening in the direction of the first planetary gearset RS1 and which, on its outer circumference retains the coated disks of the disk set 500 of the clutch E. Further, as a section of the shaft 7 of the transmission, the inner disk carrier 520 is connected in a rotationally fixed manner on that side of the first planetary gearset RS1 remote from the clutch E with the ring gear of the fourth planetary gearset RS4 and with the sun gear of the second planetary gearset RS2.

The servo apparatus 530 of the clutch E has been essentially taken from FIG. 10 and is, when spatially viewed, completely within the cylindrical space formed by the common outer disk carrier 310, 510 and is essentially placed radially above the hub section of the common outer disk carrier 310, 510, which extends from the pot base thereof, axially in a direction counter from the first planetary gearset RS1. Accordingly, the servo apparatus comprises the piston 531, the piston reset element 532, the pressure chamber 533, the structural plate 535 and the pressure compensation chamber 536. In an axial manner, the piston 531 is slidably connected, in a pressurized fluid tight manner, to the common outer disk carrier 310, 510 and forms, in combination with the common outer disk carrier 310, 510, the pressure chamber 533 which, by way of a fluid feed system (not shown here), can be filled with pressurizing fluid. On that side of the piston 531, remote from the pressure chamber 533, in other words, on that side of the piston 531, which is remote from the first planetary gearset RS1, is located the pressure compensation chamber 536, filled with unpressurized lubricant fluid ti offset the rotational pressure generated by the turning pressure chamber 533, which the chamber continually rotates at the same rotational speed as the shaft 5. The corresponding distribution means for the lubrication fluid is, in FIG. 11, not shown for the sake of maintaining clarity. The reset element 532 is axially located between the piston 531 and the structural plate 535 and is here comprised of a plate spring, that is installed under stress. If the pressure chamber 533 of the servo apparatus 530 is filled with pressurized fluid, then the piston 531 biases its assigned disk set 500 of the clutch E against the force of the spring, i.e., against the force of the reset element 532 to move under the force of pressure in a direction away from the first planetary gearset RS1.

The servo apparatus 330 of the clutch C is built in a similar manner to that shown in FIG. 10, however, it is made to exhibit the positional change from FIG. 10 of its assigned disk set 300, wherein the change is relates to the disk set 500 of the clutch E. As may be seen in FIG. 1, the servo apparatus 330 of the clutch C, within the clearance limits, is placed partially radially above the hub section of the common outer disk carrier 310, 510, which extends from the base of the pot in an axial direction toward the first planetary gearset RS1. Concurrently, the servo apparatus 330 comprises the piston 331, the piston reset element 332, the pressure chamber 333, the structural plate 335 and the pressure compensation chamber 336. The piston 331 is axially and slidably fixed onto the common outer pressure carrier 310, 510 with tight sealing against pressurized fluid, in combination with the outer pressure carrier 310, 510 forms the pressure chamber 333. The pressure chamber 333 can be filled with pressurized fluid, through a fluid feed system (not shown). The pressure compensation chamber 336 is located on that side of the pressure chamber 333, which is opposite from the piston 331, i.e., on that side of the piston 331 which is proximal to the first planetary gearset RS1, and is formed by way of the piston 331 and the structural plate 335, which is axially fixed on the planetary gearset proximal hub of the common outer disk carrier 310, 510. In order to offset the rotational pressure generated by the rotating pressure chamber 333, which rotates at the same speed as the shaft 5, the pressure compensation chamber 336 is filled with unpressurized lubricant fluid, by way of a fluid feed system, which is not shown here for the sake of clarity. The pressure chambers 333, 533 of both clutches C, E are also directly axially neighboring one another, but are separated from one another by way of a cover plate serving the common outer disk carrier 310, 510 of the clutches C, E. Geometrically observed, the piston 331 of the clutch C exhibits an irregular structure, which is made to complement the structural plate 335 and the outer contour of the common outer disk carrier 310, 510. Accordingly, the meandering structure outwardly encloses the common outer disk carrier 310, 510 in a radial and axial manner on that side of the disk set 300, which is assigned to the common disk carrier, upon which the outer disks thereof act and which side is opposite from the pressure chamber 333. Axially located, between the piston 331 and the structural plate 335, the reset element 332 is installed in its stressed condition. The reset element 332 is, in design, a helical spring set, having a multitude of parallel spiral springs, commonly the force of which are all directed and peripherally apportioned about the piston 331. If the pressure chamber 333 of the servo apparatus 330 is subjected to pressure by the pressurized fluid, then the piston 331 biases its assigned disk set 300 of the clutch C against the force of the helical spring reset element 332, to cause movement in the direction of the first planetary gearset RS1. Differing from FIG. 10, the direction of the actuation of the servo apparatuses 330, 530 of the two clutches C, E, in accord with FIG. 11, will be seen to be altered.

Figure 12:
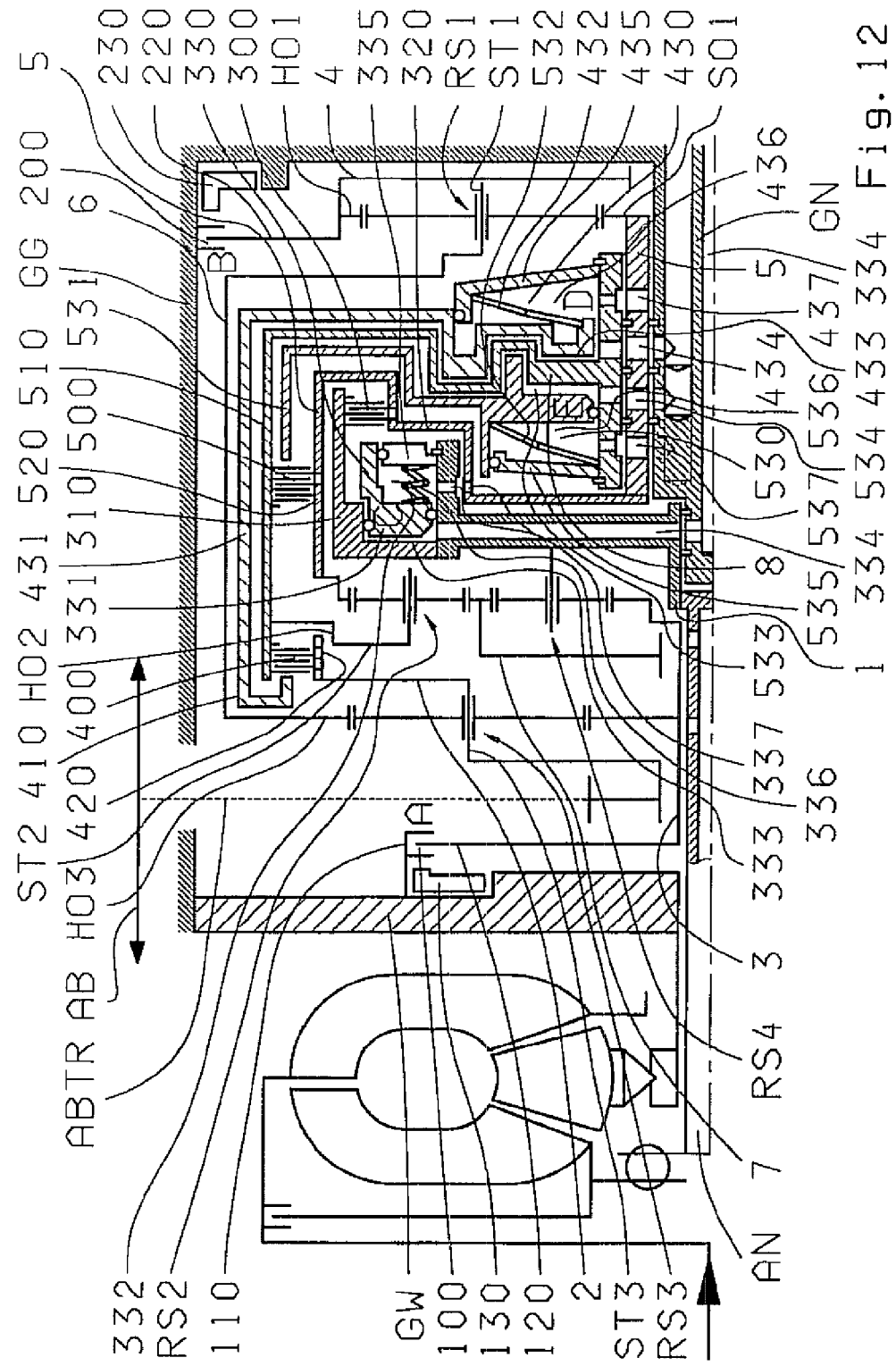
FIG. 12 is a schematic presentation of a second embodiment example of an inventive multi-speed transmission.

In FIG. 12, a second embodiment of an inventive multi-speed transmission is shown, which will be described in the following. In this case, this second embodiment is based on the planetary gearset concept in accord with FIG. 1, which has already been thoroughly described and explained. The kinematic couplings between the planetary gearset elements, the shifting elements and the shafts are modified from FIG. 1 only in one detail: As a difference to FIG. 1, wherein the clutch E is placed in the flow of power, between the shafts 5 and 7 of the transmission, in the present case of FIG. 12, the clutch E is now located in the flow of power, between the shafts 5 and 8 of the transmission. As has already been mentioned, the second planetary gearset RS2, upon the engagement of the clutch E, becomes internally locked so that, upon an engagement of the clutch E, the planetary gear rotates as a common unit. In FIG. 12, this function is assured by way of a frictional contact connection, between the ring gear HO2 and the carrier ST2, both of the second planetary gearset RS2.

As may be seen in FIG. 12, the third planetary gearset RS3 is located on that side of the transmission proximal to the input. On that side of the third planetary gearset RS3, proximal to the input, is connected the output stage ABTR, which is a spur gear or chain driven gear extension and is found in the power flow, between the carrier ST3 of the third planetary gearset RS3 and the output shaft AB, and axially aligned with the third planetary gearset RS3. Within the available installation space, brake A connects on that side proximal to the input of the transmission to the carrier ST3. A section of the shaft 3, which is bound to the inner disk carrier 120 of brake A centrally passes through the output stage ABTR, Correspondingly, the spur or chain gear of the output stage ABTR is connected in a rotationally fixed manner to the shaft 3. The outside disk carrier 110 of brake A is, as an example, rotationally integrated in the housing wall GW which, in turn, is part of the transmission housing GG. The servo apparatus 130 of brake A, which biases its assigned disk set 100 is only schematically indicated in FIG. 12 for the sake of clarity. Spatially observed, this servo apparatus 130 is placed on that side of the disk set 100 of brake A, which is proximal to the input of the transmission and is axially and slidably supported by the housing wall GW where, upon engaging, biases its assigned disk set 100 in an axial direction counter to the transmission input, i.e., axially in the direction of the third planetary gearset RS3.

Brake B is placed on that side of the transmission opposite the input, i.e., on that side which is opposite brake A and thus directly borders the outer wall of the transmission housing GG. Accordingly, the disk set 200 of brake B, spatially considered, is placed in the area of the inner circumference of the transmission housing GG and proximally neighbors the radially outer wall of the transmission housing GG. The outer disk carrier 210 of brake B is, as an example, integrated into the transmission housing GG. The servo apparatus 230, which is shown in FIG. 12 only schematically, for the sale of clarity, of brake B actuates its assigned disk set 200 of brake B and is placed upon that side of the disk set 200, which is remote from the transmission input and is further axially and slidably mounted on the transmission housing GG, i.e., on the transmission outer wall, and upon engaging, biases the disk set 200, axially in the direction of the transmission input. The inner disk carrier 220 of brake B, which is bound to the ring gear HO1 of the first planetary gearset RS1, forms a section of the shaft 4 of the transmission and extends proximally along the outer wall of the transmission, which is remote from the input of the transmission, to the input side of the transmission. This extension would start from the disk set 200 and run radially inward as far as a transmission housing GG fixed hub GN, to which it is also rotationally supported. The first planetary gearset RS1 is axially attached on that side of the inner disk carrier 220 of brake B proximal to the input of the transmission in such a way, that the disk set 200 of brake B, spatially considered, is placed at least partially radially above the first planetary gearset RS1.

Further seen in FIG. 12, on that side of the input-bordering, third planetary gearset RS3, which is remote from the input of the transmission, the planetary gearset combination RS2, RS4, is axially attached to the third planetary gearset RS3, which is formed from the nested second and fourth planetary gearsets, namely RS3 and RS4 on the shaft 3 of the transmission. Spatially considered, the disk set 400 of the clutch D is found between the (radially outer) second planetary gearset RS2 of the nested planetary set group and the third planetary gearset RS3, thus being radially located above the two planetary gearsets RS2, RS3. The inner disk carrier 520 of the clutch D forms a section of the shaft 2 of the transmission and is connected in a rotationally fixed manner with the carrier of the carrier ST3 of the third planetary gearset RS3 on that side thereof which is remote from the output stage ABTR. The back plate of this carrier ST3, which is remote from the input of the transmission, and the inner disk carrier 420 can be combined in manufacture to make a one-piece component.

The clutch C attaches on that side of the nested planetary group RS2, RS4, remote from the transmission-input. Also, the outer disk carrier 310 of the clutch C forms a section of the shaft 1 of the transmission and is also connected in a rotationally fixed manner with input shaft AN, forming a cylindrical space opening in a direction contrary to the transmission input side. The cylindrical space encloses the servo apparatus 330 and the disk set 300 of the clutch C. Spatially considered, servo apparatus 330, disk set 300 and the second planetary gearset RS2 are arranged at approximately the same diameter. The servo apparatus 330 comprises the piston 331, the piston reset element 332, the pressure chamber 333, the structural plate 335 and the pressure compensation chamber 336. The piston 331 is axially aligned and slidably mounted on the outer disk carrier 310 and forms, in combination therewith, the pressure chamber 333, which can be filled with pressurized fluid by way of a pressurized fluid feed 334. On that side of the piston 331, opposite the pressure chamber 333, thus on that side of the piston 331, which is remote from the second planetary gearset RS2, is found a pressure compensation chamber 336, which is formed by way of the piston 331 and the structural plate 335, which is placed axially on the outer disk carrier 310. The pressure compensation chamber 336 can be filled with unpressurized lubricant fluid to offset the rotational pressure generated by the pressure chamber 333, which rotates continually at the rotational speed of the input drive shaft AN. The corresponding fluid feed system is designated as 337. Axially aligned, between the piston 331 and the structural plate 335 is the reset element 332 which, in this case, is composed as a set of helical springs, which are peripherally apportioned about the piston 331, have a common direction of force and are arranged in parallel. If the pressure chamber 333 of servo apparatus 330 fills with pressurized fluid, then the piston 331 biases its assigned disk set 300 in a direction counter to the force of the reset element 332, thus moving axially in a direction counter to the transmission input side, that is, in a direction away from the second planetary gearset RS2. The inner disk carrier 320 of the clutch C forms a section of the shaft 5. Accordingly, the shaft 5 possesses a hub section, which is rigidly bound to the inner disk carrier 320 of the clutch C, and extend, starting from the inner diameter of the inner disk carrier 320, in an axial direction away from the nested planetary group RS2, RS4, on which the transmission housing fixed hub GN is rotationally mounted, which is remote from the fourth planetary gearset RS4, is connected in a rotationally fixed manner with the sun gear SO1 of the first planetary gearset RS1. This hub GN extends, starting from the outer wall GG of the transmission, opposite to the input side and runs axially toward the fourth planetary gearset RS4 and centrally and completely passes through, in an axial direction, the first planetary gearset RS1 and the hub section of the shaft 5.

When spatially viewed, the disk set 500 of the clutch E is located above the clutch C. This arrangement allows, the inner disk carrier 520 of the clutch E, which the carrier is rotationally bound to the ring gear HO2 of the second planetary gearset RS2, to completely encompass the clutch C in the axial direction and is bound with the inner disk carrier 320 of the clutch C, on that side thereof, which is remote from the second planetary gearset RS2. Further, the inner disk carrier 520 of the clutch E forms a section of the shaft 5 of the transmission. In the embodiment example, shown in FIG. 12, the inner disk carrier 520 of the clutch E and the inner disk carrier 320 of the clutch C, in an advantageous manufacturing arrangement can be made as a one-piece component.

Further evident, in FIG. 12, is that the two clutches D and E, likewise, form a pre-assembled clutch assembly by advantageous fabrication methods which, within spatial limitations, can be inserted in an area axially located between the nested gear group RS2, RS4 and the first planetary gearset RS1 (which is remote from the input side of the transmission). Accordingly, this provides for both the clutches D, E, a common disk carrier which, as shaft 8 of the transmission, first, provides a shiftable connection by the clutch D, between the shaft 2 of the transmission and the carrier ST2 of the second planetary gearset RS2 and, second, to provide a shiftable connection by the clutch E, between the shaft 5 of the transmission and the carrier ST2. In the embodiment presented in FIG. 12, this common disk carrier is shown to be constructed as the outer disk carrier 410 for the clutch D, as well as the outer disk carrier 510 for the clutch E and is further rotationally supported on the hub section of the shaft 5. In this arrangement, the common disk carrier 410, 510 accepts both the disk sets 400, 500 as well as the servo apparatuses 430, 530 of the two clutches D, E, whereby the disk sets 400, 500 of the two clutches D, E and the servo apparatus 530 of the clutch E are placed within a cylindrical space, which has been formed by way of the common disk carrier 410, 510 and when spatially viewed, the carrier ST2 of the second planetary gearset RS2 of the common disk carrier 410, 510.

Due to this kinematic coupling, it would be possible, in another formation of the clutch-component grouping of the two clutches D, E, that the outer disk carrier 410 of the clutch D and the carrier ST2 of the second planetary gearset RS2 could be rigidly bound together or be designed as a one-piece, commonly applied component which, in such a case, by way of an appropriate complementary profiling can be releasably bound with the outer disk carrier 510 of the clutch E. In this case, the outer disk carrier 510 of the clutch E also accepts, besides the disk set 400 and the servo apparatus 530 of the clutch E, the servo apparatus 430 of the clutch D.

Returning to FIG. 12, in the following, an explanation in greater detail is provided concerning the servo apparatuses 430, 530 of the two clutches D, E. With respect to the allowable spatial layout of the disk set 500 of the clutch E, which is located radially above the clutch C, the servo apparatus 530 assigned to the disk set 500 is, when spatially considered, directly neighboring the clutch C, hence directly contingent to the common inner disk carrier 320, 520 of the clutches C, E and thus directly bordering the shaft 5 of the transmission, and is predominately placed on that side of the clutch C which side is remote from the nested gear group RS2, RS4. As has already been explained, the outer disk carrier 510 of the clutch E creates, in this area, a cylindrical space, opening in the direction of the nested gear group RS2, RS4. The servo apparatus 530 of the clutch E is positioned. Accordingly, the servo apparatus 530 comprises the piston 531, the piston reset element 532, the pressure chamber 533, the structural plate 535 and the pressure compensation chamber 536. The piston 531 is supported on the outer disk carrier 510 in an axially, slidable manner and forms, in combination with the outer disk carrier 510, the pressure chamber 533 which, by way of a fluid feed system 534 can be pressurized. On that side of the piston 531, which is located opposite to the pressure chamber 533, i.e., on that side of the piston 531, proximal to the fourth planetary gearset RS4, is placed the pressure compensation chamber 536, which has been formed by the piston 531 and the structural plate 535, which is axially placed on the outer disk carrier 510. The pressure compensation chamber 536 can be filled with unpressurized fluid, to compensate for the rotational pressure generated by the pressure chamber 533 which rotates at the same rotational speed as the shaft 8. A corresponding fluid feed system is designated as 537. Axially disposed between the piston 531 and the structural plate 535, is the reset element 532 which, for example in this case, is constructed as a plate spring and is installed in the compressed state. If the pressure chamber 533 of the servo apparatus 530 is filled with fluid under pressure, then the piston 531 biases its assigned disk set 500 counter to the spring force of the reset element 532 in the direction of the input side of the transmission, i.e., axially in the direction of the second planetary gearset RS2. The piston 531 of the servo apparatus 510 of the clutch E then encloses the common inner disk carrier 320, 520 of the clutches C, E in a sectional manner.

The servo apparatus 430 dedicated to the disk set 400 of the clutch D, is located when spatially viewed, predominately on that side of the outer disk carrier 510 of the clutch E, which is remote from the nested gear group RS2, RS4 and, simultaneously, is also proximal to the first planetary gearset RS1, in this arrangement then, directly borders the outer disk carrier 510 of the clutch E, i.e., directly borders the shaft 8 of the transmission. Accordingly, the servo apparatus 430 includes a piston 431, a piston reset element 432, a pressure chamber 433, a structural plate 435 and a pressure compensation chamber 436. The piston 431 is axially and slidably mounted on the outer disk carrier 510 of the clutch E and forms, in combination with this outer disk carrier 510, the pressure chamber 433 which, by way of a fluid feed system 434, can be pressurized by the inflow of pressurized fluid. Accordingly, the pressure chambers 433 and 533 of the clutches D directly neighbor each other and are kept apart only by a shell-like covering of the outer disk carrier 510. On that side of the piston 431, opposite the pressure chamber 433 of the clutch D, thus being on that side of the piston 431, which is proximal to the first planetary gearset RS1, is the pressure compensation chamber 436, which is created by the piston 431 and the structural plate 435, which is axially fixed to the outer disk carrier 510 and, when the pressure chamber is filled with unpressurized hydraulic fluid offsets the rotational pressure generated by the pressure chamber 433, which continually rotates at the same rotational speed as the shaft 8. The corresponding fluid feed system is designated with the reference number 437. Axially aligned, between the piston 431 and the structural plate 435 is the reset element 432 which, in this case, is composed of a plate spring, installed under stress. If the pressure chamber 433 of the servo apparatus 430 is filled with pressurized fluid, then the piston 431 biases its assigned disk set 400 of the clutch D counter to the force of the reset element 432, thus moving the disk set 400 axially in the direction of the first planetary gearset RS1, i.e., axially in a direction contrary to the transmission input side. Corresponding to the spatial condition of the disk set 400 of the clutch D in an area between the planetary gearsets RS3 and RS2, the piston 431 of the servo apparatus 430 possesses an effective element acting on the set 400, which the outer disk carriers 510, 410 of the two clutches E, D, radially and axially embrace, and which acts from the side thereof against the disk set 400, which lies opposite to the pressure chamber 433 of this servo apparatus 430. Advantageously, the piston 431, along with its effective activation element on the disk set 400, complementary in shape to the outside contour of the outer disk carriers 510, 410.

As is evident in FIG. 12, the shaft 5 of the transmission, which of itself effects the connection between the ring gear HO2 of the secondary planetary gearset RS2 and the sun gear SO1 of the first planetary gearset RS1, that is, their connection location to the sun gear SO1 the cylindrical space, which has been formed by the shaft 8, i.e., the common outer disk carrier of the clutches D, E. The shaft 6 of the transmission, which makes the connection between the ring gear HO3 of the third planetary gearset RS3 and the carrier ST1 of the first planetary gearset RS1, thus completely passes over all three clutches C, D, E and the second planetary gearset RS2 in an axial direction.

Figure 13:
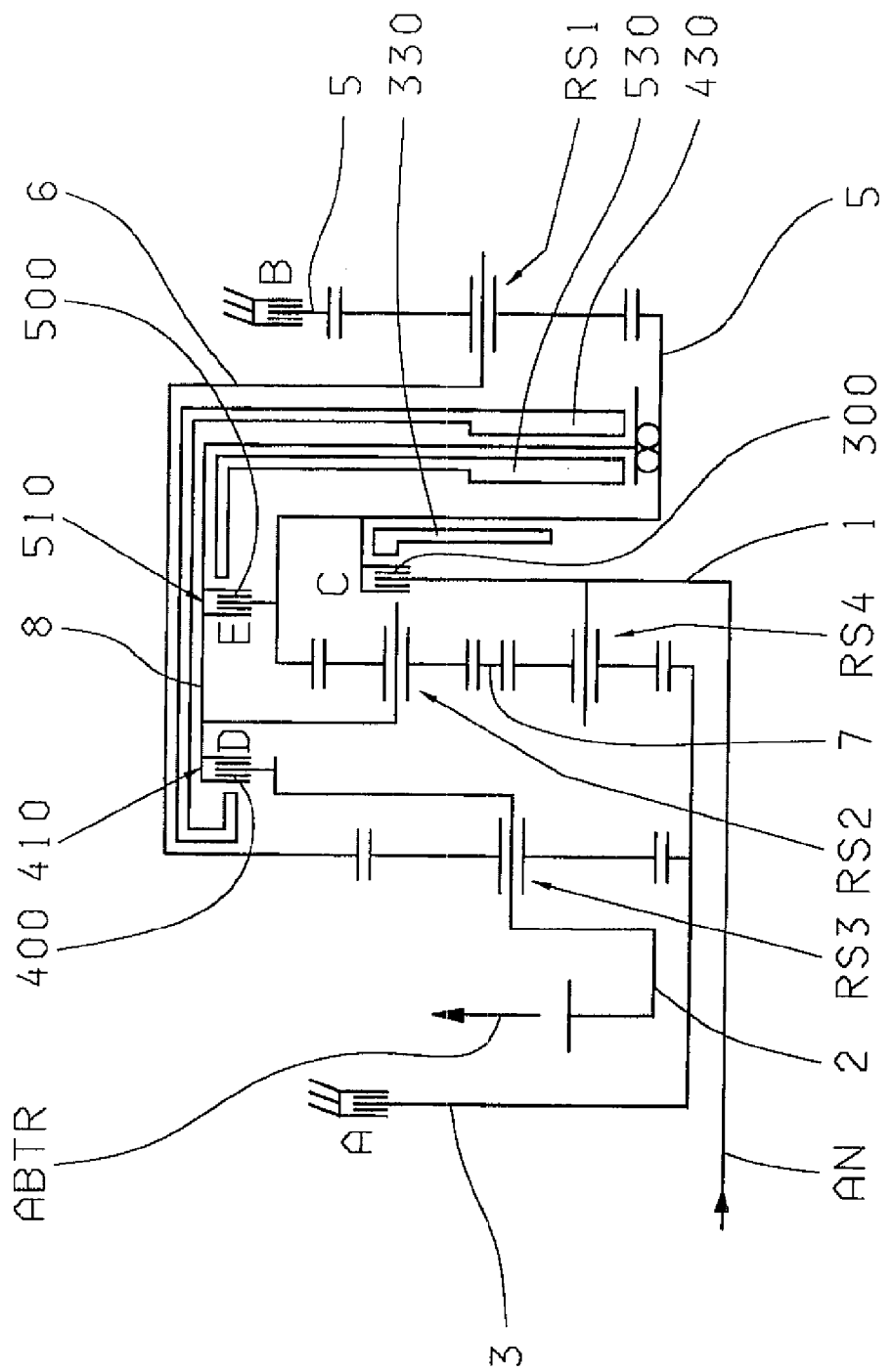
FIG. 13 is a simplified, schematic presentation of the multi-speed transmission in accord with FIG. 12.

For a better understanding of the kinematic couplings of this second embodiment of an invented multi-speed transmission, FIG. 13 shows a simplified, schematic presentation of this multi-speed transmission in accord with FIG. 12.

Figure 14:
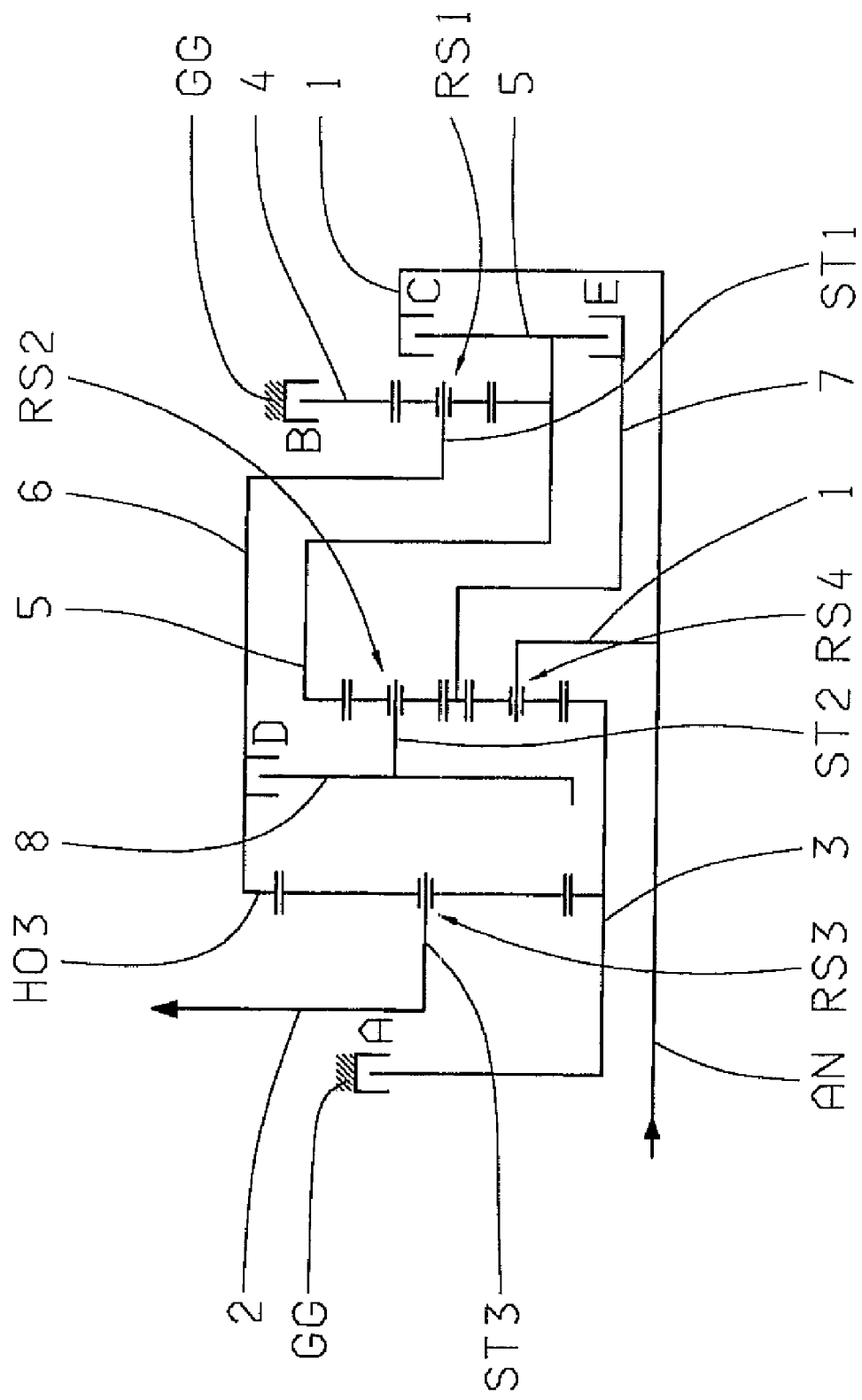
FIG. 14 is a schematic presentation of a third embodiment of an invented multi-speed transmission.

In FIG. 14, we see a third embodiment of an inventive multi-speed transmission, based on a planetary gear concept and a previously described spatial arrangement of FIG. 5. The single difference to the arrangement of FIG. 5 concerns a kinematic connection of the clutch D to planetary gear elements, i.e., to the transmission shafts. Contrary to FIG. 5, the clutch D is now located in the power flow between the transmission shafts 6 and 8. In accord with FIG. 13, the carrier ST1 of the first planetary gearset RS1 which is continually bound to the ring gear HO3 of the third planetary gearset RS3, can now be bound to the carrier ST2 of the second planetary gearset RS2 by way of the clutch D. Further in accord with FIG. 13, the shaft 2, i.e., the carrier ST3 of the third planetary gearset RS3 cannot be connected to any other planetary gear element. The arrangement presented in FIG. 2 showing the shifting logic adapted from FIG. 1 can also be fully accepted for the multi-speed transmission as presented in FIG. 13. Comment, however, should be made that, due to the modified kinematic connection of the clutch D as shown in FIG. 13, as compared to the scheme shown in FIG. 1, allows for different ratios than those available in FIG. 2.

Figure 15:
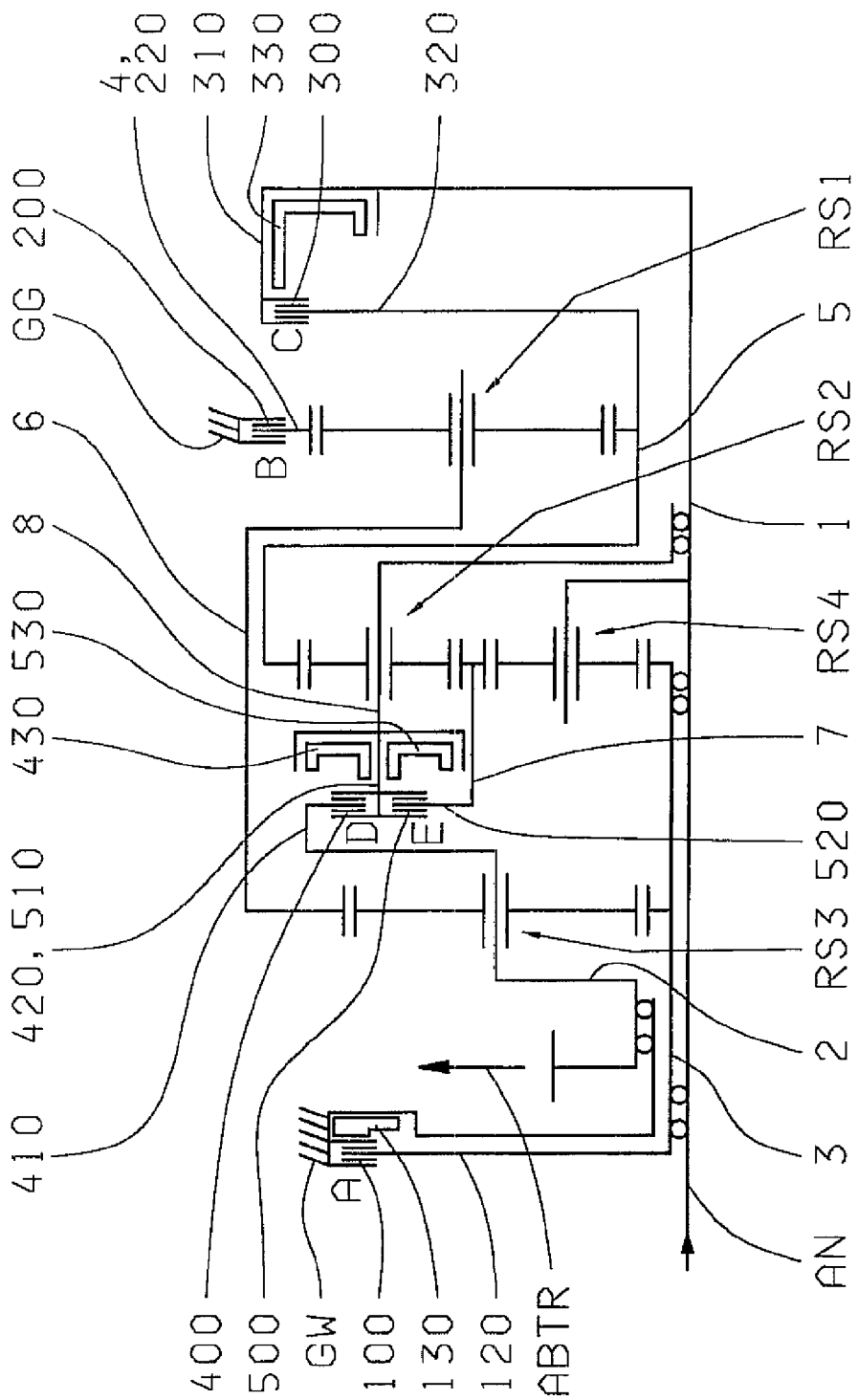
FIG. 15 is a schematic presentation of a fourth embodiment of an invented multi-speed transmission.

In FIG. 15, finally, is presented a fourth embodiment of an invented multi-speed transmission, based on the completely explained planetary gearset concept as typified by FIG. 1, and here having four planetary gearsets RS1 to RS4, eight shafts 1 to 8, which are assigned to various planetary gear elements, as well as five shifting elements A to E, for the kinematic coupling of the planetary gear elements with one another and with input and output drive shafts. Beginning with the consideration, that the fifth clutch E is provided only for the purpose of locking the second planetary gearset RS2, then the planetary gearset scheme of the multi-speed transmission in accord with FIG. 15 differs from the previously depicted first embodiment in FIG. 1 by showing a first embodiment of an invented multi-speed transmission principally by way of the connection of this fifth clutch E. In the differentiation to FIG. 1, wherein the engaged clutch E locks the second planetary gearset RS2 by the connecting of the ring gear and the sun gear of this planetary gearset RS2 (connection of the shafts 5 and 7), in accord with FIG. 15, the provision is now, that the fifth clutch E is placed in the power flow between the seventh shaft 7 and the eighth shaft 8. As is the case of FIG. 1, in FIG. 15, the shaft 7 is also continually associated with the ring gear of the fourth planetary gearset, which is continually bound with the sun gear of the second planetary gearset RS2. Further the shaft 8 is associated by the carrier of the second planetary gearset RS2, which is continually bound to the sun gear of the first planetary gearset RS1. If the clutch E, i.e., the clutch E, is engaged, then the second planetary gearset is locked.

As is the case in FIG. 1, in FIG. 15 provision is made, that the fourth shifting element D, is placed in the power flow between the second shaft 2 and the eighth shaft 8. Similar to FIG. 1, FIG. 15 shows the shaft 2 being associated with the carrier of the third planetary gearset RS3, which is continually bound to the output shaft ABTR of this transmission. This kinematic coupling of the two clutches D and E with the planetary gearsets enables an advantageous constructive design of these two clutches D and E, so that they appear as a component group, which, when spatially considered, can be directly located axially between the third planetary gearset RS3 and the planetary gearset group which is formed out of the second and fourth planetary gearsets RS2, RS4 as is shown as an example in FIG. 15. Advantageously, then the clutch D, when seen in the radial direction, is placed above the clutch E, thus being at a greater diameter than the clutch E. As is shown as an example in FIG. 15, it is possible that this clutch component group can possess a common disk carrier for both the clutch D and E. This common disk carrier could function as an inner disk carrier 420 for the retention of, for example, inward toothed inner disks of the disk set 400 of the clutch D and as an outer disk carrier 510 for the retention of the outward toothed steel disks of the disk set 500 of the clutch E and simultaneously, slidingly accepts the servo-apparatuses 430, 530 of these to clutches D, E. These servo-apparatuses 430, 530 turn at the same speed of rotation as the shaft 8 and serve the clutches D, E for the activation of the respective sets 400, 500.

As is described in FIG. 15, in an exemplary manner, it is possible that the second shifting element B—here shown, for example, as a disk brake equipped with the disk set 200—is located in a simple way in an area radially above the first planetary gearset RS1, which is axially located on that side of the planetary gearset group, which is made up of the second and fourth planetary gearsets RS2, RS4 and which side lies opposite to their clutch group D and E. The servo-apparatus which is dedicated to the disk set 200 is only simply shown in FIG. 15, thus without great detail and could, actually, be located on either side thereof. One possibility would be that it could be integrated within the transmission housing. The third clutch C with its disk set 300 and its servo-apparatus 330, which latter rotates continually at the speed of rotation of the of input shaft AN, attaches itself axially onto the first planetary gearset RS1 on that side thereof which is remote from the planetary gearset RS2, RS4. The first shifting element A—here designed as a disk brake with the disk set 100—is placed on the side of the third planetary gearset RS3, which is opposite to the planetary gearset RS2, RS4, whereby axially between brake A and the planetary gearset RS3, the output shaft ABTR of the transmission is coupled to the carrier of the planetary gearset RS3. The servo-apparatus 130 of the brake A, for the activation of its disk set 100, is connected on that side of the disk set which is proximal to the planetary gearset RS3 and is integrated into a transmission housing affixed housing wall GW, onto which also at least one spur gear or sprocket of the output shaft ABTR is permanently located and affixed to the carrier of the planetary gearset RS3. It is possible that the servo-apparatus 130 could be placed on the other side of the disk set 200.

In regard to the spatial arrangement of the individual shafts of the transmission, the transmission, as set forth in FIG. 15 is comparable to the arrangement shown in FIGS. 1 and 4, and can be seen as follows: the first shaft 1 partially and centrally extends within shaft 3 and sectionally within the fifth shaft 5, the third shaft 3 sectionally and centrally within the eighth shaft 8 and sectionally and centrally within the second shaft 2, and the fifth shaft 5 runs sectionally within the sixth shaft 6. The arrangement is such, that the sixth shaft 6 encompasses the fourth and fifth clutches D, E as well as partially extending over the planetary gearset RS2 in an axial and radial direction.

Obviously, the variant arrangements of construction as described in the FIGS. 4 to 11 are not limited to the application of the planetary gearset concept as seen in FIG. 1. An expert could easily apply these variants to other invented planetary gearset concepts, as these are depicted in the FIGS. 12, 13, 14 and 15.

FIG. 16 presents an exemplary overview, in tabular form, of advantageous variations of the spatial arrangements of the transmission elements with emphasis on their relationships to one another. The depicted table retains the nomenclature which has already been established for the output stage, the planetary gearsets, the disk sets of the shifting elements and the servo-apparatuses of the shifting elements. Correspondingly, from this point on, in regard to FIGS. 17 to 24, eight additional constructive, advantageous component variants for the multi-speed transmission of FIG. 1 are briefly explained and with the aid of FIGS. 25 to 28 are presented for further constructive, advantageous variants of the multi-speed transmission of FIG. 12, i.e., of FIG. 13. As said, the associated variant arrangements will be explained in accord with the established nomenclature for the same transmission components.

Figure 17:
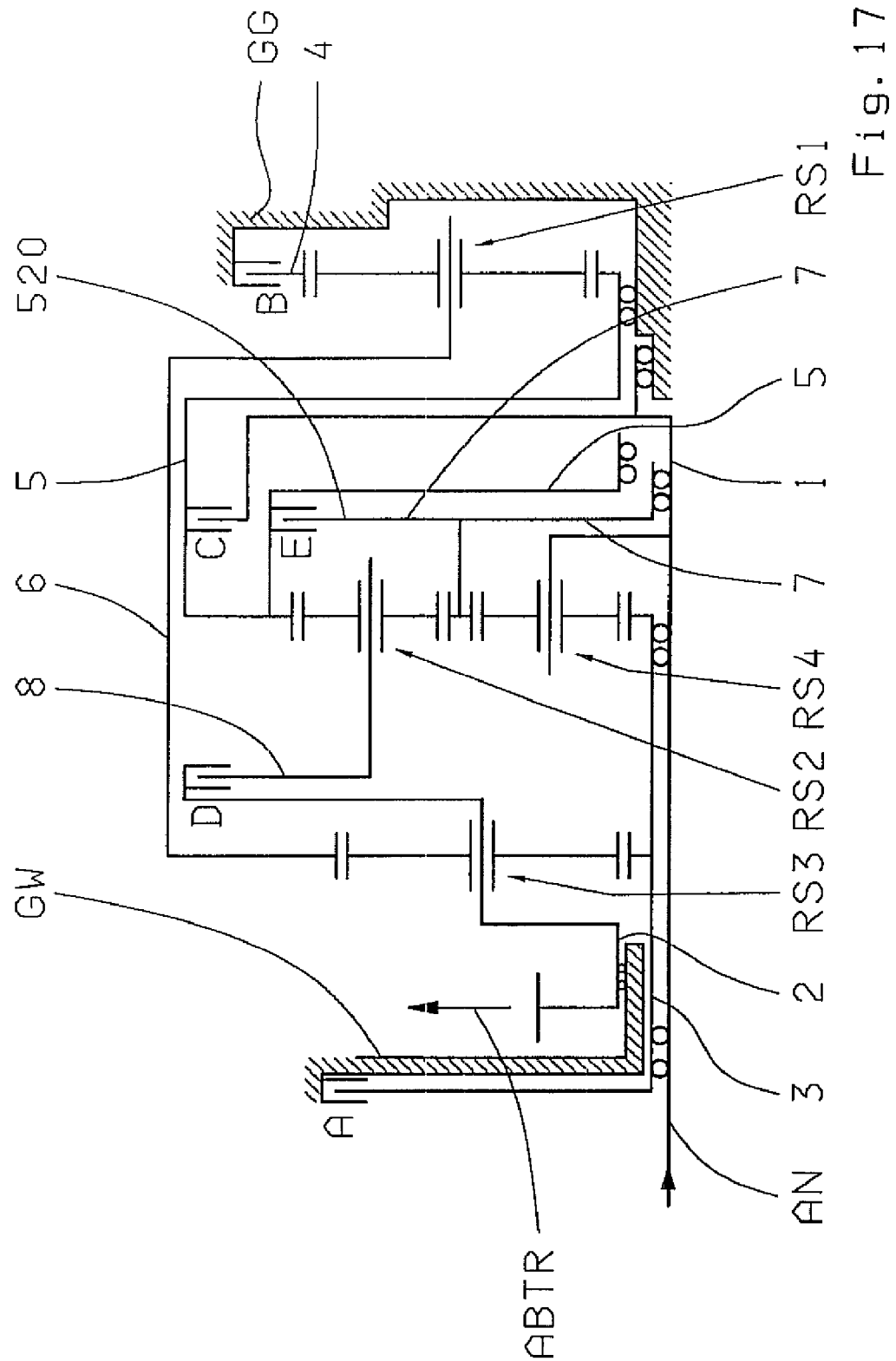
FIG. 17 is an exemplary eighth component variation for the multi-speed transmission in accord with FIG. 1.

FIG. 17 shows, in an exemplary manner, the above mentioned eight constructive component arrangement variations for the multi-speed transmission shown in FIG. 1. These are based on the arrangement according to the FIG. 1. However, as an essential difference from FIG. 1, the clutch C, when spatially considered, is now in an area located radially above the clutch E, whereby the installation space within the transmission housing GG in the area between the comparatively radially large planetary gearset RS2, RS4 and the smaller individual planetary gearset RS1 is well adapted to this installation. Three elements, namely the shaft 7, the sun gear of the radially outer planetary gearset RS2 and the ring gear HO4 of the radially inner planetary gearset RS4, are here grouped to include an inner disk carrier 520 for the clutch E and in a simple manner are rotationally affixed to the shaft 1 of the input shaft AN.

In regard to the spatial arrangement of the individual shafts of the transmission, in accord with FIG. 17, the transmission is shown to be similar to the transmission depicted in FIG. 15, however, with four details added, these being: the first shaft 1 partially and centrally extends within the third shaft 3, partially and centrally within the fifth shaft 5, partially and centrally within the seventh shaft 7; the third shaft 3 partially and centrally extends within the eighth shaft 8, partially and centrally within the second shaft 2; the seventh shaft 7 partially and centrally extends within the fifth shaft 5; the fifth shaft 5 centrally extends within the sixth shaft 6. In this arrangement, the sixth shaft 6 at least partially extends over the third, fourth and fifth clutches C, D, and E and the second planetary gearset RS2 in an axial and radial direction. A section of the first shaft 1 at least partially encompasses the fifth clutch E in an axial and radial direction.

Figure 18:
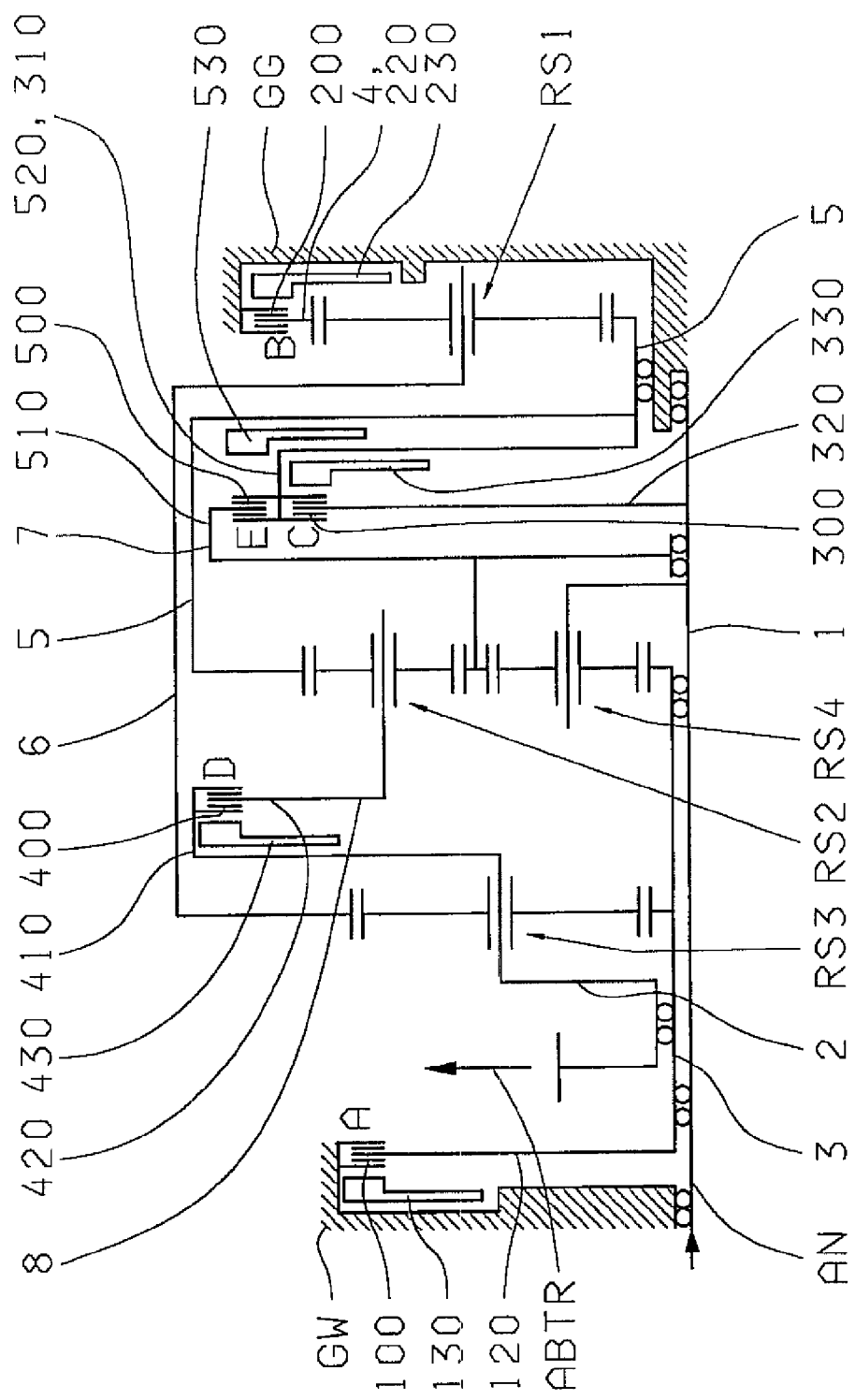
FIG. 18 is an exemplary ninth component variation for the multi-speed transmission in accord with FIG. 1.

FIG. 18 shows an exemplary ninth component arrangement variant for the multi-speed transmission as typified by FIG. 1, once again based on the component arrangement of the same. Special mention should be made, to the effect that in regard to the constructive assembly shown in FIG. 18, a clutch component group of two clutches C and E is concerned, wherein the disk set 500 of the clutch E, as seen spatially, is at least placed considerably distant radially over the disk set 300 of the clutch C and a common disk carrier is provided to serve both the clutches C and E, which provides for the clutch C an outer disk carrier 310 and for the radial outer clutch E serves as an inner disk carrier 520. Further, notice should be taken of the spatial arrangement shown in FIG. 18 for all servo-apparatuses 130, 230, 330, 430 and 530, these being respectively for the shifting elements A, B, C, D, and E. The placement of the shaft 7 on the shaft 1, that is to say, on the input shaft AN, is comparably favorable as is the case for FIG. 17, absent that, in FIG. 18 the outer disk carrier 510 of the clutch E forms a section of this said seventh shaft 7.

Up to the detail, that the first shaft 1 of the transmission does not encompass the fifth clutch E in an axial and radial direction, the spatial arrangement of the individual shafts of the transmission, as shown in FIG. 18, is identical to the arrangement shown of the shaft-arrangement of the transmission as presented in FIG. 17.

Figure 19:
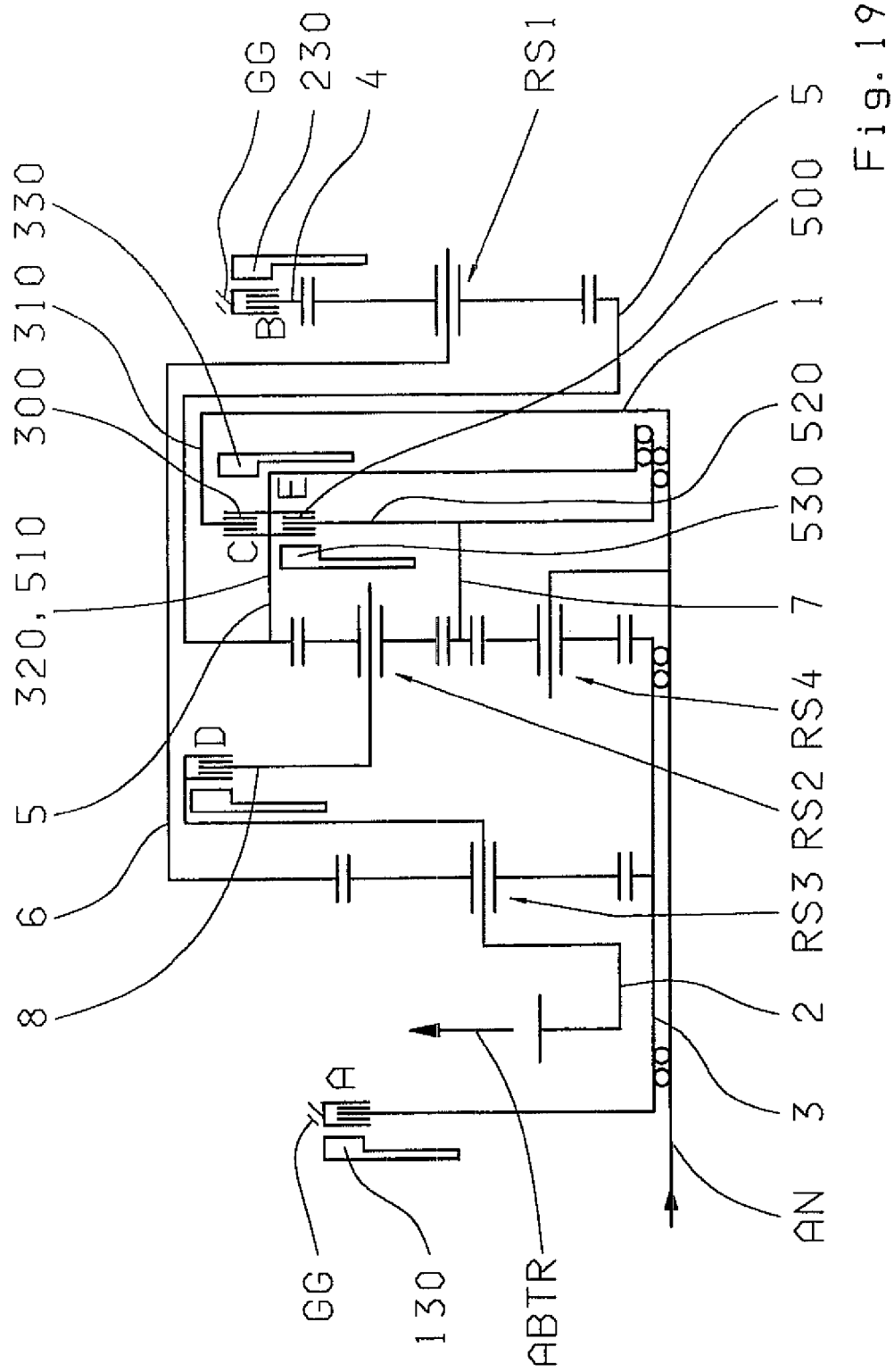
FIG. 19 is an exemplary tenth component variation for the multi-speed transmission in accord with FIG. 1.

FIG. 19 shows, in an exemplary manner, a tenth component arrangement variant for the multi-speed transmission in accord with FIG. 1, once again based on the component arrangement of that FIGURE. Particular attention should be paid to the fact, that a constructive design is presented in FIG. 19, showing a clutch component group with the two clutches C and E, whereby the disk set 300 of the clutch C, seen with spatial consideration, at the least, is placed considerably radially above the disk set 500 of the clutch E and is designed to serve as a common disk carrier for both clutches, C and E, wherein, for example, it is provided for the radially inner clutch E as an outer disk carrier 510 and for the radially outer clutch C as an inner disk carrier 320. Depending on whether or not the servo-apparatus 330 of the clutch C is to be axially slidable on the common disk carrier for C and E, or is to be as axially slidable in the cylinder space of the outer disk carrier 310, the servo-apparatus 330 rotates continually at the speed of rotation of the shaft 5 or else continually at the speed of rotation of input shaft AN, that is to say, of the shaft 1. The integration of the servo-apparatus into the outer disk carrier 310 enables a particularly advantageous and simple transfer of means for pressure and lubrication to this servo-apparatus 330. The presented arrangement of the servo-apparatus 530 of the clutch E on that side of its assigned disk set 500, which is proximal to the planetary gearshift set group RS2, RS4, can be seen as an example; it is also possible, without difficulty, to place this servo-apparatus on the other side of the disk set 500, without the danger of infringing on the efficiency of the delivery of the lubrication and hydraulic fluid to the servo-apparatus 530.

The spatial arrangement of the individual shafts of the transmission as set forth in FIG. 19 is comparable to the arrangement of shafts of the transmission as shown in FIG. 17.

Figure 20:
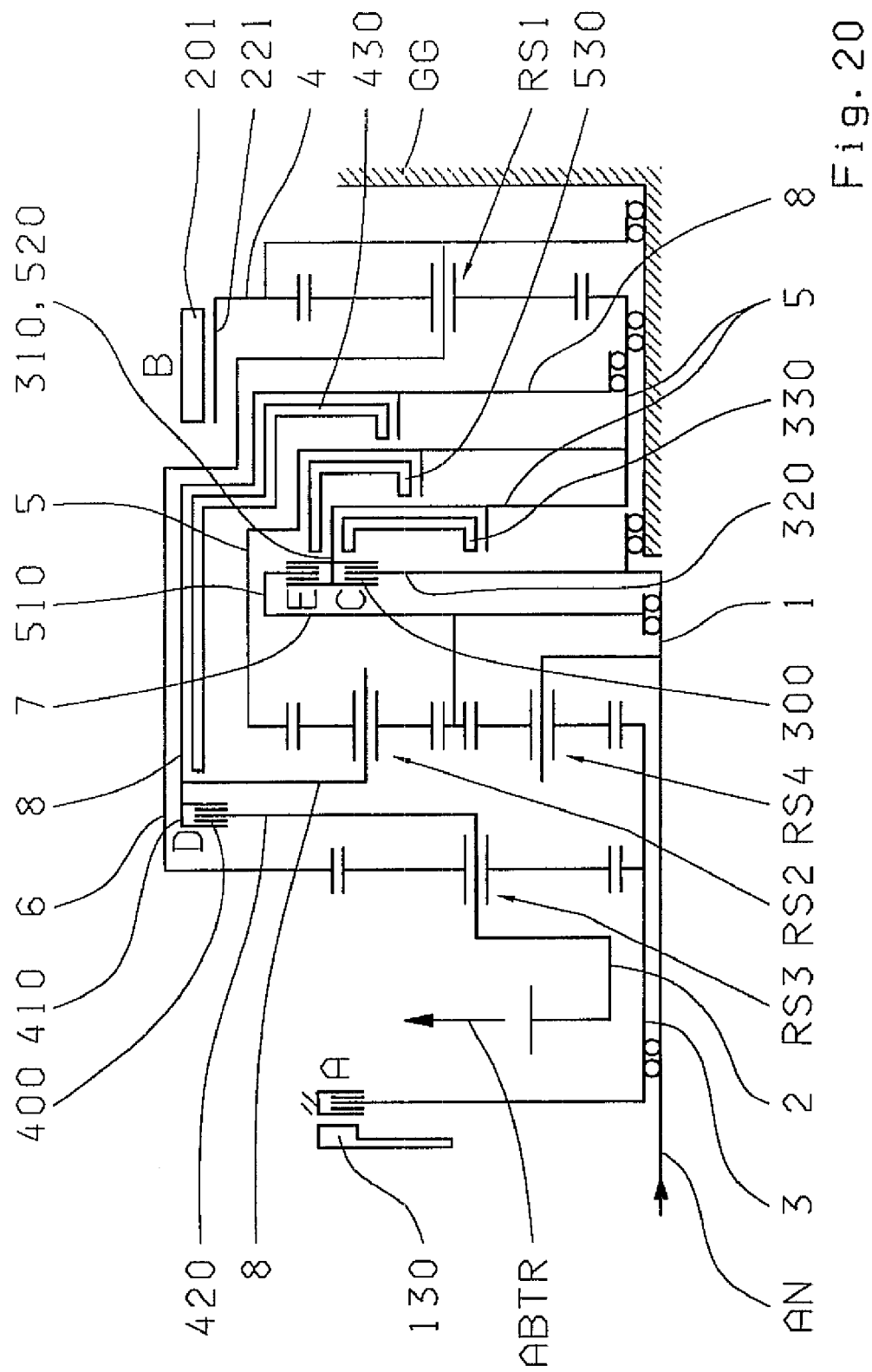
FIG. 20 is an exemplary eleventh component variation for the multi-speed transmission in accord with FIG. 1.

FIG. 20 shows an exemplary eleventh component arrangement variant for the multi-speed transmission in accord with FIG. 1. Particular mention should be made in regard to three items, these being, first, the design of the brake B, which now appears as brake band 201, second, the mode of construction of the clutch group C, E, which is similar to that in FIG. 18 and third, the designed arrangement of the clutch D, which is similar to that of FIGS. 12, 13. Although the disk set 400 of the clutch D, when spatially viewed, is placed between the individual planetary gearset RD3 and the planetary gear group RS2, RS4, the servo-apparatus 430 assigned to the disk set 400 is, at least predominately,—that is to say, at least with its pressure and compensation chambers—to be found in an area between the planetary gearset group RS2, RS4 and the individual planetary gearset RS1 and proximal to the planetary gearset RS1. In this arrangement, the servo-apparatus 430 is axially slidably located on the outer disk carrier 410, which forms a section of the shaft 8 and completely extends over in an axial direction both the planetary gearset group RS2, RS4 as well as the shifting elements C and E and in an area proximal to the sun gear of the first planetary gearset RS1 is rotationally fixed to a section of the shaft 5, that is, on the sun gear of the first planetary gearset RS1. By the projecting part of the piston of the servo-apparatus 430, which activates the disk set 400, the servo apparatus 430 completely extends over the planetary gearset group RS2, RS4 as well as the clutch group of C and E in the axial direction and passes through, in a location proximal to the disk set 400, a cross-tie of the second planetary gearset RS2, which is rotationally fixed as a section of the shaft 8 with the outer disk carrier 410 of the clutch D. In regard to this, the cross-tie of the second planetary gearset RS2 possesses axial openings, that is, penetrative borings, which correspond to the position of the penetrating projective parts of the piston of the servo-apparatus 430 of the clutch D.

The design of the brake B as band brake 210 comprises both a brake band cylinder 221, which as shaft 4 is bound with the ring gear of the first planetary gearset RS1, and a servo-apparatus, which is not shown here in greater detail, but which serves for the activation of this brake band 201 in an axial direction. Seen along the axial direction, the brake band 201 extends from the ring gear of the planetary gearset RS1 in the direction of the planetary gearset group RS2, RS4, by way of which the axial length of the transmission is comparatively shortened.

Figure 21:
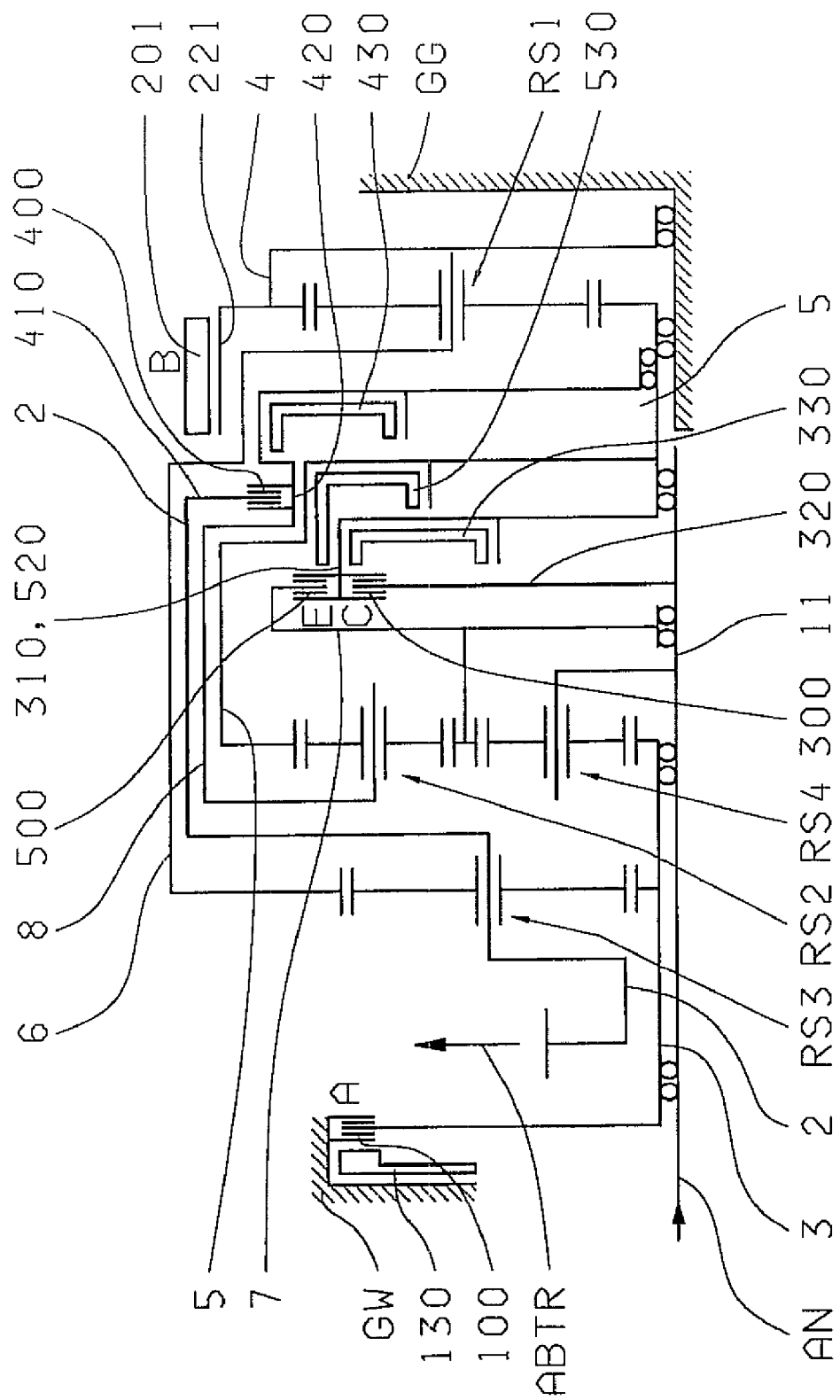
FIG. 21 is an exemplary twelfth component variation for the multi-speed transmission in accord with FIG. 1.

In regard to the spatial arrangement of the individual shafts of the transmission, the transmission, in accord with FIG. 21—in a manner similar to that of the transmission as shown in FIGS. 12, 13—presents: the first shaft 1 partially and centrally extending within the third shaft 3 and partially and centrally within the fifth shaft 5; the third shaft 3 extends centrally and partially within the eighth shaft 8 and centrally and partially within the second shaft 2; the fifth shaft 5 extends centrally and partially within the eighth shaft 8; the eighth shaft 8 extends partially and centrally within the sixth shaft 6. In this arrangement, the sixth shaft 6 extends over, at least partially, the fourth shifting element D and the second planetary gearset RS2 in the axial and radial directions.

FIG. 21 shows an exemplary twelfth component arrangement variant for the multi-speed transmission as set forth in FIG. 1, based on the previously described component arrangement illustrated in FIG. 20. Differing from FIG. 20, however, the disk set 400 of the clutch D is now in axially located between the planetary gearset group RS2, RS4 and the individual planetary gearset RS1. Briefly stated, this is to be found axially situated between the disk set 500 of the clutch E and the planetary gearset RS1. Spatially viewed, in this arrangement, the disk set 400 is placed somewhat radially above the servo-apparatus 530 of the clutch E. The inner disk carrier 420 of the clutch D forms a section of the shaft 8 and is correspondingly bound continually with the carrier of the second planetary gearset RS2. The outer disk carrier 410 of the clutch D forms a section of the shaft 2 and is correspondingly continually bound with the carrier of the third planetary gearset RS3 and the output stage ABTR. The servo-apparatus 430 of the clutch D is placed on that side of its assigned disk set 400 of the clutch D, which is proximal to the first planetary gearset RS1. In this arrangement, the servo-apparatus 430 is axially slidable and is located within a cylinder which is between the clutch component group C, E and the first planetary gearset RS1, thus axially bordering the first planetary gearset RS1 and in the area of the sun gear of this planetary gearset RS1 on a section of the shaft 5, i.e., is rotationally fixed on the sun gear of the planetary gearset RS1. The cylinder is on that side of the disk set 400, proximal to the first planetary gearset RS1, and is rotationally fixed to the inner disk carrier 420. For example, by way of an appropriate pickup toothing, which extends first, from that end of the cylinder, which is proximal to the disk set 400 and second, to the outside diameter of an inner disk carrier section, which proceeds from the inside diameter of the disk set 400 radially to the outside. For the activation of the disk set 400, the servo-apparatus 430 possesses a piston with activation projections extending axially and which penetrate the radially extending section of the inner disk carrier 420 in the axial direction. Correspondingly, the radially directed section of the inner disk carrier 420 possesses openings in the axial direction, i.e., through-borings, which correspond to the activation projections of the piston of the servo-apparatus 430.

In regard to the spatial arrangement of the individual shafts of the transmission, FIG. 21 presents the following arrangements: the first shaft 1 extends in partially and centrally within the third shaft 3 and partially and centrally within the seventh shaft 7; the third shaft partially and centrally extends within the eighth shaft 8 and partially and centrally within the second shaft 2; the seventh shaft 7 partially and centrally extends within the fifth shaft 5; the fifth shaft 5 partially and centrally extends within the eighth shaft 8; the eighth shaft 8 centrally extends within the second shaft 2 and finally the second shaft 2 partially and centrally extends within the sixth shaft 6. In this arrangement, the sixth shaft 6 partially extends over in the axial and radial direction both the third, fourth and fifth shifting elements C, D and E as well as the second planetary gearset RS2.

Figure 22:
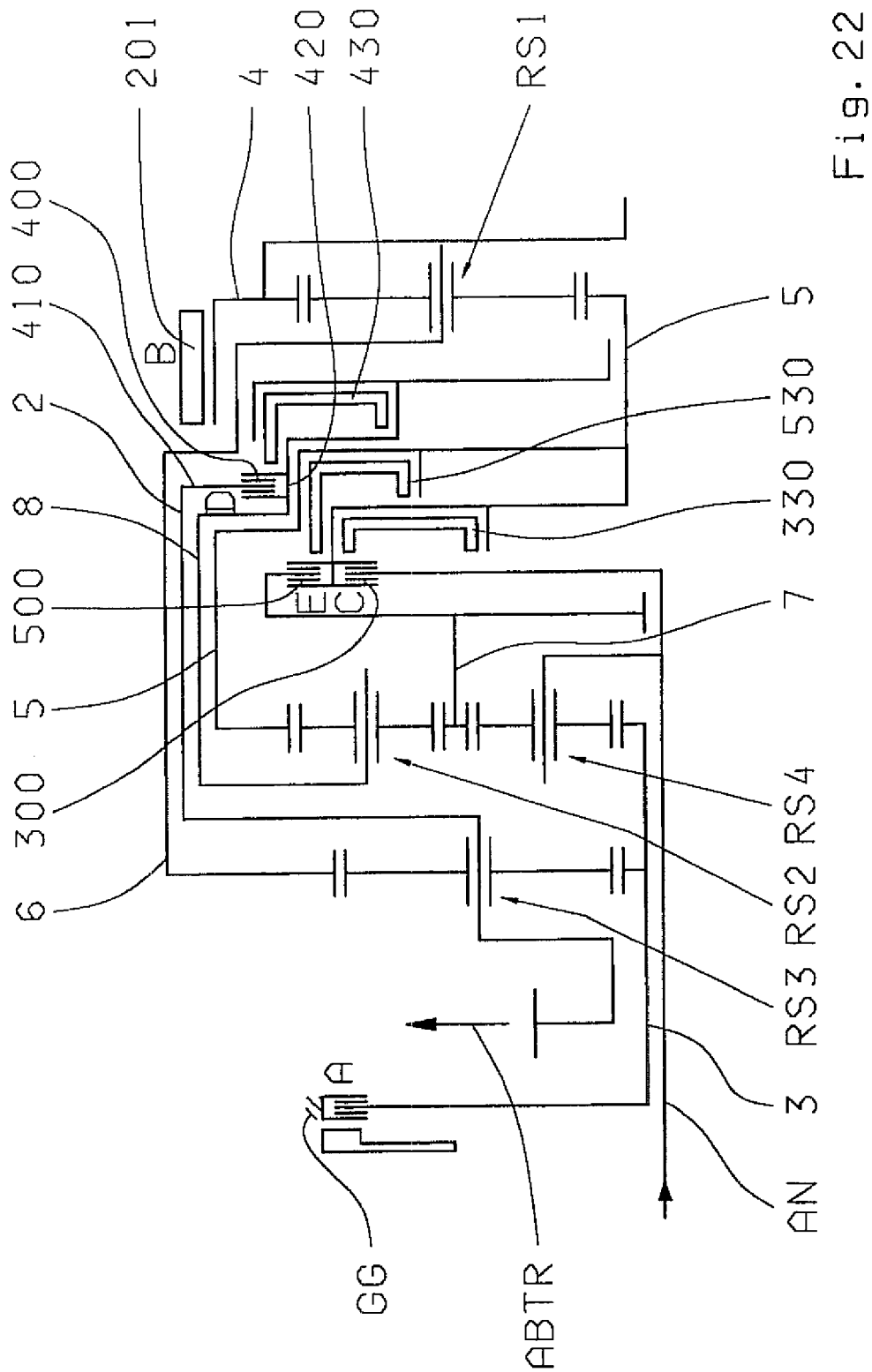
FIG. 22 is an exemplary thirteenth component variation for the multi-speed transmission in accord with FIG. 1.

FIG. 22 shows an exemplary presentation of a thirteenth component arrangement variant for the multi-speed transmission in accord with FIG. 1, based on the previously described component arrangement variant as seen in FIG. 21. The difference from FIG. 21 is principally in the placement of the servo-apparatus 430 of the clutch D. For simplification of mounting, the inner disk carrier 420 is now designed as a cylinder, which extends axially from the disk set 400 of the clutch D in the direction of the first planetary gearset RS1 and in proximity to this same first planetary gearset RS1 is rotationally fixed to a part of the shaft 5, that is, fixed to the sun gear of the first planetary gearset RS1. In this arrangement, the servo-apparatus 430 is placed on that side of the disk set 400, which is proximal to the first planetary gearset RS1 and, when spatially considered, is radially above the outer circumferential surface of the cylindrical inner disk carrier 420, but nevertheless, is slidably affixed on this cylindrical inner disk carrier 420. In further regard to the arrangement of the individual shafts of the transmission, the transmission of FIG. 22 is similar to the transmission described in FIG. 21.

Figure 23:
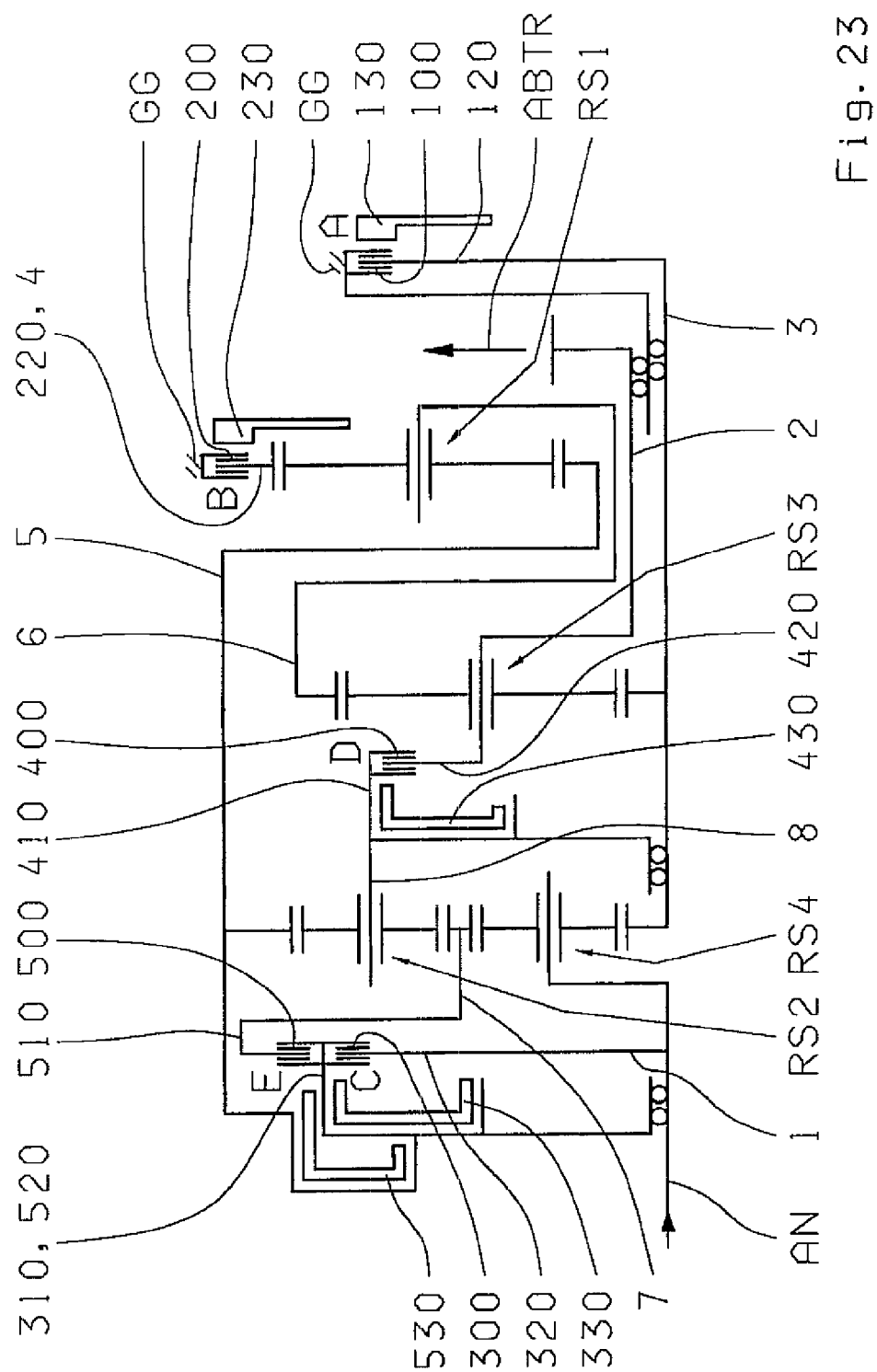
FIG. 23 is an exemplary fourteenth component variation for the multi-speed transmission in accord with FIG. 1.

FIG. 23 shows an exemplary presentation of a fourteenth component arrangement variant for the multi-speed transmission in accord with FIG. 1. As an essential detail, comment is made here in regard to the changed axially directed succession of the planetary gearsets, this being an alteration from FIG. 1. In this new succession, the second and the fourth planetary gearsets RS2, RS4 form, in an unaltered manner, a single planetary gearset grouping, along with which the second planetary gearset RS2 is located radially above the fourth planetary gearset RS4, and in this position having a continuous connection between the sun gear of the radially outer planetary gearset RS2 and the ring gear of the radially inner planetary gearset RS4. The planetary carrier of the second (radial outer) planetary gearset RS2 is, in a simple manner, rotationally fixed to the shaft 3.

By way of this exceptional, axially extending order of the planetary gearsets, the resulting kinematic coupling of the planetary gearset pair RS2, RS4 with the shifting elements enables the third and fifth clutches C, E to be united in a pre-mounted grouping, which can be placed on that side of the planetary gearset combination RS2, RS4, which is remote from the third planetary gearset RS3, i.e., is opposite thereto. That is to say, in this case, on that side of the planetary gearset RS2, RS4, which is proximal to the input shaft AN of the transmission. The fourth shifting element D is axially located between the so-positioned planetary gearsets RS2, RS4 and the third planetary gearset RS3. With this arrangement, the fourth shifting element directly borders, in the axial direction, both of the planetary gearset group RS2, RS4, as well as, the third planetary gearset RS3. The second shifting element B is, for example, in an area radially located above the first planetary gearset RS1. The first shifting element A is, for example, placed on that side of the first planetary gearset RS1 which is remote from the third planetary gearset RS3, whereby, axially located between the first planetary gearset RS1 and the brake A, a spur gear or a chain sprocket of the output stage ABTR is continually bound to the carrier of the third planetary gearset RS3.

In regard to the spatial arrangement of the individual shafts of the transmission, FIG. 23 exhibits the following examples: the first shaft 1 extends partially and centrally within the fifth shaft 5 and partially and centrally within the seventh shaft 7; the seventh shaft 7 extends centrally within the fifth shaft 5; the eighth shaft 8 extends centrally within the fifth shaft 5; the third shaft 3 extends partially and centrally within the eighth shaft 8 and centrally within the second shaft 2; the second shaft 2 extends sectionally within the fifth shaft 5 and sectionally and centrally within the sixth shaft 6; and the sixth shaft 6 extends centrally within the fifth shaft 5. In this arrangement, the fifth shaft 5 extends over the third, fourth and fifth shifting elements C, D, E as well as the second planetary gearset RS2 and the third planetary gearset RS3 in an axial and radial direction.

In an advantageous manner, the clutch component group C, E extends over a common disk carrier for the two clutches C and E, the disk sets 300, 500 of both clutches C and E and the servo-apparatuses 330, 530 of the two clutches C and E for the activation of the respective disk sets 300 and/or 500. The common disk carrier forms a section of the shaft 5, is also continually rotationally fixed to the ring gear of the second planetary gearset RS2 as well as with the sun gear of the first planetary gearset RS1. In accord with the design, the common disk carrier shown in FIG. 23 has been adapted as an outer disk carrier 310 for the clutch C and as an inner disk carrier 520 for the clutch E. The outer disk carrier 310 also extends over both of the axially slidable servo-apparatuses 330, 530 and is further rotationally fixed to the input shaft AN, that is to say, to the shaft 1.

It is an easy task for the expert, to see that the input drive of the transmission can be located on that side of the transmission, on which the brake A is placed, whereby the shaft 3 would be designed as an ring gear, which would radially encompass the first shaft 1, that is, the input shaft AN. To the expert the matter is also obvious, that the component arrangement in accord with FIG. 23 enables a particularly advantageous flow of pressure and lubrication means to all five shifting elements, namely, A to E.

Figure 24:
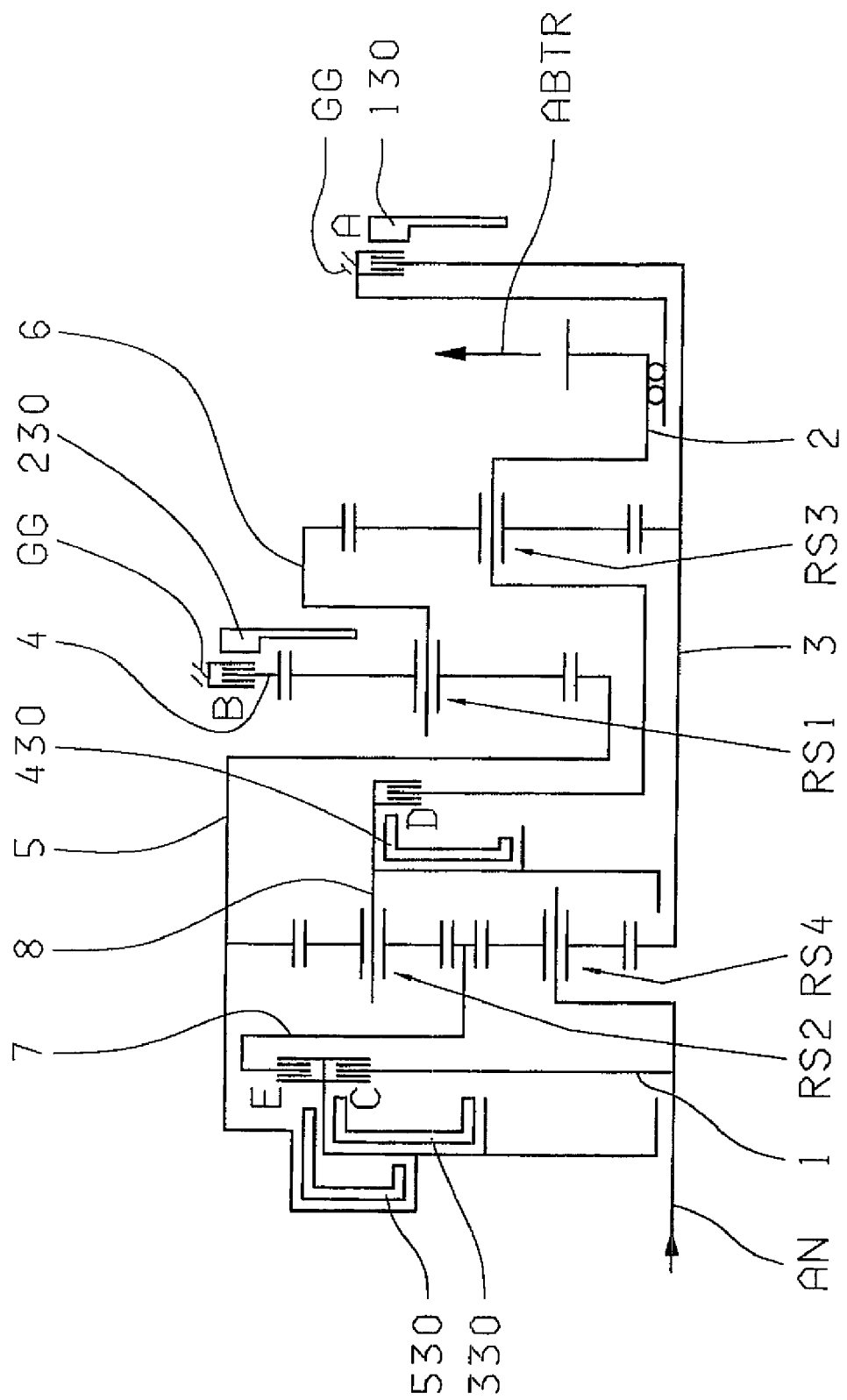
FIG. 24 is an exemplary fifteenth component variation for the multi-speed transmission in accord with FIG. 1.

FIG. 24 shows an exemplary fifteenth component arrangement variant for the multi-speed transmission in accord with FIG. 1 based on the previously more closely described arrangement of FIG. 23. The essential difference from the arrangement of FIG. 23 concerns the different axial order of the planetary gearsets, whereby, specially, also the spatial positioning of the clutch D relative to the two individual planetary gearsets RS1, RS3 was also changed. As is evident in FIG. 24, the four planetary gearsets are now aligned axially in the following sequence: Planetary gearset group RS2, RS4, then the first planetary gearset RS1 and finally the third planetary gearset RS3. Similar to the arrangement in FIG. 23, the carrier of the second (radial outer) planetary gearset RS2 is rotationally supported by in an advantageously simple manner on the shaft 3.

Similar to FIG. 23, the clutches C and E comprise a pre-mounted component group, which is to be placed on that side of the planetary gearset group RS2, RS4, which is remote from the other planetary gearsets RS3, RS1, but is proximal to the input shaft of the transmission. The clutch D is now located axially between the planetary gear group RS2, RS4 and the first planetary gearset RS1, thus, in this position, bordering directly and axially on the planetary gearsets. The second shifting element B is, as shown in FIG. 23, located in an area radially above the first planetary gearset RS1. The first shifting element A is now on that side of the third planetary gearset RS3, which is remote from the first planetary gearset RS1, whereby, axially located between the third planetary gearset RS3 and the brake A, is a spur gear or chain sprocket of the output shaft ABTR, which gear or sprocket is permanently bound to the carrier of the third planetary gearset RS3. The two simple planetary gearsets RS1 and RS3 are now also placed so as to be axially next to one another. As an advantage over FIG. 23, the sun gear of the first planetary gearset RS1, as seen in FIG. 24, is passed through by two shafts in the axial direction.

In regard to the spatial arrangement of the individual shafts of the transmission, the transmission shows in FIG. 24, the first shaft 1 extends partially and centrally within the fifth shaft 5 and partially and centrally within the seventh shaft 7; the seventh shaft extends centrally within the fifth shaft 5; the eighth shaft 8 extends centrally within fifth shaft 5; the third shaft 3 extends partially and centrally within the eighth shaft 8 and partially within the second shaft 2; the second shaft 2 extends partially and centrally within the fifth shaft 5 and partially and centrally within the sixth shaft 6; a section of the fifth shaft extends partially within the sixth shaft 6, whereby the fifth shaft 5 at least partially extends over the third, fourth and fifth clutches C, D, and E, as well as over the second planetary gearset RS2 in an axial and a radial direction.

To the expert, it is obvious, that—as already shown in FIG. 23—the input shaft can be arranged on the other side of the transmission, that is to say, can be located proximal to the brake A, in which case, the shaft 3 is designed as a ring gear, which is then radially encompassed by the shaft 1, i.e., the input shaft AN. The feed lines for the pressure fluid supply and the lubricant material, which extend to all five shifting elements A to E, is comparatively favorable in both cases of FIGS. 23, 24.

Subsequently, with reference to FIGS. 25 to 28, brief descriptions and explanations of yet four additionally designed, advantageous component arrangement variants for the multi-speed transmission in accord with FIGS. 12, 13 will be provided respectively, using the already established nomenclature for the for the transmission components.

Figure 25:
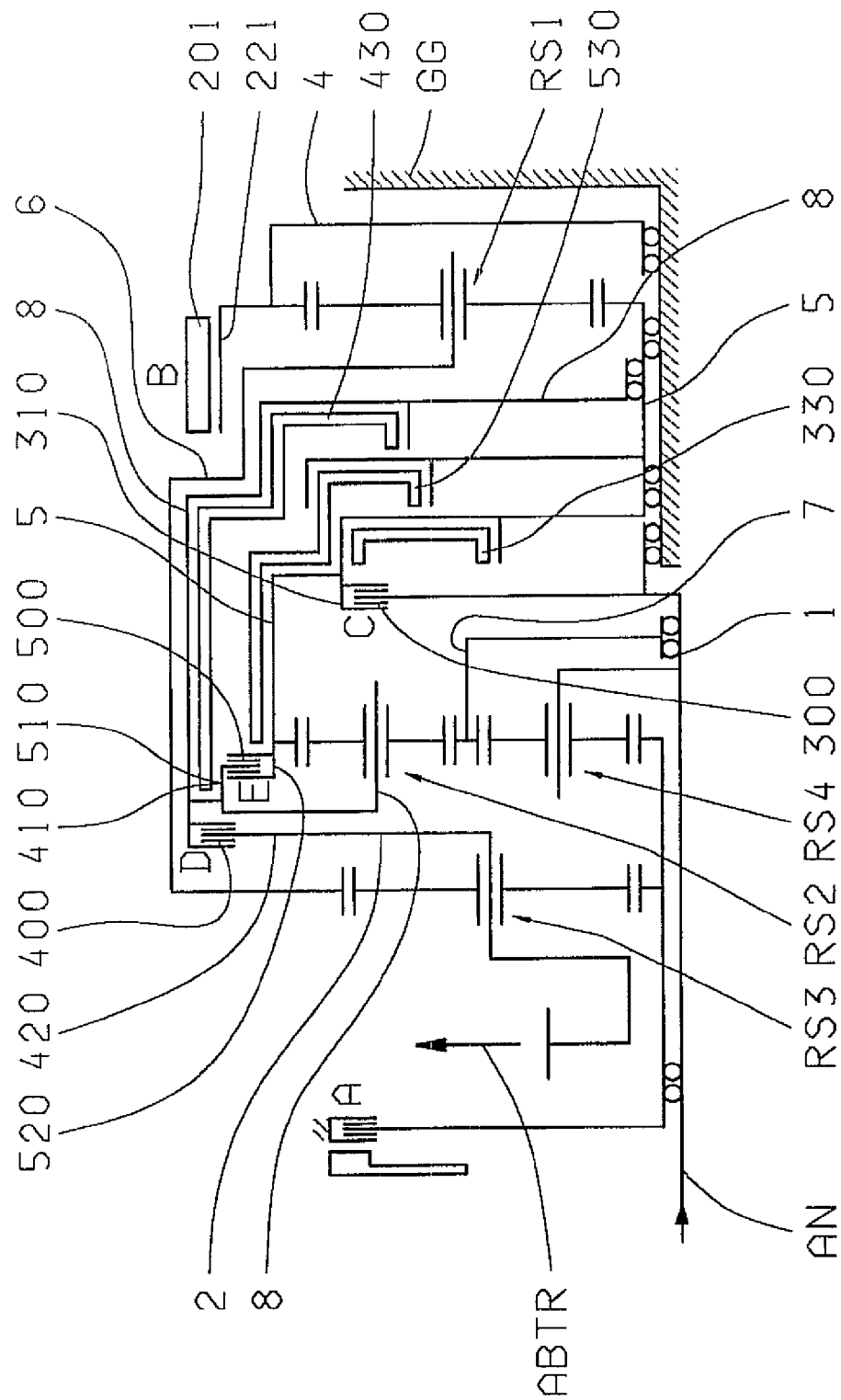
FIG. 25 is an exemplary first component variation for the multi-speed transmission in accord with FIG. 12, i.e., FIG. 13.

FIG. 25 shows an exemplary first component arrangement variant for the multi-speed transmission in accord with FIGS. 12, 13. Starting with the spatial arrangement of the planetary gearsets and shifting elements, as these are shown in FIG. 20 and maintaining the standpoint that the clutch E is only provided for the purpose of locking the second planetary gearset RS2, then the transmission, as presented in FIG. 20, in regard to the kinematic coupling of the clutch E, this is so modified, that this clutch is now in the power flow between the shaft 5 and the shaft 8, and also in the power flow between the ring gear and the carrier of the second planetary gearset RS2.

In order to be able to realize this kinematic coupling of the clutch E with the planetary gearset RS2 on the basis of the component arrangement according to FIG. 20, provision has now been made in FIG. 25, to the effect that the clutch E, when spatially considered, is no longer completely within the area axially situated between the planetary gearset group RS2, RS4 and the first planetary gearset RS1. Although the servo-apparatus 530 of the clutch E is nearly completely located axially between the planetary gearset group RS2, RS4 and the first planetary gearset RS1, the disk set 500 of the clutch E is now at least predominately on that side of the second planetary gearset RS2, which is remote from the first planetary gearset RS1, thus being at a somewhat comparatively greater diameter in the area of the ring gear of the second planetary gearset RS2 and proximal to the disk set 400 of the clutch D. In this arrangement, the inner disk carrier 520 of the clutch E is rotationally fixed with the ring gear of the second planetary gearset RS2 thereby forming a section of the shaft 5. Obviously, the expert would be able to see that the axial position of this disk carrier 500 could, upon need, be slidingly repositioned. The spatial position of the clutch C, is unchanged and is located directly and axially on the planetary gearset group RS2, RS4, that is, is located on that side thereof proximal to the first planetary gearset RS1, and is here simply the same as in FIG. 20. Likewise, in FIG. 25, the position of the pressure chamber (not shown in greater detail) of the servo-apparatus 530 of the clutch E is axially located on the clutch C on that side thereof proximal to the first planetary gearset RS1. The outer disk carrier 310, which forms a single section of the shaft 5, of the clutch C is now directly fixed to the ring gear of the second planetary gearset RS2. The servo-apparatus 530 of the clutch E possesses a piston, which piston extends axially over the outer disk carrier 310 of the clutch C and over that section of the shaft 5, which is located between the disk set 300 of the clutch C and the ring gear HO2 of the second planetary gearset RS2 and the piston extends further in an axial direction, over that same ring gear HO2 of the second planetary gearset so that the activation direction, upon engaging the clutch E (as in FIG. 20), will be toward the third planetary gearset RS3 with the result that, the disk set 500 is thereby engaged "by pressure". The outer disk carrier 510 of the clutch E forms a section of the shaft 8 and is bound on that side of the disk set 500, which is proximal to the third planetary gearset RS3, with the carrier of the second planetary gearset RS2. A more detailed explanation will be made in regard to this arrangement.

The sun gear of the second planetary gearset RS2 and the ring gear of the fourth planetary gearset RS4 are bound together and serve as shaft 7 of the transmission and are connected in a rotationally fixed manner to the input shaft AN, this being shaft 1.

As may be additionally seen in FIG. 25, the disk set 400 of the clutch D is axially located between the disk set 500 of the clutch E and the third planetary gearset RS3, now being at a somewhat greater diameter than the disk set 500. As is the case in FIG. 20, in this arrangement, the inner disk carrier 420 serving as a portion of the shaft 2 of the clutch D is fixed to the carrier of this third planetary gearset RS3. Again, similar to FIG. 20, the outer disk carrier 410 of the clutch D is a portion of the shaft 8 and is constructed to be a cylinder, which opens in the direction of the planetary gearset RS3. This cylindrical form starts at the disk set 400 and continues axially up to shortly before the first planetary gearset RS1. At this point, the cylindrical form is rotationally fixed, in the area of the sun gear of this first planetary gearset RS1, to the shaft 5, which, in other words, is being rotationally fixed to the above sun gear of the first planetary gearset RS1. The cylindrically shaped outer disk carrier 410 completely extends axially over the disk set 500, the second planetary gearset RS2 and the servo-apparatus 530 (as well as over the clutch C, which is radially enclosed by the servo-apparatus 530). As is shown in FIG. 20, the servo-apparatus 430 of the clutch D, within the cylindrically shaped outer disk carrier 410, is installed to be axially slidable. Also, in this arrangement, a pressure chamber (not further described) of this servo-apparatus 430, when spatially observed, is located axially between the (likewise not detailed) pressure chamber of the servo-apparatus 530 of the clutch E and the first planetary gearset RS1. Accordingly, a first piston of this servo-apparatus 430, actuates this disk set 400, completely extends over a second piston of the servo-apparatus 530 at least wholly or partially in the radial direction. Upon engaging the clutch D, then the disk set 400 is accordingly activated by pressure.

To establish a rotationally fixed connection between the outer disk carrier 420 of the clutch D and the carrier of the second planetary gearset RS2 and the outer disk carrier 510 of the clutch E, provision is made, that a cross-tie of the second planetary gearset RS2, or stated more exactly, that the outer disk carrier 510 of the clutch E, which is bound to this cross-tie, extends radially up to the cylindrical outer disk carrier 410 of the clutch D, on that side of the disk set 400 of the clutch D, which is remote from the planetary gearset RS3, is rotationally fixed to the cylindrical outer disk carrier 410. Correspondingly this radial section of the cross-tie, that is, of the outer disk carrier 510, possesses axially directed perforations through which extensions of the piston of the servo-apparatus 430 of the clutch D must penetratively move, in order to be able to activate the disk set 400.

In regard to the spatial arrangement of the individual shafts of the transmission, FIG. 25 illustrates as follows: The first shaft 1 extends partially and centrally within the third shaft 3 and partially and centrally within the seventh shaft 7; the third shaft 3 extends partially and centrally within the eighth shaft 8 and partially and centrally within the second shaft 2; the seventh shaft 7 extends partially and centrally within the fifth shaft 5; the fifth shaft 5 extends partially and centrally within the eighth shaft 8; the eighth shaft 8 extends centrally and within the sixth shaft 6, whereby the sixth shaft 6 at least partially surrounds the fourth clutch D and the second planetary gearset RS2 in an axial and radial direction.

Figure 26:
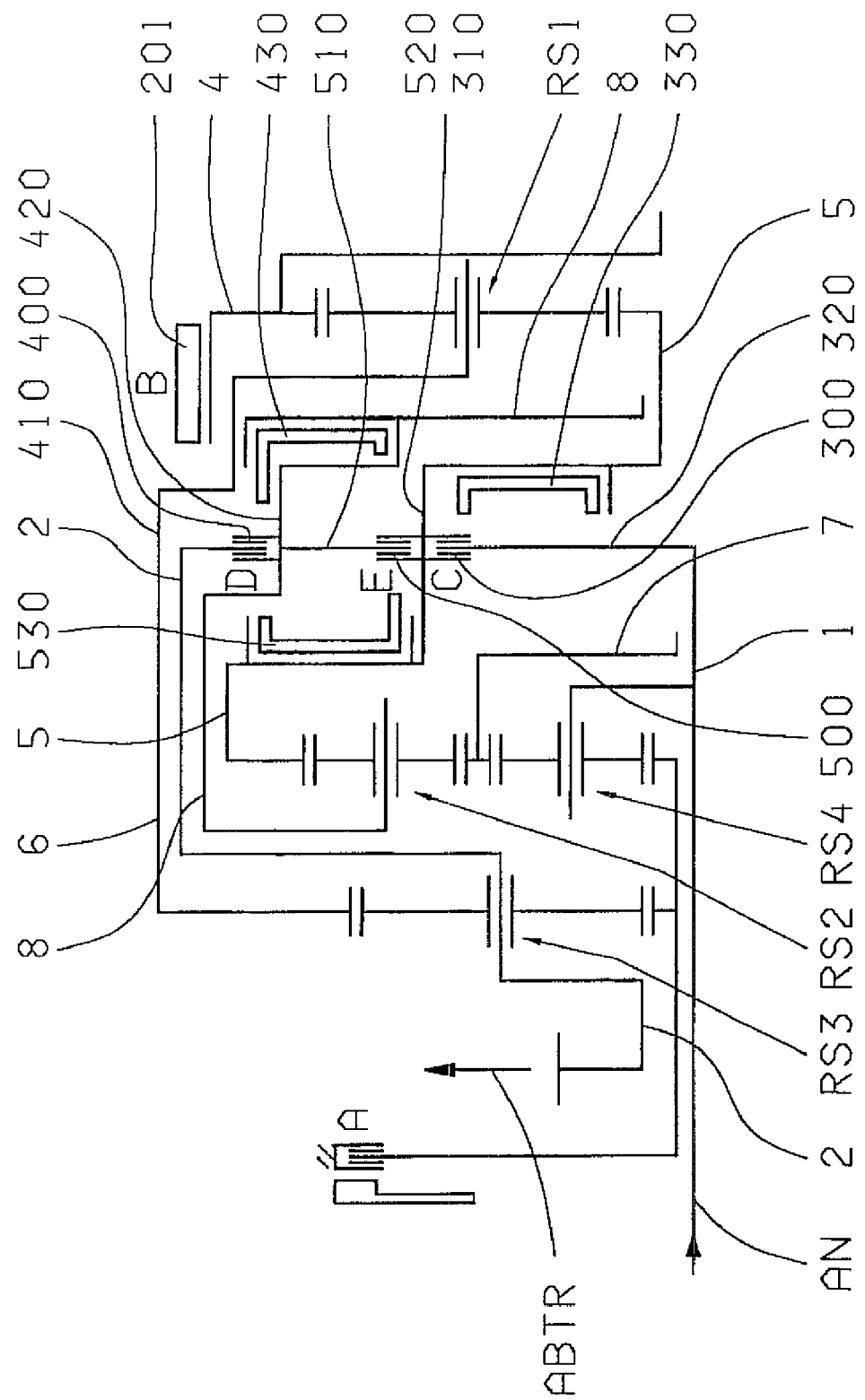
FIG. 26 is an exemplary second component variation for the multi-speed transmission in accord with FIG. 12, i.e., FIG. 13.

FIG. 26 shows an exemplary second component arrangement variant of the multi-speed transmission in accord with FIGS. 12 and/or 13. Starting from the spatial placement of the planetary gearsets and the shifting elements as shown in FIG. 22 and basing considerations on the concept, that the clutch E is only provided for locking the second planetary gearset RS2, the transmission shown in FIG. 22, in regard to the kinematic coupling of the clutch E is so modified, that the clutch E is located in the power flow between the shaft 5 and the shaft 8, likewise in the power flow between the ring gear and the carrier of the second planetary gearset RS2.

As may be seen in FIG. 26, the disk sets 300, 500 and 400 of the three clutches C, E and D, when seen in the axial direction, are at least predominately located in one plane, the disk set 300 of the clutch C is radially located inside the three disk sets, the disk set 500 of the clutch E, radially observed, becomes the middle located of the three disk sets and finally, the disk set 400 of the clutch D forms the radially outer of the three disk sets. The clutches D and E, in a common manner, make use of the eighth shaft 8 of the transmission. For this purpose, the two clutches D and E share a common disk carrier, which also forms a part of the shaft 8, for the radially, outer clutch D the common disk carrier serves as an inner disk carrier 420 and for the clutch E, the common carrier provides an outer disk carrier 510. The clutches C and E, in common, make use of the fifth shaft 5 of the transmission. For this purpose a common disk carrier is provided for the two clutches C and E, which forms a section of the fifth shaft 5, and for the radial inner clutch C forms an outer disk carrier 310 and forms for the clutch E, for example, an inner disk carrier 520. The servo-apparatus 330 of the clutch C is, for instance, axially and slidably mounted on the outer disk carrier 310 of the clutch C and is located on that side of the disk set 300, which is remote from the planetary gearset group RS2, RS4. Further, the servo-apparatus 330 actuates the disk set 300 by axially biasing the clutch C in the direction of the planetary gearset group RS2, RS4. The servo-apparatus 530 of the clutch E is, for example, slidably mounted on the inner disk carrier 510 of the clutch E, on that side of the disk set 500, which is proximal to the planetary gear group RS2, RS4 and additionally actuates the disk set 500 by biasing the clutch E axially in a direction opposite from the planetary gearset group RS2, RS4. The servo-apparatus 430 of the clutch D is, for example, axially and slidably mounted on inner disk carrier 420 of the clutch D and is located on that side of the disk set 400, which is remote from the planetary gearset group RS2, RS4 and activates the disk set 400 by way of the biasing of the clutch D in the axial direction of the planetary gearset group RS2, RS4. Obviously, in another type of design of the transmission, provision can be made, that, one or more of the servo-apparatuses 330, 430, 530 could be placed on the other side of the respectively arranged disk sets 300, 400, and 500, as is shown in FIG. 26.

As may be further seen in FIG. 26, the sun gear of the second planetary gearset RS2 and the ring gear of the fourth planetary gearset RS4 are fixed together as shaft 7 of the transmission, and no shifting element of the transmission exists therein or can be connected thereto, however, similar to the arrangement shown in FIG. 22, the shaft 7 is rotationally fixed to the input shaft 1, i.e., to the shaft AN. The remaining arrangements of elements of the transmission, as seen in FIG. 26, are the same as those of FIG. 22 and on this account, a repetitive description and illustration thereof can be eliminated. Further, the spatial arrangement of the individual shafts, as seen in FIG. 26, corresponds to the spatial arrangement of the individual shafts as shown in FIG. 22.

Figure 27:
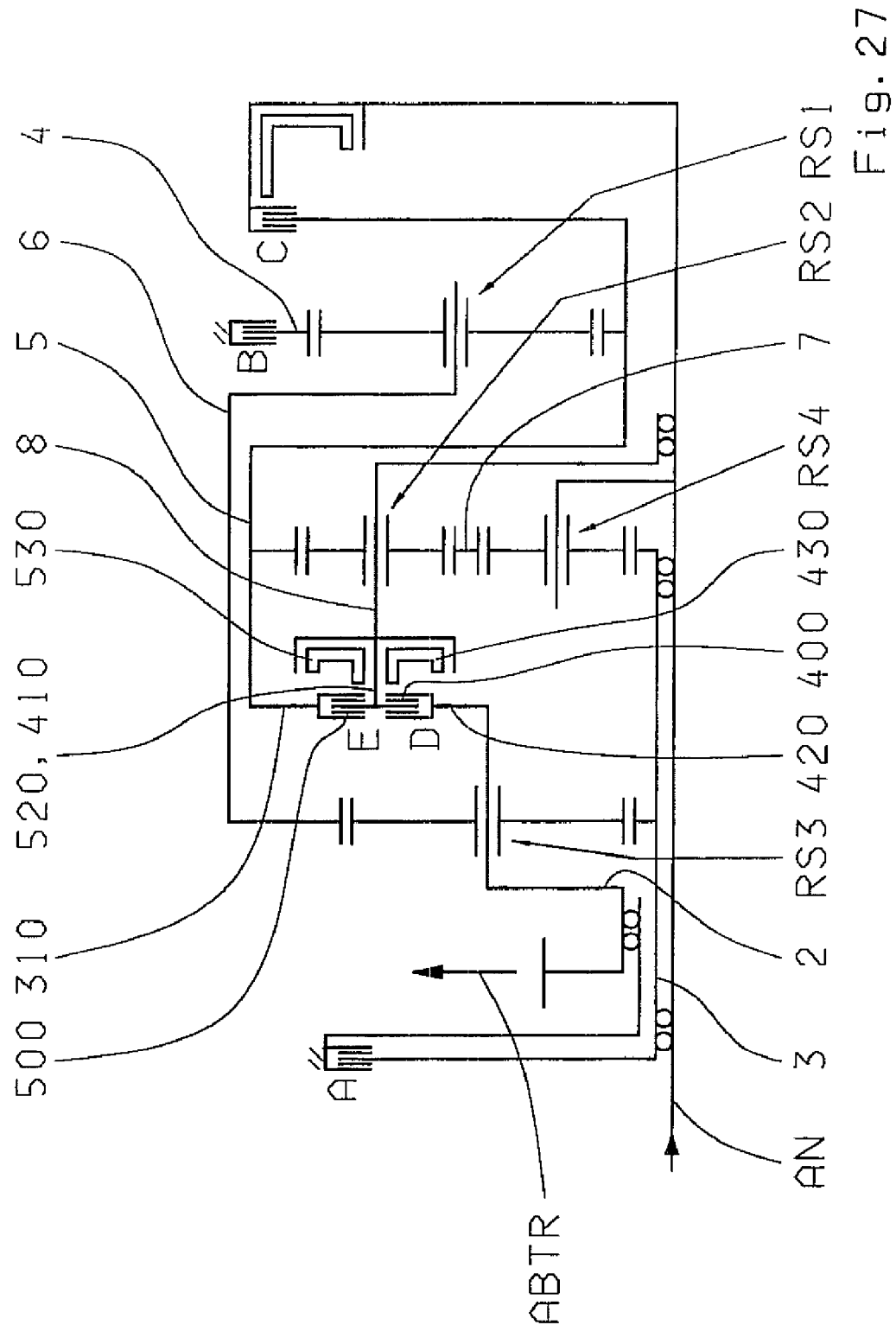
FIG. 27 is an exemplary third component variation for the multi-speed transmission in accord with FIG. 12, i.e., FIG. 13.

FIG. 27 shows an exemplary third component arrangement variant for the multi-speed transmission in accord with FIGS. 12, 13. Starting with the spatial arrangement of the planetary gearsets and the shifting elements in accord with FIG. 15, and maintaining the concept, that clutch E is provided only for locking the second planetary gearset RS2, the transmission as set forth in FIG. 22 in regard to the kinematic connection of the clutch E is modified in such a manner, that the clutch E is no longer located in the power flow between the shaft 5 and the shaft 8, nor in the power flow between the ring gear and carrier of the second planetary gearset RS2. These changes of the kinematic connections of the clutch E, in comparison to FIG. 15, lead to a changed design of the clutch group D, E, which, when spatially viewed as was done in FIG. 15, shows clutch group D, E now being placed axially between the third planetary gearset RS3 and the planetary gearset RS2, RS4 and consequently axially and directly bordering on the individual, third planetary gearset RS3 and planetary gearset group RS2, RS4.

As is evident in FIG. 27, the clutch group D, E possesses a common disk carrier, the disk set 400, the servo-apparatus 430 of the clutch D, the disk set 500 of the clutch E, as well as, the disk set 500 assigned servo-apparatus 530 of the clutch E. Considered from a spatial standpoint, the clutch E is now arranged at least considerably radially above the clutch D, whereby the disk set 500 is radially above disk set 400, and whereby the servo-apparatus 530 is arranged at least predominately radially above the servo-apparatus 430. The common disk carrier forms a section of the eighth shaft 8 of the transmission, and is—corresponding to planetary gearset scheme—continually connected with both the carrier of the second planetary gearset RS2 and the sun gear of the first planetary gearset RS1. In the depicted design example, the common disk carrier is constructed for the radially inner clutch D to serve as an outer disk carrier 410 and also to serve as an inner disk carrier 520 for the radial outer clutch E. Correspondingly, the inner disk carrier 420 of the clutch D forms a part of the second shaft 2 of the transmission and is—corresponding to the planetary gearset scheme—continually fixed to the carrier of the third planetary gearset RS3 and continually fixed to the output stage ABTR of the transmission. The outer disk carrier 510 forms, correspondingly, a section of the fifth shaft 5 of the transmission and is—in accord with the planetary gearset scheme—continually connected to the ring gear of the second planetary gearset RS2 and continually connected to the carrier of the first planetary gearset RS1.

Respectively, both servo-apparatuses 430, 530 are axially and slidably mounted on the common disk carrier for the two clutches D and E. The servo-apparatus 430 is located in the area of the outer disk carrier 410, the servo-apparatus 530 is located in the area of the inner disk carrier 520. For example, both servo-apparatuses 430, 530 are placed on that side of the respectively assigned disk sets 400, 500, which is proximal to the planetary gearset group RS2, RS4. Correspondingly, the two disk sets 400, 500, upon actuation, are axially biased in the direction of the third planetary gearset RS3.

As an exemplary design detail, mention should be made of a separate mounting position of the seventh shaft 7 of the transmission, the shaft is now not connected to, nor could be connected to, any shifting element of the transmission. The remaining designed embodiments of the transmission in accord with FIG. 27 are the same as the FIG. 15, and accordingly, further description of their characteristics would be repetitive and can be eliminated.

The spatial arrangement of the individual shafts of the transmission, in accord with FIG. 27, are presented in a manner similar to the given shaft-arrangement of the transmission in accord with FIG. 15: the first shaft 1 extends partially and centrally within the third shaft 3 and also partially and centrally within the fifth shaft; the third shaft 3 extends partially and centrally within the eighth shaft 8 and partially and centrally within the second shaft 2; the fifth shaft 5 extends centrally within the sixth shaft 6, whereby the sixth shaft 6 at least partially surrounds the fourth and fifth shifting elements D and E, as well as, in an axial and radial manner, the second planetary gearset RS2. As a difference from FIG. 15, provision is made in FIG. 27 that a section of the fifth shaft 5 fully extends over the second planetary gearset RS2 in the axial direction and at least partially extends over the same in the radial direction.

FIG. 28, finally, shows an exemplary fourth component arrangement variant for the multi-speed transmission in accord with FIGS. 12 and/or 13. This is based on the previously explained transmission in accord with FIG. 27, whereby the difference from FIG. 27 is limited to the designed embodiment of the clutch group, which includes the fourth and fifth clutches D, E. At least the disk sets 400, 500 of these two clutches D and E are, when spatially observed, located in an area axially between the third planetary gearset RS3 and the planetary gearset group RS2, RS4. In this arrangement, the two disk sets 400, 500 are placed axially next to one another, preferably at the same diameter, or at least at a diameter of similar size and, for example, in the area of the ring gear of the second planetary gearset RS2, the disk set 500 of the clutch E is located nearer to the second planetary gearset RS2 than the disk set 400 to the clutch D, and the disk set 400 of the clutch D is correspondingly located nearer the third planetary gearset RS3 than the disk set 500 of the clutch E. In the embodiment pictured in FIG. 28, a common disk carrier is provided for the clutches D and E, and is an inner disk carrier 420, 520 for the clutches, and forms a section of the eighth shaft 8 of the transmission. Correspondingly, in accord with the planetary gearset scheme, the eighth shaft 8 is continually fixed to the carrier of the second planetary gearset RS2. Also the outer disk carrier 410 of the clutch D forms a section of the second shaft 2 of the transmission and is continually fixed to the carrier of the third planetary gearset RS3 and is continually connected to the output stage ABTR of the transmission; and correspondingly again, the outer disk carrier 510 of the clutch E forms a section of the fifth shaft 5 of the transmission and is continually connected with the ring gear of the second planetary gearset RS2 and is continually fixed to the sun gear of the first planetary gearset RS1.

The servo-apparatus for the activation of the disk sets 400, 500 of the two clutches D and E are shown in FIG. 28 only simply for the sake of clarity, and these can be located, when spatially considered, likewise axially in the area between the third planetary gearset RS3 and the planetary gearset group RS2, RS4. The disk sets, for example, can be axially and slidably mounted on the and respective outer disk carriers 410, 510 of the respective clutches D and E, or, for example, be so mounted on the above common disk carrier of the two clutches D and E. in another designed embodiment it is possible that, for example, the pressure chamber and also—if such be at hand, a pressure compensation chamber for offsetting the rotary developed pressure of this rotating pressure chamber—one of the two, or both of, the servo-apparatuses of the clutches D and E, spatially considered, can be located axially between the planetary gearset group RS2, RS4 and the first planetary gearset RS1 and further, by way of a piston can actuate that disk set which is thereto assigned, which completely extends axially over the second planetary gearset RS2 and the disk set 500 of the clutch E and partially surrounds the same in the axial and radial directions.

As a conclusion to the description of the exemplary embodiments illustrated in the figures for a multi-speed transmission, in accord with the invention, mention should be made, that the invention is not limited to these described, special embodiments.

For all previously presented and described embodiments of the transmission family, according to the invention, the following statements are to be considered:

According to the invention, it is possible, even with identical transmission designs, to obtain different steps from ratio to ratio, each in accord with the stationary ratio values of the individual planetary gearsets so that establishing an application or a vehicle specification variation can be made.

It is also possible, at any appropriate position of the multi-speed transmission, to provide a one-way clutch, for instance between a shaft and the housing or between two shafts.

Within the framework of an advantageous development, it is possible that the input shaft AN can be separated from the drive motor, when need therefor exists, by a coupling element. As the coupling element, a hydrodynamic converter, a hydrodynamic clutch, a wet startup clutch, a magnetic power clutch or a centrifugal clutch can be employed. It is also possible, to place a driving element in the power flow direction behind the transmission whereby, in such a case, the input shaft AN would be continuously bound to the crankshaft of the drive motor. The inventive multi-speed transmission enables, beyond the stated items, also a toque-vibrational damper to be provided between the drive motor and the transmission.

Within the scope of an additional not heretofore described embodiment of the invention, it is possible to place on any shaft, preferably on the input drive shaft AN or the output drive shaft AB, a wear-free brake, such as a hydraulic or electric retarder or the like can be installed which, would be of particular value if installed in a commercial vehicle. Further, it is possible to drive additional units by placing a power take-off on any shaft, preferably on the input shaft AN or on the output shaft AB.

The installed shifting elements can be designed as load-shifting clutches or brakes. Especially it is possible that frictional locking clutches or brakes, such as disk clutches, band brakes and/or conical clutches could be used. Further, as shifting elements, shape fitting brakes or clutches, such as synchronizing or clamping clutches could be installed. Especially in the case of brakes, a band brake offers a shortening of the overall length of the transmission, since such brakes B, corresponding to the shifting logic of the transmission, are released from neutrality only by the engagement of the reverse gear ratio and must be engaged in the fifth forward gear ratio by downshifting. A further advantage of the presently presented multi-speed transmission is to be found in the fact, that on each shaft, an electric machine can be installed to serve as a generator and/or as an additional drive unit.

Obviously, each designed item of construction, especially any and all spatial arrangements of the planetary gearsets, and the shifting element together or alone, and to whatever extent technically advantageous, are covered under the protective umbrella of the present claims, even without affecting the function of the transmission, in the manner and effectiveness in which the claims are here presented, this being true even if the explanation and description is not explicit in the presented text or the illustrated Figures.

REFERENCE NUMERALS

A first shifting element, first brake
B second shifting element, second brake
C third shifting element, first clutch
D fourth shifting element, second clutch
E fifth shifting element, third clutch
AN input shaft
AB output shaft
GG housing
GN hub, fixed to housing
GW housing wall
ABTR output stage, may be spur gear or chain drive
DIFF differential
RS1 first planetary gearset
HO1 ring gear of the first planetary gearset
SO1 sun gear of the first planetary gearset
ST1 carrier of the first planetary gearset
PL1 planet gear of the first planetary gearset
RS2 second planetary gearset
HO2 ring gear of the second planetary gearset
SO2 sun gear of the second planetary gearset ST2 carrier of the second planetary gearset
PL2 planet gear of the second planetary gearset
RS3 third planetary gearset
HO3 ring gear of the third planetary gearset
SO3 sun gear of the third planetary gearset
ST3 carrier of the third planetary gearset
PL3 planet gear of the third planetary gearset
RS4 fourth planetary gearset
HO4 ring gear of the fourth planetary gearset
SO4 sun gear of the fourth planetary gearset
ST4 carrier of the fourth planetary gearset
PL4 planet gear of the fourth planetary gearset
i ratio
φ spring, from gear ratio to gear ratio
1 first shaft
2 second shaft
3 third shaft
4 fourth shaft
5 fifth shaft
6 sixth shaft
7 seventh shaft
8 eighth shaft
100 disk set of the first shifting element
110 outer disk carrier of the first shifting element
120 inner disk carrier of the first shifting element
130 servo apparatus of the first shifting element
200 disk set of the second shifting element
201 brake band of the second shifting element
210 outer disk carrier of the second shifting element
220 inner disk carrier of the second shifting element
221 brake band cylinder of the second shifting element
23 servo apparatus of the second shifting element
300 disk set of the third shifting element
310 outer disk carrier of the third shifting element
320 inner disk carrier of the third shifting element
330 servo apparatus of the third shifting element
331 piston of the servo apparatus of the third shifting element
332 retraction element of the servo apparatus of the third shifting element
333 pressure chamber of the servo apparatus of the third shifting element
334 pressure medium feed to the servo apparatus of the third shifting element
335 interposed plate of the servo apparatus of the third shifting element
336 pressure compensation chamber of the servo apparatus of the third shifting element
337 lubricant feed means to the servo apparatus of the third shifting element
338 support plate
400 disk set of the fourth shifting element
410 outer disk carrier of the fourth shifting element
420 inner disk carrier of the fourth shifting element
430 servo apparatus of the fourth shifting element
431 piston of the servo apparatus of the fourth shifting element
432 retraction element of the servo apparatus of the fourth shifting element
433 pressure chamber of the servo apparatus of the fourth shifting element
434 pressure medium feed to the servo apparatus of the fourth shifting element
435 interposed plate of the servo apparatus of the fourth shifting element
436 pressure compensation chamber of the servo apparatus of the fourth shifting element
437 lubricant feed means to the servo apparatus of the fourth shifting element
500 disk set of the fifth shifting element
510 outer disk carrier of the fifth shifting element
520 inner disk carrier of the fifth shifting element
530 servo apparatus of the fifth shifting element
531 piston of the servo apparatus of the fifth shifting element
532 retraction element of the servo apparatus of the fifth shifting element
533 pressure chamber of the servo apparatus of the fifth shifting element
534 pressure medium feed to the servo apparatus of the fifth shifting element
535 interposed plate of the servo apparatus of the fifth shifting element
536 pressure compensation chamber of the servo apparatus of the fifth shifting element
537 lubricant feed means to the servo apparatus of the fifth shifting element

The invention claimed is:

1. A multi-speed transmission of a planetary gearset design for an automatic transmission of a motor vehicle, the transmission having:
an input shaft (AN) and an output shaft (AB),
first, second, third and fourth planetary gearsets (RS1, RS2, RS3, RS4),
at least first, second, third, fourth, fifth, sixth, seventh and eighth rotatable shafts (1, 2, 3, 4, 5, 6, 7, 8), and
first, second, third, fourth and fifth shifting elements (A, B, C, D, E) whose selective engagement provides different speed rotation ratios between the input shaft (AN) and the output shaft (AB) so that eight forward gear ratios, and at least one reverse gear ratio may be realized, and whereby:
a carrier (ST4) of the fourth planetary gearset (RS4) and the input shaft (AN) are rotationally connected to one another and form the first shaft (1);
a carrier (ST3) of the third planetary gearset (RS3) and the output shaft (AB) are connected together and form the second shaft (2);
a sun gear (S03) of the third planetary gearset (RS3) and a sun gear (SO4) of the fourth planetary gearset (RS4) are rotationally connected together and form the third shaft (3);
a ring gear (HO1) of the first planetary gearset (RS1) forms the fourth shaft (4);
a ring gear (HO2) of the second planetary gearset (RS2) and a sun gear (SO1) of the first planetary gearset (RS1) are rotationally connected together and form the fifth shaft (5);
a carrier (ST1) of the first planetary gearset (RS1) and a ring gear (HO3) of the third planetary gearset (RS3) are rotationally fixed to one another and form the sixth shaft (6);
a sun gear (SO2) of the second planetary gearset (RS2) and a ring gear (HO4) of the fourth planetary gearset (RS4) are rotationally connected together and form the seventh shaft (7);
a carrier (ST2) of the second planetary gearset (RS2) forms the eighth shaft (8);
the first shifting element (A) is located between the third shaft (3) and a housing (GG) of the transmission;
the second shifting element (B) is located between the fourth shaft (4) and the housing (GG) of the transmission;
the third shifting element (C) is located in a power flow direction between the fifth shaft (5) and the first shaft (1);

the fourth shifting element (D) is located in the power flow direction either between the eighth shaft (8) and the second shaft (2) or between the eighth shaft (8) and the sixth shaft (6), and the fifth shifting element (E) is located in the power flow direction either between the seventh shaft (7) and the fifth shaft (5) or between the seventh shaft (7) and the eighth shaft (8) or between the fifth shaft (5) and the eighth shaft (8).

2. The multi-speed transmission according to claim 1, wherein the second and the fourth planetary gearset (RS2, RS4), as observed in an axial direction, lie in a plane radially located one above the other;

the fourth planetary gearset (RS4) is located so as to be centrally within the second planetary gearset (RS2), and the second and fourth planetary gearsets (RS2, RS4), considered spatially, are located axially between the first and the third planetary gearsets (RS1, RS3).

3. The multi-speed transmission according to claim 1, wherein:

the second and fourth planetary gearsets (RS2, RS4), considered spatially, are disposed in one plane and are situated one above the other, the fourth planetary gearset (RS4) is located centrally within the second planetary gearset (RS2), and the third planetary gearset (RS3), considered spatially, is located in an area axially disposed between the first planetary gearset (RS1) and vertically arranged, second and fourth planetary gearsets (RS2, RS4).

4. The multi-speed transmission according to claim 1, wherein:

the second and the fourth planetary gearsets (RS2, RS4), when observed in an axial direction, are in one plane and are located radially above one another, the fourth planetary gearset (RS4) is located centrally within the second planetary gearset (RS2), and the first planetary gearset (RS1), considered spatially, is axially located between the third planetary gearset (RS3) and the pair of radially superimposed the second and the fourth planetary gearsets (RS2, RS4).

5. The multi-speed transmission according to claim 1, wherein the ring gear (HO4) of the fourth planetary gearset (RS4) and the sun gear (SO2) of the second planetary gearset (RS2) are combined as a common, one-piece component.

6. The multi-speed transmission according to claim 1, wherein the ring gear (HO4) of the fourth planetary gearset (RS4) and the sun gear (SO2) of the second planetary gearset (RS2) are manufactured as separate components which are connected together.

7. The multi-speed transmission according to claim 6, wherein the ring gear (HO4) of the fourth planetary gearset (RS4) and the sun gear (SO2) of the second planetary gearset (RS2) are rotationally fixed together.

8. The multi-speed transmission according to claim 6, wherein the ring gear (HO4) of the fourth planetary gearset (RS4) and the sun gear (SO2) of the second planetary gearset (RS2) are joined together in an elastic rotatable manner.

9. The multi-speed transmission according to claim 1, wherein the first, the second, the third and the fourth planetary gearsets (RS1, RS2, RS3, RS4) are each a negative planetary gearset.

10. The multi-speed transmission according to claim 1, wherein the carrier (ST2) of the second planetary gearset (RS2) is radially mounted on the transmission housing (GG) above the input shaft (AN).

11. The multi-speed transmission according to claim 1, wherein the carrier (ST2) of the second planetary gearset (RS2) is located radially on the third shaft (3) of the transmission.

12. The multi-speed transmission according to claim 1, wherein a first forward gear ratio is obtained by the engagement of the first, the second and the third shifting elements (A, B, C);

a second forward gear ratio is obtained by the engagement of the first, the second and the fifth shifting elements (A, B, E);

a third forward gear ratio is obtained by the engagement of the second, the third and the fifth shifting elements (B, C, E);

a fourth forward gear ratio is obtained by the engagement of the second, the fourth and the fifth shifting elements (B, D, E);

a fifth forward gear ratio is obtained by the engagement of the second, the third and the fourth shifting elements (B, C, D);

a sixth forward gear ratio is obtained by the engagement of the third, the fourth and the fifth shifting elements (C, D, E);

a seventh forward gear ratio is obtained by the engagement of the first, the third and the fourth shifting elements (A, C, D), and an eighth forward gear ratio is obtained by the engagement of the first, the fourth and the fifth shifting elements (A, D, E).

13. The multi-speed transmission according to claim 1, wherein a reverse gear ratio is achieved by the engagement of the first, the second and the fourth shifting elements (A, B, D).

14. The multi-speed transmission according to claim 1, wherein the fourth planetary gearset (RS4) is at least centrally and axially penetrated by only one shaft of the transmission.

15. The multi-speed transmission according to claim 1, wherein the third planetary gearset (RS3) is at least centrally and axially penetrated by only one shaft of the transmission.

16. The multi-speed transmission according to claim 1, wherein the first planetary gearset (RS1) is penetrated by only one shaft of the transmission in the an axial and a central direction.

17. The multi-speed transmission according to claim 1, wherein the first planetary gearset (RS1) is penetrated, centrally and axially, by the seventh shaft (7) and the input shaft (AN).

18. The multi-speed transmission according to claim 1, wherein the input shaft (AN) and the output shaft (AB) are not co-axially aligned to one another, but are one of aligned parallel and aligned at an angle with respect to one another.

19. The multi-speed transmission according to claim 1, wherein one of a spur or chain driven output, which is deposed in the power flow direction between the carrier (ST3) of the third planetary gearset (RS3) and the output shaft (AB), as observed spatially, is located at least partially on a side of the third planetary gearset (RS3) which lies opposite to the planetary gearset assembly composed of the second and fourth planetary gearsets (RS2, RS4), and the first shifting element (A), considered spatially, is located on that side of the spur or chain driven output, which lies opposite to the third planetary gearset (RS3).

20. The multi-speed transmission according to claim 1, wherein one of a spur gear or chain sprocket is connected to the carrier (ST3) of the third planetary gearset (RS3) and is located axially between the third planetary gearset (RS3) and the first shifting element (A).

21. The multi-speed transmission according to claim 1, wherein one of a spur gear or chain sprocket is connected to the carrier (ST3) of the third planetary gearset (RS3) and is located axially between the first planetary gearset (RS1) and the first shifting element (A).

22. The multi-speed transmission according to claim 1, wherein the second shifting element (B), considered spatially, is located radially above the first planetary gearset (RS1).

23. The multi-speed transmission according to claim 1, wherein the second shifting element (B), considered spatially, is located radially above the third shifting element (C).

24. The multi-speed transmission according to claim 1, wherein the third shifting element (C), considered spatially, is located adjacent the first planetary gearset (RS1).

25. The multi-speed transmission according to claim 1, wherein the third shifting element (C), considered spatially, is located between the first planetary gearset (RS1) and the fourth planetary gearset (RS4).

26. The multi-speed transmission according to claim 1, wherein the third shifting element (C), considered spatially, is located on a side of the first planetary gearset (RS1) which lies opposite to the fourth planetary gearset (RS4).

27. The multi-speed transmission according to claim 1, wherein the third shifting element (C), considered spatially, is located on a side of the fourth planetary gearset (RS4) which is opposite to the first planetary gearset (RS1).

28. The multi-speed transmission according to claim 1, wherein the third shifting element (C), considered spatially, is located radially above the first planetary gearset (RS1).

29. The multi-speed transmission according to claim 1, wherein the fourth shifting element (D), considered spatially, is located between the third planetary gearset (RS3) and a nested planetary group formed of the second and the fourth planetary gearsets (RS2, RS4).

30. The multi-speed transmission according to claim 1, wherein the fourth shifting element (D), considered spatially, is located axially between the first planetary gearset (RS1) and the planetary gearset group formed by the second and the fourth planetary gearsets (RS2, RS4).

31. The multi-speed transmission according to claim 1, wherein a disk set of the fourth shifting element (D), considered spatially, is located radially above the second planetary gearset (RS2), and a servo apparatus for the activation of the disk set of the fourth shifting element (D), considered spatially, is at least located principally axially between the third planetary gearset (RS3) and the second planetary group formed by the second and the fourth planetary gearsets (RS2, RS4).

32. The multi-speed transmission according to claims 1, wherein a disk set of the fourth shifting element (D), considered spatially, is axially disposed between the third planetary gearset (RS3) and the planetary gearset group formed by the second and the fourth planetary gearsets (RS2, RS4) and a servo apparatus, for the activation of the disk set of the fourth shifting element (D), considered spatially, is located at least predominately radially above the second planetary gearset (RS2).

33. The multi-speed transmission according to claim 1, wherein a disk set (400) of the fourth shifting element (D), considered spatially, is disposed between the third planetary gearset (RS3) and the planetary gearset group formed by the second and the fourth planetary gearsets (RS2, RS4) and a servo apparatus (430), for the activation of the disk set (400) of the fourth shifting element (D), considered spatially, is located at least predominately radially between the first planetary gearset (RS1) and the planetary gearset group formed by the second and the fourth planetary gearsets (RS2, RS4), whereby an activation element of the servo apparatus (430), which acts upon the disk set (400) of the fourth shifting element (D) radially embraces the second planetary gearset (RS2) in the axial direction.

34. The multi-speed transmission according to claim 1, wherein the fifth shifting element (E), considered spatially, is located between the first planetary gearset (RS1) and the planetary gearset group formed by the second and the fourth planetary gearsets (RS2, RS4).

35. The multi-speed transmission according to claim 1, wherein the fifth shifting element (E) or a disk set (500) of the fifth shifting element (E), seen spatially, is located on a side of the first planetary gearset (RS1) which side lies opposite to the planetary gearset group formed by the second and the fourth planetary gearsets (RS2, RS4).

36. The multi-speed transmission according to claim 1, wherein the third and the fifth shifting element (C, E) form a component group with a common disk carrier, whereby a disk set (300) of the third shifting element (C), considered spatially, is located essentially radially above a disk set (500) of the fifth shifting element (E).

37. The multi-speed transmission according to claim 1, wherein the third and the fifth shifting elements (C, E) form a component group with a common disk carrier, whereby the disk packet (500) of the fifth shifting element (E), considered spatially, is located radially above the disk packet (300) of the third shifting element (C).

38. The multi-speed transmission according to claim 1, wherein the third and the fifth shifting elements (C, E) form a component group with a common disk carrier, whereby the disk packets (300, 500) of the third and fifth shifting elements (C, D), considered spatially, are located axially beside one another.

39. The multi-speed transmission according to claim 36, wherein the component group formed by the third and the fifth shifting elements (C, E) is at least one of located adjacent the planetary gearset group formed by the second and the fourth planetary gearsets (RS2, RS4) and axially contingent the first planetary gearset (RS1).

40. The multi-speed transmission according to claim 36, wherein the component group formed by the third and the fifth shifting elements (C, E) is located adjacent the first planetary gearset (RS1).

41. The multi-speed transmission according to claim 1, wherein the fourth and the fifth shifting elements (D, E) form a component group having a common disk carrier, whereby the disk packet (400) of the fourth shifting element (D) considered spatially, is located radially above a disk packet (500) of the fifth shifting element (E).

42. The multi-speed transmission according to claim 1, wherein the fourth and the fifth shifting elements (D, E) form a component group with a common disk carrier, whereby the disk packet (500) of the fifth shifting element (E), considered spatially, is located essentially radially above disk packet (400) of the fourth shifting element (D).

43. The multi-speed transmission according to claim 1, wherein the fourth and the fifth shifting elements (D, E) form a component group with a common disk carrier, whereby the disk packets (400, 500) of the fourth and the fifth shifting elements (400, 500), considered spatially, are located axially adjacent one another.

44. The multi-speed transmission according to claim 41, wherein the fourth and the fifth shifting elements (D, E) form a component group with a common disk carrier, which is at least one of located adjacent the planetary gearset group which is formed by the second and the fourth planetary gearsets (RS2, RS4) and is located axially adjacent the third planetary gearset (RS3).

45. The multi-speed transmission according to claim 1, wherein
the first shaft (1) runs sectionally, centrally within the third shaft (3) and sectionally, centrally within the fifth shaft (5);
the third shaft (3) runs sectionally, centrally within the eighth shaft (8) and sectionally, centrally within the second shaft (2);
the fifth shaft (5) runs sectionally, centrally within the sixth shaft (6); and
the sixth shaft (6) embraces the fourth shifting element (D) as well as the second planetary gearset (RS2) in the axial and radial directions.

46. The multi-speed transmission according to claim 1, wherein
the first shaft (1) runs sectionally, centrally within the third shaft (3) and sectionally, centrally within the fifth shaft (5);
the third shaft (3) runs sectionally, centrally within the eighth shaft (8) and sectionally, centrally within the second shaft (2);
the fifth shaft (5) runs partly and centrally within the eighth shaft (8),
the eighth shaft (8) runs centrally within the sixth shaft (6), and
the sixth shaft (6) embraces the fourth shifting element (D) as well as the second planetary gearset (RS2) in the axial and radial directions.

47. The multi-speed transmission according to claim 1, wherein
the first shaft (1) runs partially and centrally within the third shaft (3) and partially and centrally within the fifth shaft (5),
the third shaft (3) runs partially and centrally within the eighth shaft (8) and partially and centrally within the second shaft (2),
the fifth shaft (5) runs spatially and centrally within the eighth shaft (8);
the eighth shaft (8) runs centrally within the second shaft (2),
the second shaft (2) runs partially and centrally within the sixth shaft (6),
the sixth shaft (6) at least partially encompasses the fourth shifting element (D), and the sixth shaft (6) embraces the fourth shifting element (D) as well as the second planetary gearset (RS2) in the axial and radial directions.

48. The multi-speed transmission according to claim 1, wherein
the first shaft (1) funs sectionally and centrally within the third shaft (3) and sectionally and centrally within the seventh shaft (7);
the third shaft (3) runs sectionally and centrally within the eighth shaft (8) and sectionally and centrally within the second shaft (2);
the seventh shaft (7) runs at least sectionally and centrally within the fifth shaft (5);
the sixth shaft (6) embraces the fourth shifting element (D) along with the second planetary gearset (RS2) in the axial and radial directions, and
the first shaft (1) embraces the fifth shifting element (E) I the axial and radial directions.

49. The multi-speed transmission according to claim 1, wherein:
the first shaft (1) runs partially and centrally within the third shaft (3) and partially and centrally within the seventh shaft (7),
the third shaft (3) runs partially and centrally within the eighth shaft (8) and partially and centrally within the second shaft (2),
the seventh shaft (7) runs partially and centrally within the fifth shaft (5),
the fifth shaft (5) runs partially and centrally within the eighth shaft (8)
the eighth shaft (8) runs centrally within the sixth shaft (6), and
the sixth shaft (6) at least partially encompasses in the axial and radial direction the fourth shifting element (D) and the second planetary gearset (RS2).

50. The multi-speed transmission according to claim 1, wherein:
the first shaft (1) runs partially and centrally within the third shaft (3) and partially and centrally within the seventh shaft (7),
the third shaft (3) runs partially and centrally within the eighth shaft (8) and partially and centrally within the second shaft (2),
the seventh shaft (7) runs partially and centrally within the fifth shaft (5)
the fifth shaft (5) runs partially and centrally within the eighth shaft (8),
the eighth shaft (8) runs centrally within the second shaft (2),
the second shaft (2) runs partially and centrally with the sixth shaft (6), and
the sixth shaft (6) at least partially encompasses the fourth shifting element (D) and the second planetary gearset (RS2) in the axial and radial direction.

51. The multi-speed transmission according to claim 1, wherein the sixth shaft (6) embraces the fourth and fifth shifting elements (D, E) as well as the second planetary gearset (RS2) in the axial and radial directions.

52. The multi-speed transmission according to claim 1, wherein the sixth shaft (6) embraces the third, fourth and fifth shifting elements (C, D, E) as well as the second planetary gearset (RS2) in the axial and radial directions.

53. The multi-speed transmission according to claim 1, wherein the first shaft (1) embraces the fifth shifting element (E) in the axial and radial directions.

54. The multi-speed transmission according to claim 1, wherein:
the first shaft (1) runs partially and centrally within the fifth shaft (5) and partially and centrally within the seventh shaft (7),
the seventh shaft (7) runs centrally within the fifth shaft (5),
the eighth shaft (8) runs centrally within the fifth shaft (5),
the third shaft (3) runs partially and centrally within the eighth shaft (8) and runs partially and centrally within the second shaft (2),
the second shaft (2) runs partially and centrally within the fifth shaft (5) and partially and centrally within the sixth shaft (6), and
the fifth shaft (5) at least partially encompasses the third, fourth and fifth shifting element (C, D, E) as well as the second planetary gearset (RS2) in the axial and radial direction.

55. The multi-speed transmission according to claim 1, wherein the sixth shaft (6) runs centrally within the fifth shaft (5), and in that the fifth shaft (5) encompasses the third planetary gearset (RS3) in the axial and radial direction.

56. The multi-speed transmission according to claim 1, wherein a part of the fifth shaft (5) runs centrally within the sixth shaft (6).

57. The multi-speed transmission according to claim 1, wherein a part of the fifth shaft (5) completely encompasses the second planetary gearset (RS2) in the axial direction.

58. The multi-speed transmission according to claim 1, wherein an input shaft of the transmission is located on a side of the transmission housing (GG) which side lies opposite to the first planetary gearset (RS1).

59. The multi-speed transmission according to claim 1, wherein an input shaft of the transmission is located on a side of the transmission housing (GG), which side lies opposite to the third planetary gearset (RS3).

60. The multi-speed transmission according to claim 1, wherein a coupling element facilitates separating the input shaft (AN) from an engine of the motor vehicle.

61. The multi-speed transmission according to claim 1, wherein an external starting element is inserted in the powerflow direction behind the transmission, whereby the input shaft (AN) is rotationally fixed to or elastically rotatably connected to a crankshaft of the drive motor.

62. The multi-speed transmission according to claim 60, wherein the coupling element is one of a startup element, a hydrodynamic converter, a hydrodynamic clutch, a dry startup element, a wet startup element, a magnetic powder clutch or a centrifugal clutch.

63. The multi-speed transmission according to claim 1, wherein startup of the motor vehicle, by way of a transmission-internal shifting element, is achieved whereby the input shaft (AN) is continually rotationally fixed or elastically rotatably connected to a crankshaft of the drive motor.

64. The multi-speed transmission according to claim 63, wherein the startup of the motor vehicle in the forward or the reverse direction is achieved made by way of the same transmission-internal shifting element.

65. The multi-speed transmission according to claim 1, wherein a torque vibratory damper is located between the drive motor and the transmission.

66. The multi-speed transmission according to claim 1, wherein one of a wear-resistant brake, an auxiliary output drive, for operation of an additional aggregate, and an electric machine, which serves as a generator and as an additional drive machine, is installed on one of the input, the output the first, the second, the third, the fourth, the fifth, the sixth, the seventh and the eighth shafts (AN, AB, 1, 2, 3, 4, 5, 6, 7, 8) of the transmission.

67. The multi-speed transmission according to claim 1, wherein each of the first, the second, the third, the fourth and the fifth shifting elements (A, B, C, D, E) comprise one of frictionally based clutches, frictionally based brakes, disk clutches, band brakes, conical clutches, shape-fit clutches, shaft-fit brakes, conical clutches and conical brakes.

* * * * *